US011286775B2

United States Patent
Hemink

(12) United States Patent
(10) Patent No.: US 11,286,775 B2
(45) Date of Patent: Mar. 29, 2022

(54) ROTATABLE PISTON ASSEMBLY

(71) Applicant: Poseidon Fluid Power, LLC, Rochester, NY (US)

(72) Inventor: Douglas A. Hemink, Churchville, NY (US)

(73) Assignee: Poisedon Fluid Power, LLC, Rochester, NY (US)

( * ) Notice: Subject to any disclaimer, the term of this patent is extended or adjusted under 35 U.S.C. 154(b) by 279 days.

(21) Appl. No.: 16/160,286

(22) Filed: Oct. 15, 2018

(65) Prior Publication Data

US 2019/0113028 A1 Apr. 18, 2019

Related U.S. Application Data

(60) Provisional application No. 62/572,635, filed on Oct. 16, 2017, provisional application No. 62/671,693, (Continued)

(51) Int. Cl.

| | |
|---|---|
| ***F04B 1/12*** | (2020.01) |
| ***F04B 1/16*** | (2006.01) |
| ***F04B 1/29*** | (2020.01) |
| ***F04B 1/14*** | (2020.01) |
| ***F04B 1/28*** | (2006.01) |
| ***F04B 1/18*** | (2020.01) |
| ***F04B 1/20*** | (2020.01) |

(Continued)

(52) U.S. Cl.

CPC .......... *F01B 3/0079* (2013.01); *F01B 3/0085* (2013.01); *F01B 3/02* (2013.01); *F01B 3/101* (2013.01); *F03C 1/061* (2013.01); *F03C 1/0613* (2013.01); *F03C 1/0686* (2013.01); *F04B 1/124* (2013.01); *F04B 1/126* (2013.01); *F04B 1/128* (2013.01); *F04B 1/14* (2013.01); *F04B 1/146* (2013.01); *F04B 1/16* (2013.01); *F04B 1/182* (2013.01); *F04B 1/29* (2013.01); *F04B 1/295* (2013.01); *F04B 1/328* (2013.01); *F04B 7/06* (2013.01); *F04B 53/18* (2013.01); *F16H 1/28* (2013.01); *F04B 2201/0201* (2013.01); *F04B 2201/0807* (2013.01)

(58) Field of Classification Search

CPC .......... F04B 1/146; F04B 1/124; F04B 1/126; F04B 1/14; F04B 1/143; F04B 1/295; F04B 7/06; F04B 2201/0201; F04B 53/18

See application file for complete search history.

(56) References Cited

U.S. PATENT DOCUMENTS 5,167,181 A * 12/1992 Ken Lee ................. F04B 1/126 417/269
6,179,574 B1 * 1/2001 Yie ......................... F04B 1/124 417/225

(Continued)

FOREIGN PATENT DOCUMENTS

DE 102014206378 A1 10/2015
GB 551384 A1 2/1943

OTHER PUBLICATIONS

International Search Report and Written Opinion pertaining to PCT/US2018/055870 dated Dec. 10, 2018.

*Primary Examiner* — Dominick L Plakkoottam

(57) ABSTRACT

A rotatable piston assembly for a reciprocating piston type hydraulic machine includes a rotatable piston configured for a controlled rotation and configured to reciprocate within a cylinder bore of the reciprocating piston type hydraulic machine.

18 Claims, 41 Drawing Sheets

Related U.S. Application Data filed on May 15, 2018, provisional application No. 62/671,690, filed on May 15, 2018.

(51) Int. Cl.

| | |
|---|---|
| ***F04B 1/30*** | (2020.01) |
| ***F01B 3/00*** | (2006.01) |
| ***F01B 3/10*** | (2006.01) |
| ***F01B 3/02*** | (2006.01) |
| ***F04B 1/295*** | (2020.01) |
| ***F04B 7/06*** | (2006.01) |
| ***F04B 53/18*** | (2006.01) |
| ***F04B 1/124*** | (2020.01) |
| ***F03C 1/06*** | (2006.01) |
| ***F03C 1/40*** | (2006.01) |
| ***F04B 1/328*** | (2020.01) |
| ***F04B 1/126*** | (2020.01) |
| ***F04B 1/128*** | (2020.01) |
| ***F04B 1/146*** | (2020.01) |
| ***F04B 1/182*** | (2020.01) |
| ***F16H 1/28*** | (2006.01) |

(56) References Cited

U.S. PATENT DOCUMENTS

| | | | | | |
|---|---|---|---|---|---|
| 6,217,289 | B1 * | 4/2001 | Smith | F02M 59/06 | 417/199.1 |
| 6,668,801 | B2 * | 12/2003 | Smith | F02M 59/06 | 123/446 |
| 6,799,953 | B2 * | 10/2004 | Nelson | F04B 1/188 | 123/446 |
| 7,887,302 | B2 * | 2/2011 | Hutto, Jr. | F04B 1/32 | 417/213 |
| 2013/0139679 | A1 * | 6/2013 | Nelson | F16J 1/22 | 92/13 |
| 2016/0348672 | A1 * | 12/2016 | Hemink | F04B 1/141 | |

* cited by examiner

ROTATABLE PISTON ASSEMBLY

CROSS-REFERENCE TO RELATED APPLICATIONS

The present disclosure claims priority to U.S. Provisional Patent Application No. 62/572,635, filed Oct. 16, 2017, and entitled "ROTATABLE PISTON VALVE ASSEMBLY," U.S. Provisional Patent Application No. 62/671,693, filed May 15, 2018, and entitled "ROTATABLE PISTON WITH VALVE ASSEMBLY," and U.S. Provisional Patent Application No. 62/671,690, filed May 15, 2018, and entitled "VARIABLE DISPLACEMENT PISTON MACHINE," the entireties of which are incorporated by reference herein.

TECHNICAL FIELD

The present disclosure relates to a reciprocating piston type hydraulic machine, and more specifically to a rotatable piston assembly of such a hydraulic machine.

BACKGROUND

Displacement machines may be used to transform mechanical energy into hydraulic energy and the reverse. Fixed and variable displacement reciprocating piston (or plunger) type machine may include radial, bent-axis, and axial machines. An axial piston machine may include (1) first type including a rotating swashplate and a stationary cylinder block or (2) a second type including a stationary swashplate and rotating cylinder block. The first type of axial piston machine including the rotating swashplate may include increased unbalanced forces on a shaft and the swashplate, requiring additional bearings to absorb such forces than the second type of axial piston machine including the rotating cylinder block. The rotating cylinder block can, by contrast, absorb such unbalanced forces but requires an additional housing component and tends to have a large rotational mass inertia resulting in high power loss.

Accordingly, a need exists for alternative components and machine types to increase efficiency, packaging, and operation of such displacement machines.

BRIEF SUMMARY

According to the subject matter of the present disclosure, a rotatable piston assembly for a reciprocating piston type hydraulic machine may include a rotatable piston configured for a controlled rotation and configured to reciprocate within a cylinder bore of the reciprocating piston type hydraulic machine along a cylinder bore axis of the cylinder bore.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
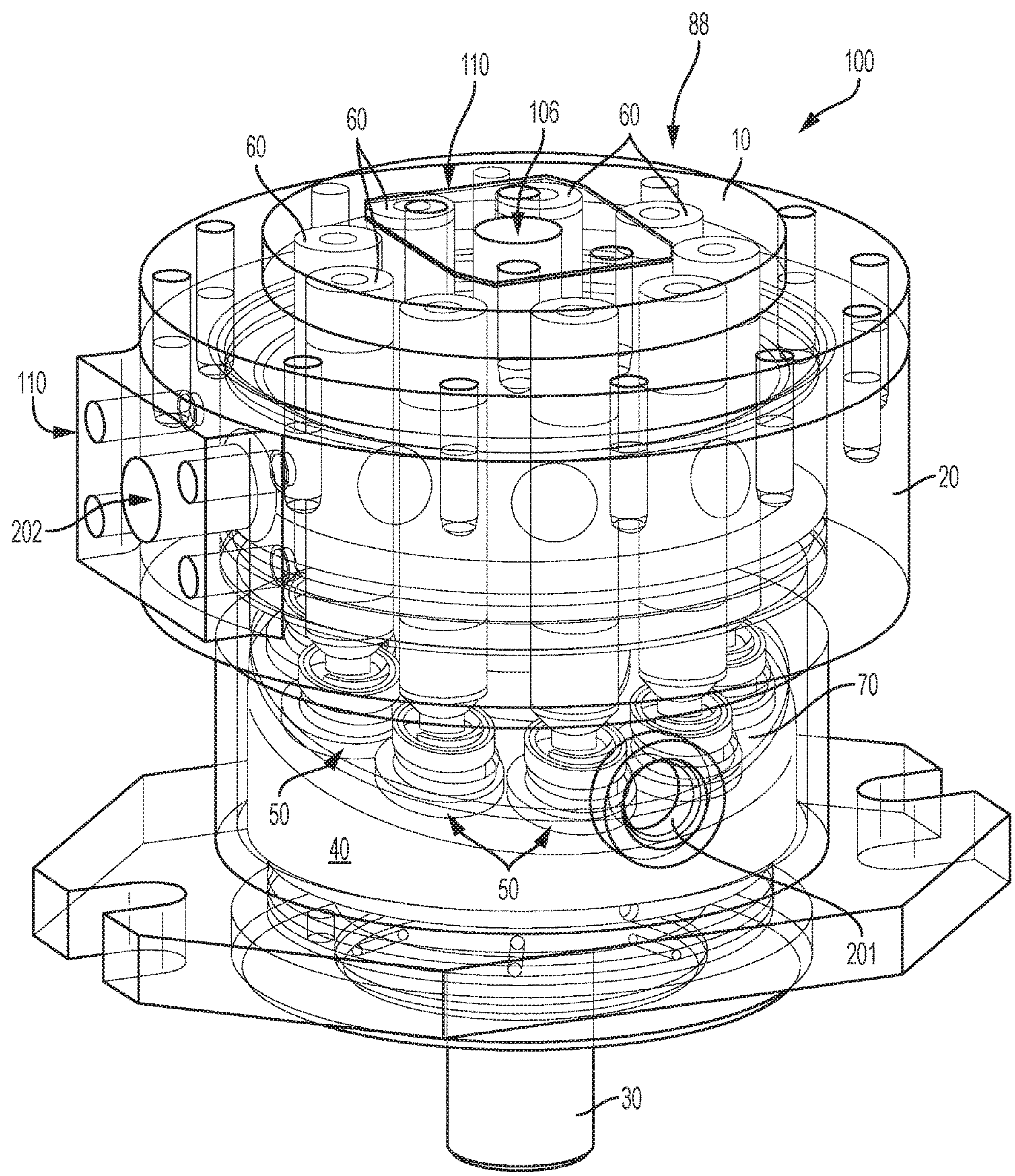
FIG. 1 illustrates a perspective view of an axial piston device including a rotating swashplate, a stationary cylinder block, and a rotatable piston assembly, according to one or more embodiments as shown and described herein.

Rotating swash mechanism type axial piston machines may be used with a check-valve as a one-way valve to operate at extreme pressures with a relatively low rotating mass. However, use of such machines with such a one-way valve are limited to pump applications with a flow in a first direction and do not work as a motor using a flow in a second direction opposite the first direction as the check-valve only allows for fluid flow in one direction. Further, a rotating swash mechanism type axial piston machine, including a stationary cylinder block, tends to include increase unbalanced forces on a shaft and the swash mechanism, requiring additional bearings to absorb such forces than another type of axial piston machine including the rotating cylinder block and a stationary swash mechanism. A rotating swash mechanism type axial piston machine with a stationary cylinder block including a mechanically phased rotary valve, rather than a check-valve, to provide for use of the rotating swash mechanism type axial piston machine as a pump and motor and assist with absorbing unbalanced forces is described in U.S. Pat. App. No. 2016/0348672, entitled "Axial Piston Device," filed Feb. 5, 2015, which is incorporated by reference in its entirety herein.

The rotating cylinder block piston machine with the stationary swash mechanism and phased valve, in contrast to a stationary cylinder block piston machine with a rotating swash mechanism and one-way check-valve, also allows for operation as both a pump and motor. In such a rotating cylinder block piston machine, the distribution of low and high pressure from inlet and outlet, to the piston chamber volume, is controlled by an angular rotation of a piston about a shaft axis of rotation with respect to the swash mechanism and valve plate. The phased valve in such a machine may include two openings that are opposed about a midplane, which is substantially parallel to a swash mechanism pivot plate, to thus provide a mechanical means to control a connecting and disconnecting of the displacement chamber from the inlet and outlet during a compression and decompression stroke of the piston as the piston translates in and out of a cylinder bore due to the piston position about the inclined swash mechanism. The rotating cylinder block of such a piston machine is able to absorb unbalanced forces yet requires an additional housing component and tends to have a large rotational mass inertia resulting in high power loss.

The present disclosure at least with respect to FIGS. 1-9H describes a rotatable piston assembly including a rotary piston that has an integral valve and is configured for a controlled rotation for use with displacement machines, such as a rotating swash mechanism type axial piston machine with a stationary cylinder block or a rotating cylinder block piston machine with a stationary swash mechanism. In embodiments, the swash mechanism may be a swashplate. The rotary valve piston is able to absorb unbalanced forces while further allowing for use of the rotating swashplate type axial piston machine as a pump and motor. While the disclosure herein describes use of such a rotary valve with a rotating swashplate type axial piston machine, it is within the scope of this disclosure that the rotary valve piston described herein may be used with all fixed and variable displacement reciprocating piston type machines.

The present disclosure at least with respect to FIGS. 1-9H further describes an embodiment of a rotatable piston assembly including a plurality of rotatable pistons that are joined to a respective plurality of slipper assemblies through a constrained fit, such as a revolute joint interface. Such a constrained fit constrains and controls rotation of each piston with respect to each slipper assembly with respect to a single axis of rotation. As a rotatable shaft rotates about a shaft axis of rotation, a connected rotating swashplate also rotates. The rotation of the swashplate in turn rotates the plurality of slipper assemblies. These assemblies interface, as described in greater detail below, with the rotating swashplate. The rotation of the plurality of slipper assemblies effects a corresponding rotation of the plurality of rotatable pistons such that the plurality of rotatable pistons respectively rotate about bore axes of rotation of each cylinder bore within which each rotatable piston is positioned. The result is that the pistons rotate in a controlled fashion within respective bores through interaction between the slipper assemblies and the swashplate such that the rotation of the pistons corresponds with the rotation of the swashplate and a synchronized rotation of the rotatable shaft. Further, in embodiments in which the rotatable piston assembly includes a rotatable valve assembly having a valve disposed within and integral to the piston, the valve within the piston is periodically opened and closed with respect to one or more ports defined in each cylinder bore by rotation of the piston.

Referring initially to FIG. 1, an axial piston machine 100 including a rotating swashplate 40, stationary cylinder block 10, and a rotatable piston assembly 88 including a plurality of pistons 60. Referring to FIGS. 1-3 and 7, the rotatable piston assembly 88 may include a rotatable piston valve assembly 90 (FIGS. 2 and 7) including the plurality of pistons 60 and integrated valves within the respective pistons 60. As a non-limiting example, referring to FIGS. 2-3, each piston 60 has an integral valve port 602. Use of a rotatable piston 60 including an integral valve port 602 eliminates a need for a separate valve component to operate with the rotatable piston 60, resulting in a less expensive and lighter assembly, and allowing for control of an inlet and outlet of fluid in a bi-directional flow as described herein. However, use of a rotatable piston assembly 88 for a controlled rotation as described herein of the plurality of pistons 60 not including an integral valve such as the integral valve port 602 but rather including a separate valve component is contemplated within the scope of this disclosure.

Figure 2:
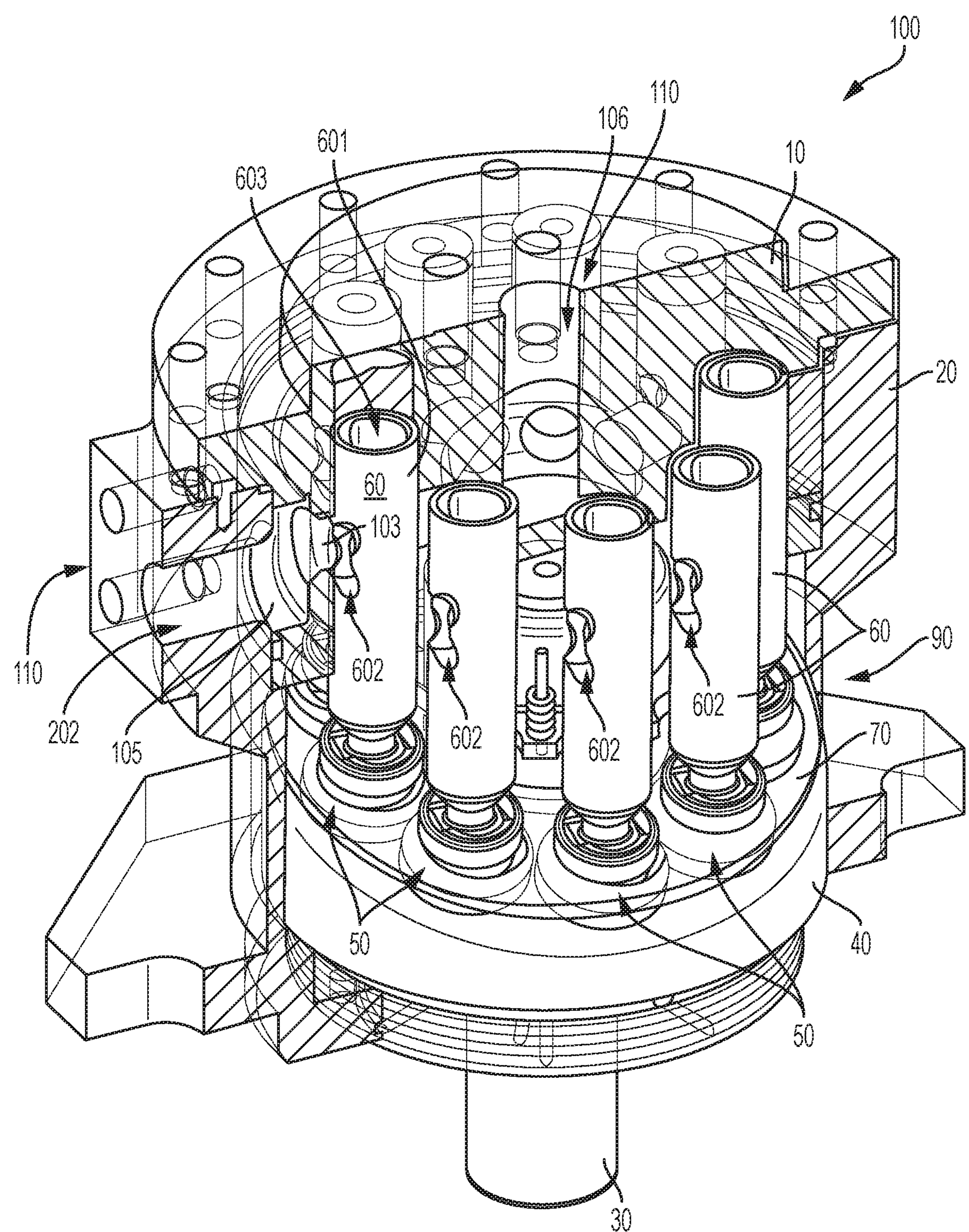
FIG. 2 illustrates a cross-sectional view of a first half portion and interior components of a second half portion of the axial piston device of FIG. 1.
Figure 3:
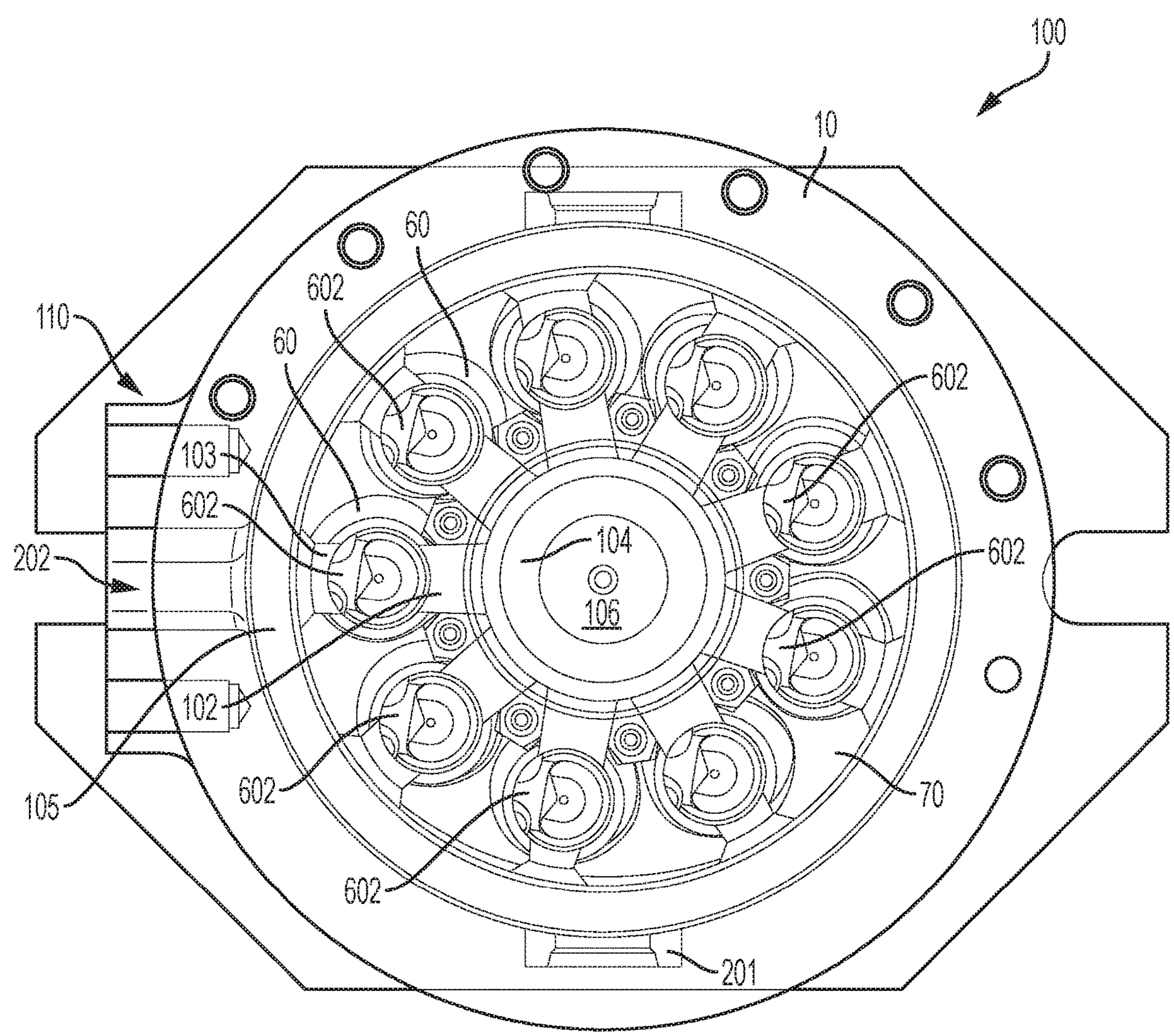
FIG. 3 illustrates a top plane view of the axial piston device of FIG. 1.

Referring to FIGS. 1-2, the axial piston machine 100 includes a rotatable shaft 30 coupled to the rotating swashplate 40 such that rotation of one of the rotatable shaft 30 and rotating swashplate 40 effects a rotation of the other of the rotatable shaft 30 and rotating swashplate 40. The axial piston machine 100 further includes a plurality of slipper assemblies 50, which are described in greater detail below, that include distal interfaces 501 (FIGS. 4-5 and 7) seated against a proximal interface 401 (FIGS. 4-5) of the rotating swashplate 40. Additionally, the axial piston machine 100 includes a swash housing 20 coupled to the stationary cylinder block 10. The swash housing 20 includes at least a drain port 201, a distal manifold port 202 of a manifold 110, and a proximal manifold port 106 of the manifold 110, each of which will be described in greater detail further below.

Figure 4:
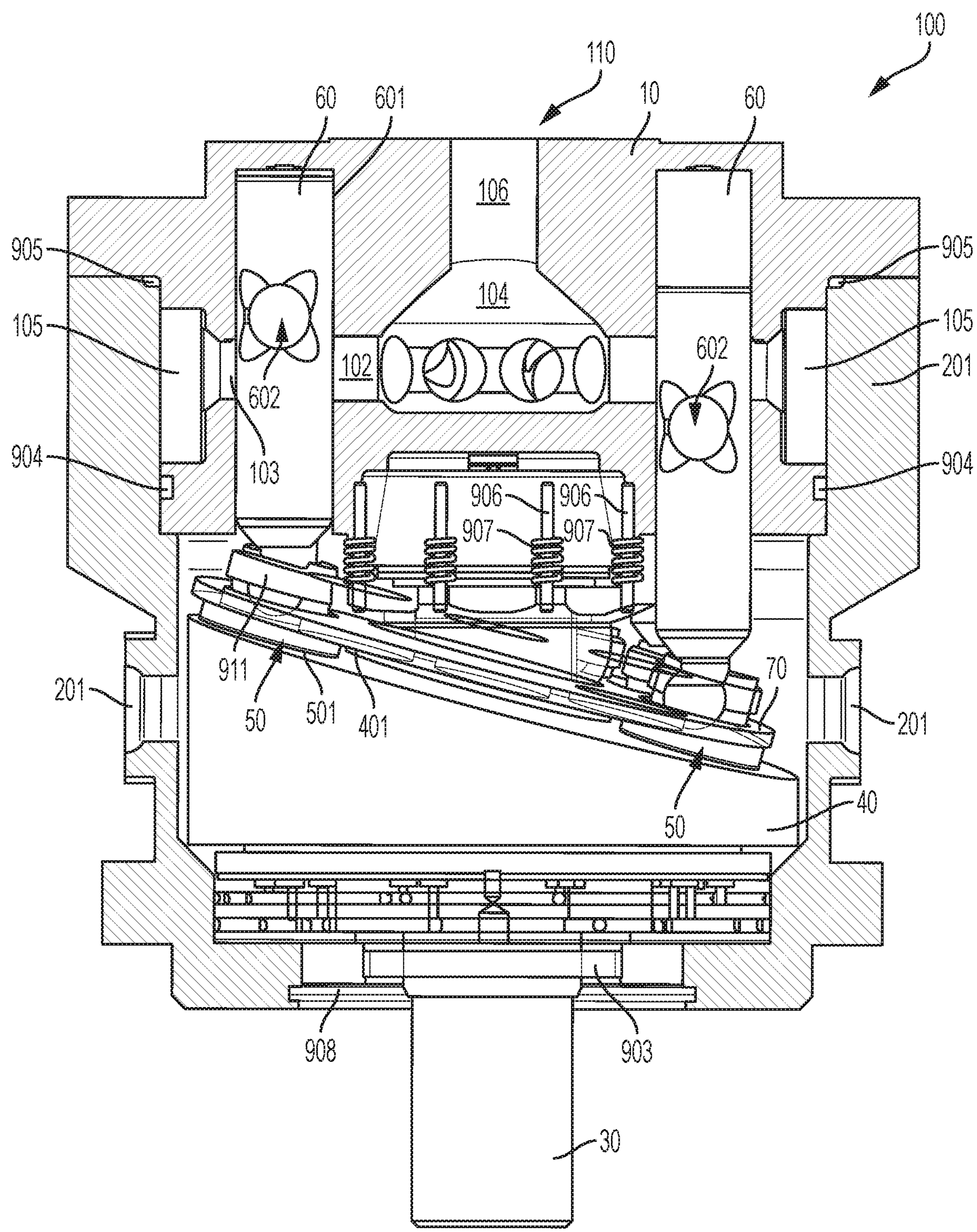
FIG. 4 illustrates a perspective and partially cross-sectional side view of the axial piston device of FIG. 1.
Figure 5:
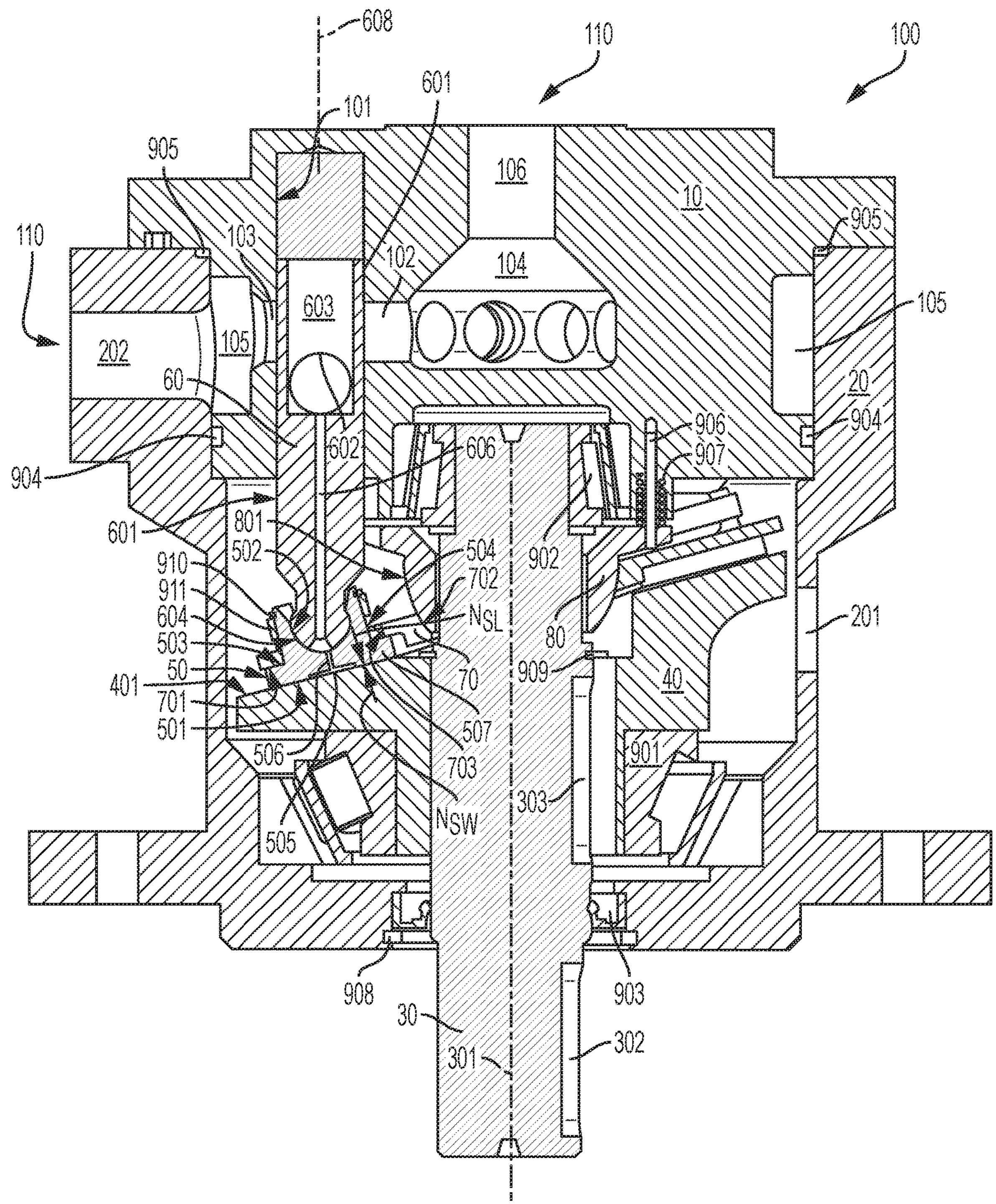
FIG. 5 illustrates a cross-sectional side view of the axial piston device of FIG. 1.
Figure 6:
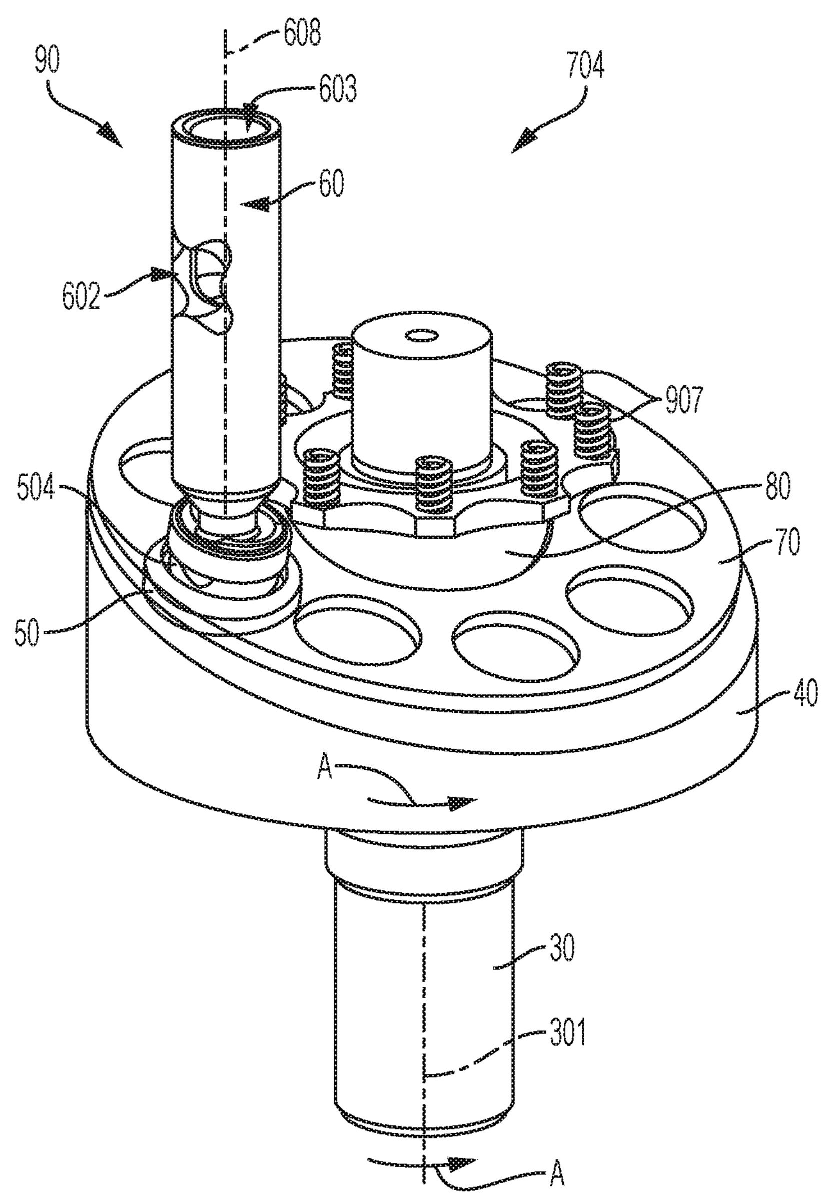
FIG. 6 illustrates a perspective view of select interior components of the axial piston device of FIG. 1, including a rotatable piston valve assembly according to one or more embodiments as shown and described herein.

In embodiments, and referring to FIGS. 4-7, the rotatable piston valve assembly 90 of the axial piston machine 100 may include a hold down assembly 704 including a hold down plate 70 configured to interface with each slipper assembly 50 and apply a force to maintain each slipper assembly 50 against the rotating swashplate 40. The hold down plate 70 may be forced into contact with each slipper assembly 50 by a spring-loaded pivot ball of the hold down assembly 704 (FIG. 6). The spring-loaded pivot ball may be a pivot bearing 80 that provides a hold down force while permitting the hold down plate 70 to pivot and rotate freely about the pivot bearing 80. Thus, hold down forces from the hold down plate 70 against each slipper assembly 50 are assisted through a plurality of springs 907 that force the pivot bearing 80 (FIG. 6) against the hold down plate 70 through a pivot interface 801 (FIG. 5) of the pivot bearing 80 and an interfacing pivot interface 702 of the hold down plate 70. Eventually, the forces from the plurality of springs 907 disposed about a respective plurality of pins 906 extending from the pivot bearing 80 and into the stationary cylinder block 10 are transferred to each slipper assembly 50 through planar joints formed by a hold down planar interface 701 (FIG. 5) of the hold down plate 70 interacting against a corresponding hold down interface 503 of each slipper assembly 50. A slipper neck interface 703 of the hold down plate 70 additionally interacts with and against a slipper neck 504 of the slipper assembly 50.

Referring to FIG. 5, a large bearing 901 is disposed around a distal end of the rotating swashplate 40, and a small bearing 902 is disposed about a proximal end of the rotatable shaft 30. Further, a shaft seal 903 is disposed about an intermediate portion of the rotatable shaft 30 distal to the large bearing 901 and within a distal end of the swash housing 20. A retaining ring 908 is distally disposed below the shaft seal 903 and spaced about the rotatable shaft 30. Another retaining ring 909 is disposed about a portion of the rotatable shaft 30 distal to the pivot bearing 80 and against a central, proximal portion of the rotating swashplate 40. A static seal 905 and a static seal 904 are disposed between joining portions of the stationary cylinder block 10 and the swash housing 20 near and past opposing ends of a distal manifold passage 105, as described in greater detail below.

Referring to FIGS. 1-7, in embodiments, the rotatable piston assembly 88 for a reciprocating piston type hydraulic machine includes at least a rotatable piston 60 configured for a controlled rotation and configured to reciprocate within a cylinder bore 101 (FIG. 5) of the reciprocating piston type hydraulic machine via a cylinder bore interface 601 (FIG. 4). The reciprocating piston type hydraulic machine may be the axial piston machine 100 that includes the rotating swashplate 40 configured for rotation and the stationary cylinder block 10. Rotation of the rotatable shaft 30 is configured to rotate the rotating swashplate 40, and rotation of the rotating swashplate 40 is configured to control a rotation of the rotatable piston 60 during reciprocation of the rotatable piston 60 in the cylinder bore 101, as described in greater detail further below.

In embodiments in which the rotatable piston assembly 88 includes the rotatable piston valve assembly 90, the rotatable piston 60 includes a valve passage 603 (FIGS. 5-7) including an opening disposed at a proximal end of the rotatable piston 60. The rotatable piston 60 further includes the integral valve port 602 that is in fluid communication with the valve passage 603. The integral valve port 602 is configured to provide a passage for fluid flow in one of a first direction and a second direction opposite the first direction to respectively act as one of a pump and a motor.

Figure 7:
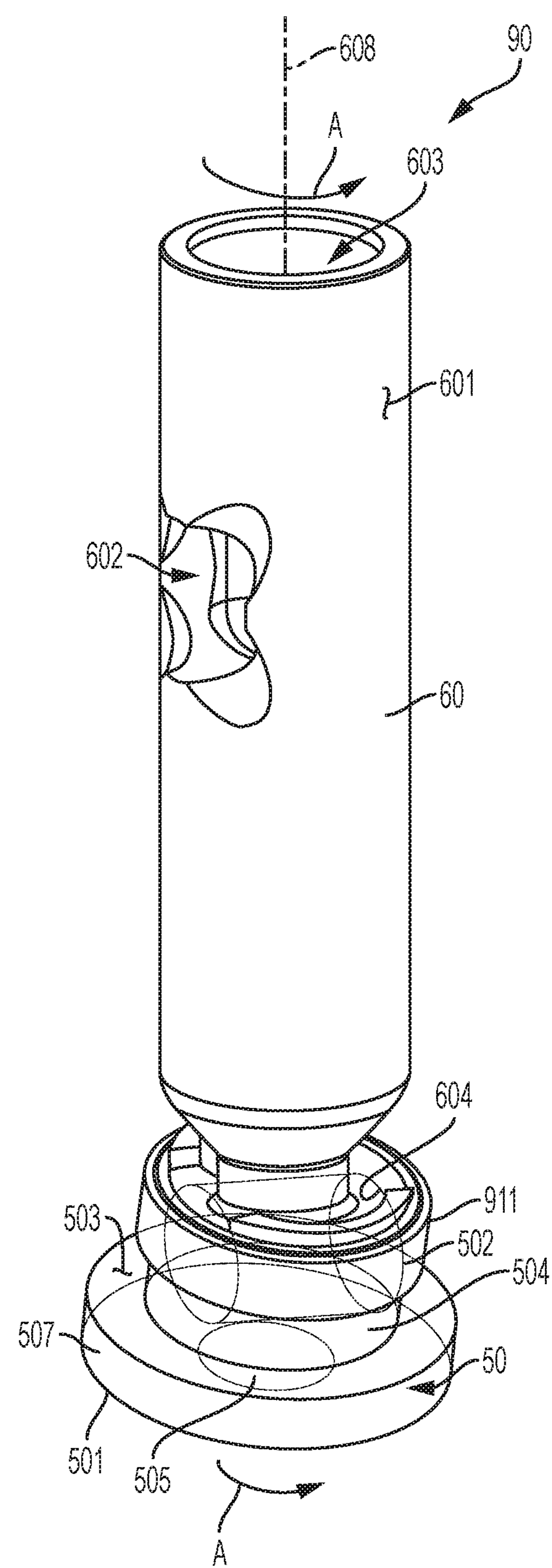
FIG. 7 illustrates a perspective view of the rotatable piston valve assembly of FIG. 6.

Referring to FIGS. 5 and 7, in an embodiment, each piston 60 includes a piston revolute joint interface 604 disposed at a distal end of the rotatable piston 60. The rotatable piston assembly 88 further includes a slipper assembly 50 for each piston 60. Rotation of the rotating swashplate 40 is configured to control a rotation of the rotatable piston 60 through a slipper assembly 50. The revolute joint interface 604 is shaped with a planar pair of opposing ends and a cylindrical center portion between the planar pair of opposing ends.

The slipper assembly 50 includes a slipper shoe 507 including the distal interface 501 configured to be disposed against the proximal interface 401 of a swashplate, such as the rotating swashplate 40. Each piston 60 is configured for a controlled rotation with respect to the rotating swashplate 40 through the seated connection of each respective slipper assembly 50. The slipper assembly 50 further includes a slipper neck 504, proximally extending from the slipper shoe 507, and a slipper revolute joint. While the slipper revolute joint is described herein to provide a controlled rotation of the rotatable piston 60 with respect to the slipper assembly 50, it is contemplated within the scope of this disclosure that other joints and/or structures to provide such a controlled rotation between the rotatable piston 60 and the slipper assembly 50 are within the scope of this disclosure.

The slipper joint includes a slipper revolute joint interface 502 configured to be received by the piston revolute joint interface 604 disposed at a distal end of the rotatable piston 60 such that translation of the slipper assembly 50 results in a corresponding translation of the respectively joined rotatable piston 60. The slipper revolute joint interface 502 includes a central portion defined by a pair of opposing central side walls defining an opening sized to receive the cylindrical center portion of the revolute joint interface 604 of the rotatable piston 60. The pair of opposing central side walls further define at opposite ends a U-shape opening, each U-shaped opening sized and shaped to correspond with a shape of a respective one of the planar pair of opposing ends of the revolute joint interface 604 of the rotatable piston 60. Thus, each rotatable piston 60 is able to pivot about a horizontal axis of rotation defined through and between the planar pair of opposing ends of the revolute joint interface 604 of the rotatable piston 60 when each rotatable piston 60 is disposed within a respective slipper revolute joint interface 502 but is constrained from pivoting about any other axis with respect to the planar pair of opposing ends. Further, rotation of each slipper assembly 50 will cause a corresponding rotation of the rotatable piston 60.

In embodiments, the slipper assembly 50 further comprises a slipper ring 911 (FIG. 5) configured to be disposed around the slipper neck 504 to maintain a fit between the piston revolute joint interface 604 and the slipper revolute joint interface 502 and provide an axial constraint to prevent movement of the rotatable piston 60 and the slipper assembly 50 relative to one another along a revolute joint interface axis. In embodiments, a retaining ring 910 may be disposed about a proximal end of the slipper ring 911 to retain the slipper ring 911 against the slipper assembly 50.

The connection between the slipper revolute joint interface 502 and the piston revolute joint interface 604 allows for a restriction of rotation freedom between the respective slipper assembly 50 and piston 60 such that a rotation of the respective slipper assembly 50 effects a corresponding rotation of the rotatable piston 60, and the rotatable piston 60 is not free to rotate with respect to the respective slipper assembly 50 independent of rotation of the respective slipper assembly 50. This is in contrast to, for example, a ball and socket spherical joint between a slipper assembly and a piston. While such a spherical joint would provide a translational constraint between the piston and the slipper assembly, rotational freedom about all axes would be permitted by the spherical joint such that the piston would be free to rotate within the spherical joint in multiple degrees of freedom independent of movement of a respectively joined slipper assembly. With the spherical joint, the piston is radially constrained by a cylinder bore 101 and fluid film therebetween, allowing for the piston to rotate and translate about a transverse axis where the transverse position of the piston is located by an inclined surface of the swashplate with respect to the piston. With the spherical joint, the piston-slipper assembly is rotationally constrained about the piston traverse axis by friction alone between a slipper-to-swashplate interface, a slipper-to-piston interface, and a piston-to-cylinder bore interface and the only resistance is friction. Friction forces of these three interfaces continuously compete to define a rotational orientation of the piston-slipper assembly having the spherical joint.

By contrast, the revolute joint between a joined rotatable piston 60 and slipper assembly 50 described herein provides a translation constraint therebetween and additionally restricts rotational freedom of the rotatable piston 60 with respect to the slipper assembly 50 to a single axis. Rotation of the rotatable piston 60 is restricted to rotation about a single bore axis of rotation 608 and is further dependent on rotation of the joined slipper assembly 50. Such a restricted rotation of the rotatable piston 60 provides for less frictional resistance of the rotatable piston 60 within the cylinder bore 101 leading to greater efficiency during reciprocating operation of the rotatable piston 60. Thus, a planar fluid bearing proximal interface 401 of the rotating swashplate 40 described herein is joined to the rotatable piston 60 by a slipper assembly 50 having a revolute joint connection therebetween to form a revolute joint piston-slipper assembly.

The proximal interface 401 of the rotating swashplate 40 is disposed at an adjustable angle with respect to a shaft axis of rotation 301, such as in a variable displacement machine to control the volumetric displacement of fluid. It is within the scope of this disclosure that the proximal interface 401 of the rotating swashplate 40 is disposed at a fixed angle with respect to a shaft axis of rotation 301, such as in a fixed displacement machine.

In an embodiment as a variable displacement machine, the proximal interface 401 of the rotating swashplate 40 is configured to adjust the adjustable angle with respect to the shaft axis of rotation 301 as the rotatable shaft 30 rotates such that a corresponding rotation of the rotating swashplate 40 forces the revolute joint piston-slipper assembly into a cylinder bore 101 having a bore longitudinal axis configured to act as a bore axis of rotation 608 for the rotatable piston 60. Further, a hold down plate 70 is configured to pull the revolute joint piston-slipper assembly out of the cylinder bore 101 by forcibly maintaining parallel contact between a planar proximal interface 401 of the rotating swashplate 40 and a planar distal interface 501 of each slipper assembly 50. The planar distal interface 501 of each slipper assembly 50 is configured to slide, in parallel, about the planar proximal interface 401 of the rotating swashplate 40. Further, each slipper assembly 50 may be translated in any direction perpendicular to a slipper assembly interface normal axis $N_{SL}$. Each slipper assembly interface normal axis $N_{SL}$ is normal to the planar distal interface 501 of each slipper assembly 50 and may be parallel to a rotating swashplate interface normal axis $N_{SW}$. The rotating swashplate interface normal axis $N_{SW}$ is normal to the planar proximal interface 401 of the rotating swashplate 40. Further, each slipper assembly 50 may be rotated about a respective slipper assembly interface normal axis $N_{SL}$ or a rotational axis parallel to the respective slipper assembly interface normal axis $N_{SL}$.

Such a revolute joint piston-slipper assembly interacting and interfacing with a planar fluid bearing proximal interface 401 of a rotating swashplate 40 as described herein, and that is configured to maintain a parallel orientation to an inclined plane of the rotating swashplate, provides a rotational phase. The revolute joint piston-slipper assembly is forced to maintain a 1:1 rotational phase with the rotating swashplate 40 and the rotatable shaft 30. The revolute joint piston-slipper assembly allows for the rotatable piston 60 and the slipper assembly 50 to rotate and pivot relative to one another about a single axis of rotation while constraining all other degrees of freedom such as translation and rotation about other axes as described herein. Relative motion between the revolute joint piston-slipper assembly and forces of the rotating swashplate 40 force the rotation and translation of the rotatable piston 60 relative to the cylinder bore 101 about a bore axis of rotation 608, where rotation of the rotatable piston 60 about the bore axis of rotation 608 reduces friction forces and improves mechanical efficiency of the axial piston machine 100. Rotation of the rotatable piston 60 relative to the cylinder bore 101 prevents the rotatable piston 60 from developing a static friction mode in which the rotatable piston 60 has stopped moving, such that the rotating rotatable piston 60 continually applies a dynamic friction resulting in a lower startup torque and an improved mechanical efficiency over a non-rotating piston incurring static friction.

Further, each slipper assembly 50 includes a hydrostatic bearing feature as described below to allow for a balance of fluid pressure forces acting on the revolute joint piston-slipper assembly. In an embodiment, and referring to FIG. 5, each slipper assembly 50 includes a hydrostatic pocket 505 defined by the distal interface 501 of the slipper assembly 50. Further, each slipper assembly 50 includes a lubrication port 506 in fluid communication with the hydrostatic pocket 505. In embodiments, the rotatable piston 60 further includes a lubrication port 606 in fluid communication with the valve passage 603. The lubrication port 606 of the rotatable piston 60 is in fluid communication with the lubrication port 506 of a respectively joined slipper assembly 50. The hydrostatic pocket 505 and the lubrication port 506 of each slipper assembly 50 and the lubrication port 606 and valve passage 603 of each piston 60 are configured to operate together to form a piston-slipper fluid pressure profile to create a pressure differential and provide for sealing and bearing lubrication.

For example, high working fluid pressure in the hydrostatic pocket 505 and the lubrication port 506 of each slipper assembly 50 and the lubrication port 606 and valve passage 603 of each piston 60 operate against a leakage pressure drop against the cylinder bore interface 601 of each piston 60 and the distal interface 501 and the revolute joint interface 502 of each slipper assembly 50. Fluid leakage is driven through small clearances in the rotatable piston valve assembly 90 through such a pressure differential between these locations that is a function of a piston-bore chamber pressure being greater than outer swash housing pressure based on fluid inside the swash housing 20 that surrounds the rotatable piston valve assembly 90, the rotating swashplate 40, and the rotatable shaft 30. The lubrication port 606 is disposed within the rotatable piston 60 and is in fluid communication with the lubrication port 506 disposed within the slipper assembly 50 to feed fluid into the hydrostatic pocket 505 and assist with balancing a majority of the piston-bore fluid pressure forces.

The forces react approximately equal and opposite to one another to provide an adequate balance and limited friction. For example, a pressure within the hydrostatic pocket 505 creates a force that is almost equal and opposite to a force of a piston chamber pressure on the rotatable piston 60. The hydrostatic pocket 505 disposed between the distal interface 501 of the slipper assembly 50 and the proximal interface 401 of the rotating swashplate 40 provides for a restriction to leakage within the hydrostatic pocket 505, which leakage provides fluid-film bearing lubrication and support between the distal interface 501 of the slipper assembly 50 and the proximal interface 401 of the rotating swashplate 40. Similarly, a piston-slipper interface between the revolute joint interface 604 of the rotatable piston 60 and the revolute joint interface 502 of the slipper assembly 50 is lubricated by fluid leakage flow through a small operating clearance gap between the lubrication port 606 of the rotatable piston 60 and the lubrication port 506 of the slipper assembly 50.

Each slipper assembly 50 interfaces against the rotating swashplate 40 by a planar joint formed by the interfacing interaction between the distal interface 501 of the slipper assembly 50 and the proximal interface 401 of the rotating swashplate 40. During operation, the distal interface 501 of the slipper assembly 50 and the proximal interface 401 of the rotating swashplate 40 remain in parallel due to forces pushing against the rotatable piston 60 and the slipper assembly 50 in a direction toward the rotating swashplate 40. Such forces are provided by fluid and friction forces from the cylinder bore 101 on the rotatable piston 60, and additionally by hold down forces as described above from the hold down plate 70 on the slipper assembly 50 in an embodiment including the hold down plate 70.

In embodiments, and referring to FIG. 5, the axial piston machine 100 may include a manifold 110 disposed within the stationary cylinder block 10 and the swash housing 20. The manifold 110 is configured for fluid communication with the rotatable piston assembly 88 and includes the proximal manifold port 106, a proximal manifold passage 104 in fluid communication with the proximal manifold port 106, the distal manifold port 202, a distal manifold passage 105 in fluid communication with the distal manifold port 202, an inward cylinder block port 102, and an outward cylinder block port 103. The proximal manifold port 106 is disposed at a proximal end of the manifold 110 within the stationary cylinder block 10, and the proximal manifold passage 104 includes a plurality of proximal manifold passage port openings. The inward cylinder block port 102 is disposed in the stationary cylinder block 10 and is in fluid communication with one of the plurality of proximal manifold passage port openings of the proximal manifold passage 104. The distal manifold port 202 is disposed along a side wall of the manifold 110 in the swash housing 20 distal to the proximal end of manifold 110, and the distal manifold passage 105 includes a distal manifold passage port opening. The outward cylinder block port is in fluid communication with the distal manifold passage port opening of the distal manifold passage 105.

In an embodiment, the rotatable piston assembly 88 may include a plurality of pistons 60, a plurality of slipper assemblies 50, and a respective plurality of outward cylinder block ports 103. Each slipper assembly 50 may be coupled to a respective piston 60 as described herein, and each piston 60 includes an integral valve port 602. Further, each piston 60 abuts one of the inward cylinder block ports 102 that is in fluid communication with one of the plurality of proximal manifold passage port openings of the proximal manifold passage 104. Additionally, each piston 60 abuts one of the plurality of outward cylinder block ports 103 that are in fluid communication with the distal manifold passage 105.

Referring to FIGS. 8A-9H, while positional operation of the rotatable piston valve assembly 90 with respect to a process for using an axial piston machine 100 as a pump and a motor is illustrated, similar positional operation of the rotatable piston assembly 88 that may include a separate, non-integral valve rather than the integral piston valve as described herein with respect to the rotatable piston valve assembly 90 is contemplated within the scope of this disclosure. The axial piston machine 100 includes the rotating swashplate 40, the stationary cylinder block 10, and the rotatable shaft 30 coupled to the rotating swashplate 40. The rotatable piston assembly 88 includes a rotatable piston 60, as described herein, that is reciprocated in a cylinder bore 101 of the stationary cylinder block 10 of the axial piston machine 100. In an embodiment including the rotatable piston valve assembly 90, the rotatable piston 60 includes an integral valve port 602 configured to provide a passage for fluid flow in one of a pump direction and a motor direction opposite the pump direction to respectively act as one of the pump and the motor. It is contemplated within the scope of this disclosure that operation of the piston in a first direction as the pump direction and a second, opposite direction as the motor direction as described herein may alternatively be an operation of the piston in the first direction to operate in the motor direction and the second, opposite direction as the pump direction. When the pump direction and the motor direction is described herein with respect to operation of the axial piston device to operate as a pump or a motor, it is to be understood that action as a pump is configured to provide for an intake of a low pressure fluid and a discharge of a high pressure fluid with respect to the axial piston device, and that action as a motor is configured to provide for an intake of a high pressure fluid and a discharge of a low pressure fluid with respect to the axial piston device, which may be any of the axial piston devices as described herein.

Further, while the pump direction and the motor direction is described herein with respect to operation of the axial piston device to operate as a pump or a motor, it is further contemplated within the scope of this disclosure that pumping or motoring may reference local fluid flow with respect to an operation of the rotatable piston within a cylinder bore of the axial piston device as described herein. By way of example, and not as a limitation, an action of driving a rotatable piston into a cylinder bore to align a piston valve, whether integral or separate from the rotatable piston, with a discharge cylinder port to discharge fluid into the cylinder port may be referenceable as a pumping operation of the rotatable piston to pump fluid from the rotatable piston with respect to local fluid flow. Further, an action of driving a rotatable piston out of and away from the cylinder bore to align a piston valve, whether integral or separate from the rotatable piston, with an intake cylinder port to receive fluid into the rotatable piston from the intake cylinder port may be referenceable as a motoring operation of the rotatable piston to provide or motor fluid into the rotatable piston with respect to local fluid flow.

The rotatable piston 60 is rotated in the cylinder bore 101 during reciprocation, and rotation of the rotatable piston 60 in the cylinder bore 101 is controlled through a rotational control assembly. As a non-limiting example, the rotation control assembly includes a plurality of rotatable pistons 60 and a plurality of slipper assemblies 50, each slipper assembly 50 joined with a rotatable piston 60 through a revolute joint connection, and each slipper assembly 50 disposed against an interface of the rotating swashplate 40, which is disposed at an adjustable angle with respect to a shaft axis of rotation 301 within an angle range between a first angle and a second angle opposite the first angle. Rotation of the rotating swashplate 40 is configured to rotate the rotational control assembly as described herein.

In embodiments, the rotatable shaft 30 is rotated about the shaft axis of rotation 301 to rotate the rotating swashplate 40 about the shaft axis of rotation 301. The plurality of slipper assemblies 50 of the rotatable piston valve assembly 90 rotate through rotation of the rotating swashplate 40, and the plurality of rotatable pistons 60 rotate about the bore axis of rotation 608 through rotation of the plurality of slipper assemblies 50. The plurality of slipper assemblies 50 are respectively joined to the plurality of rotatable pistons 60 through, for example, respective revolute joint connections.

As described above, the axial piston machine 100 includes a manifold 110 disposed within the stationary cylinder block 10 and the swash housing 20. When the axial piston machine 100 acts as a pump, as shown in FIGS. 8A-8D, for example, fluid is received in the pump direction flowing from a proximal end of the manifold 110 toward a distal side portion of the manifold 110 into the proximal manifold port 106 disposed at the proximal end of the manifold 110 within the stationary cylinder block 10. Fluid is further received into the proximal manifold passage 104 from the proximal manifold port 106, and fluid is received into a plurality of inward cylinder block ports 102 disposed in the stationary cylinder block 10 through respective openings of the proximal manifold passage 104. It is contemplated within the scope of this disclosure that the axial piston devices described herein may operate as a pump or a motor configured for fluid flow in a variety of directions, such as in one of four directions with respect to FIGS. 8A-8D. By way of example, and not as a limitation, the axial piston device 100 may operate (1) as a pump configured to utilize the proximal manifold port 106 as a discharge outlet, (2) as a pump configured to utilize the distal manifold passage 105 as a discharge outlet, (3) as a motor configured to utilize the proximal manifold port 106 as a discharge outlet, or (4) as a motor configured to utilize the distal manifold passage 105 as a discharge outlet. It is further contemplated within the scope of this disclosure that rotation in a first direction, such as a clockwise direction, to operate the axial piston device as one of a pump or a motor is configured to be reversed to a second direction opposite the first direction, such as a counter-clockwise direction, to reverse or flip the manifold and fluid flow direction such that the axial piston device may operate as the other of the pump or the motor.

Figure 8A:
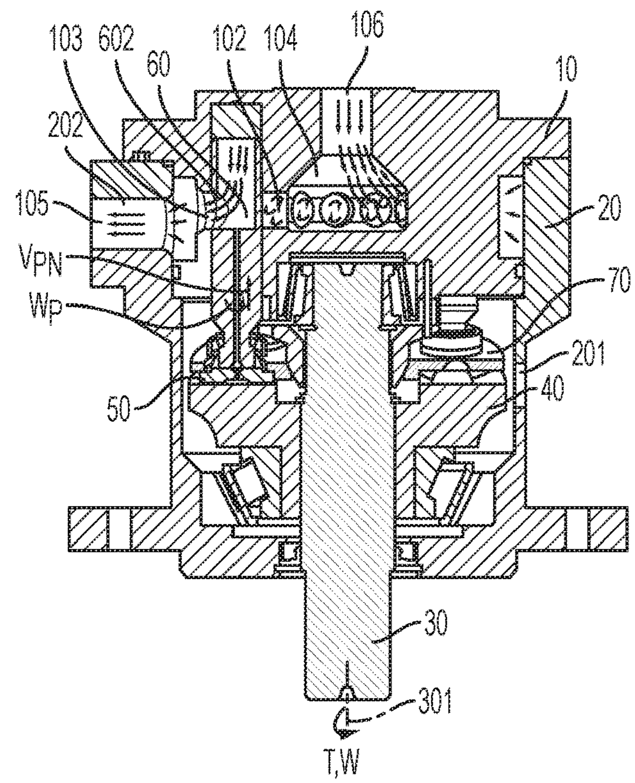
FIG. 8A illustrates a cross-sectional view of an outward position of a rotatable piston valve assembly of FIG. 7 in the axial piston device of FIG. 1 such that an integral piston valve of the rotatable piston valve assembly is aligned with a manifold outlet port of the axial piston device, according to one or more embodiments as shown and described herein.
Figure 8B:
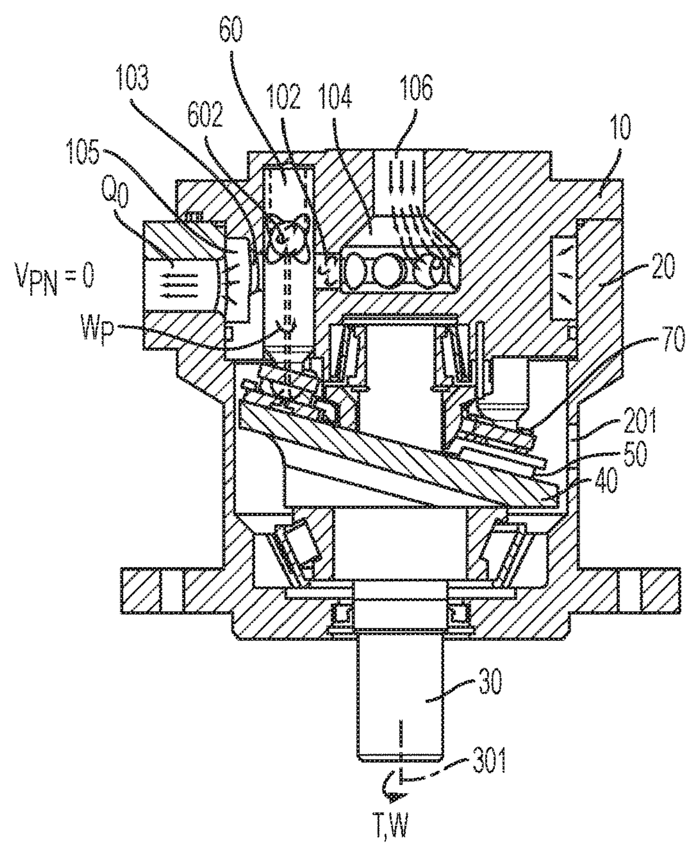
FIG. 8B illustrates a cross-sectional view of a forward intermediate position of the rotatable piston valve assembly of FIG. 7 in the axial piston device of FIG. 1 such that the integral piston valve of the rotatable piston valve assembly is positioned to face a first direction between and aligned with neither the manifold outlet port nor a manifold inlet port of the axial piston device, according to one or more embodiments as shown and described herein.
Figure 8C:
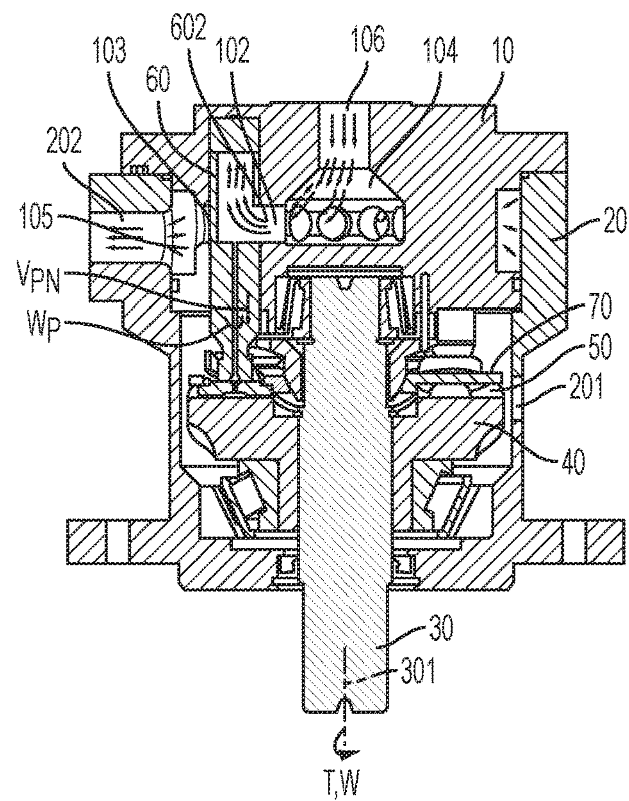
FIG. 8C illustrates a cross-sectional view of an inward position of the rotatable piston valve assembly of FIG. 7 in the axial piston device of FIG. 1 such that the integral piston valve of the rotatable piston valve assembly is aligned with the manifold inlet port of the axial piston device, according to one or more embodiments as shown and described herein.
Figure 8D:
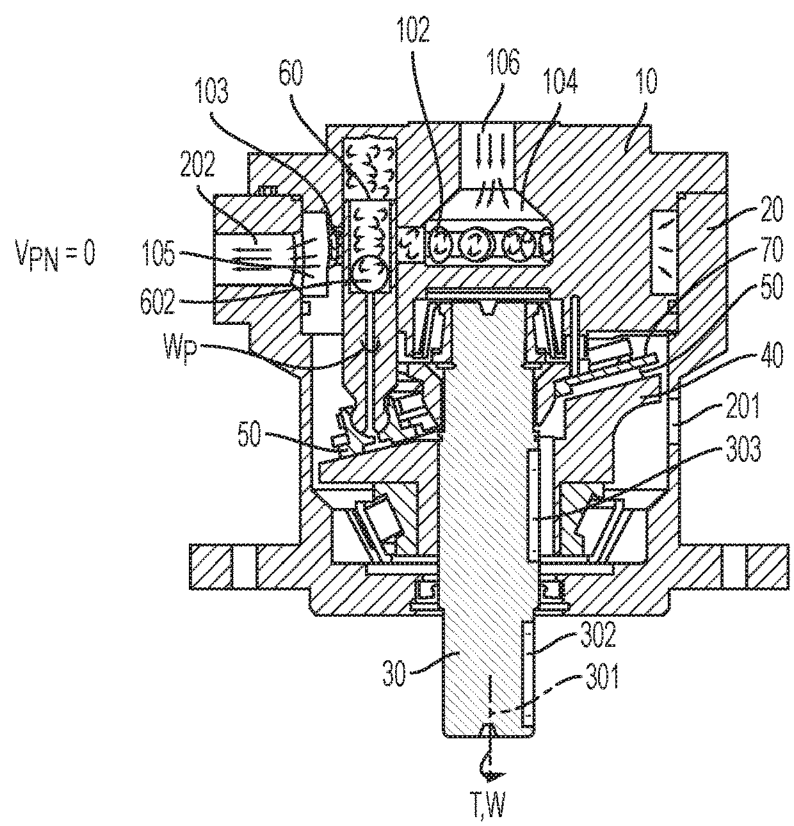
FIG. 8D illustrates a cross-sectional view of an intermediate rearward position of the rotatable piston valve assembly of FIG. 7 in the axial piston device of FIG. 1 such that the integral piston valve of the rotatable piston valve assembly is positioned to face a second direction, opposite the first direction of FIG. 8B, between and aligned with neither the manifold outlet port nor the manifold inlet port of the axial piston device, according to one or more embodiments as shown and described herein.
Figure 9A:
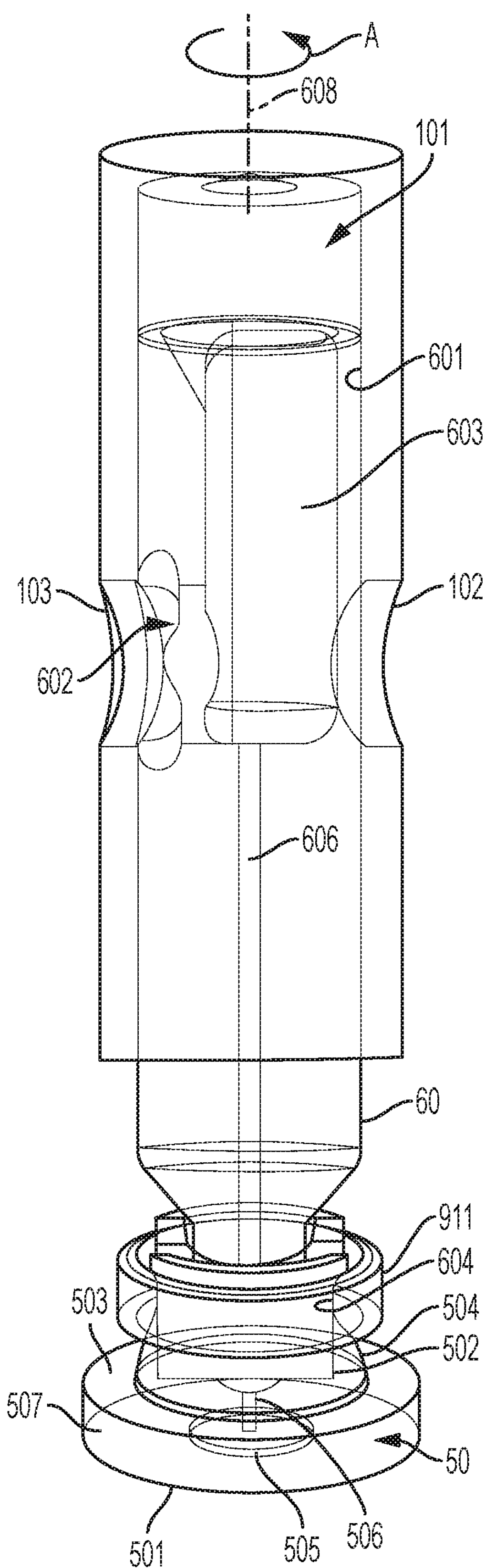
FIG. 9A illustrates a perspective view of a first position of the rotatable piston valve assembly of FIG. 7 in the outward position of FIG. 8A.
Figure 9B:
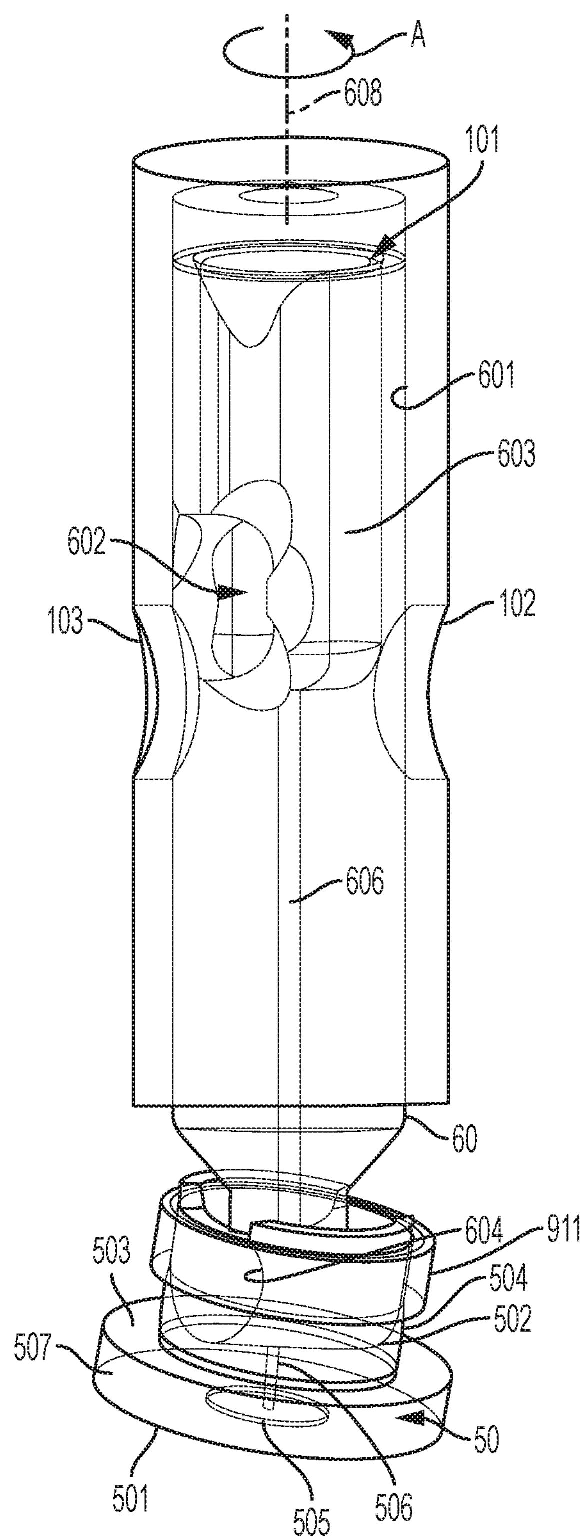
FIG. 9B illustrates a perspective view of a second position of the rotatable piston valve assembly of FIG. 7 in between the outward position of FIG. 8A and the forward intermediate position of FIG. 8B.
Figure 9C:
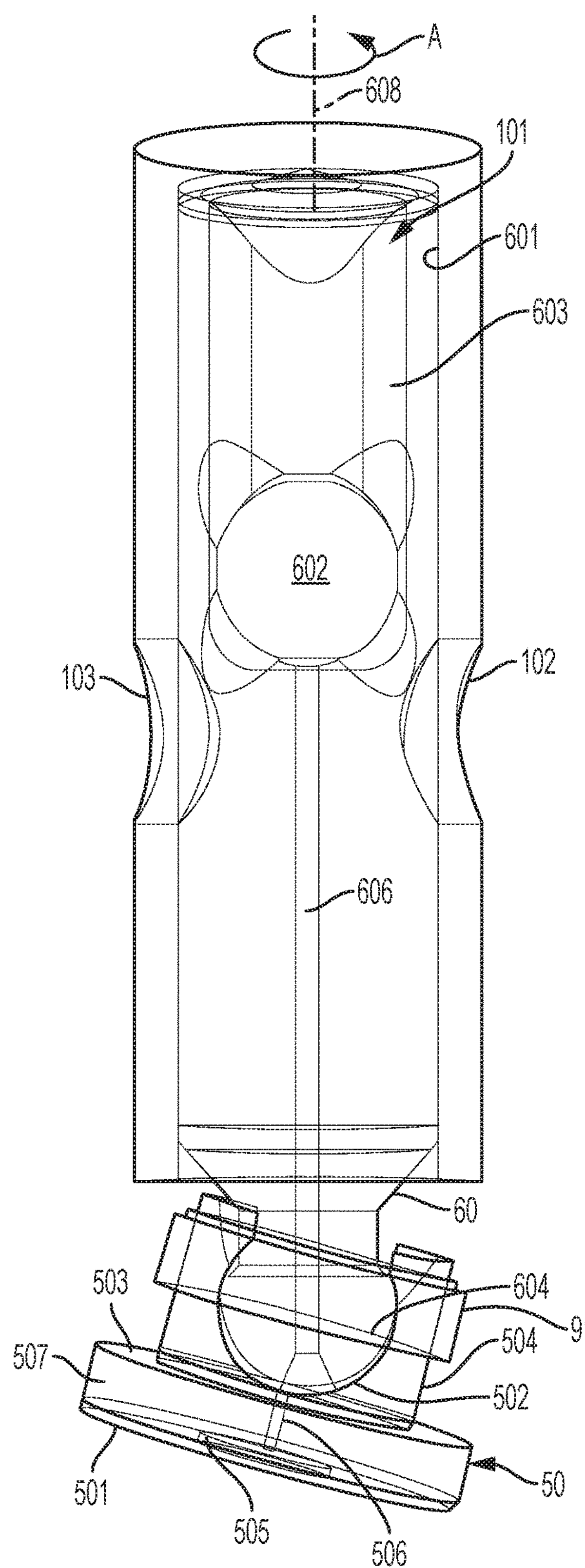
FIG. 9C illustrates a perspective view of a third position of the rotatable piston valve assembly of FIG. 7 in the forward intermediate position of FIG. 8B.
Figure 9D:
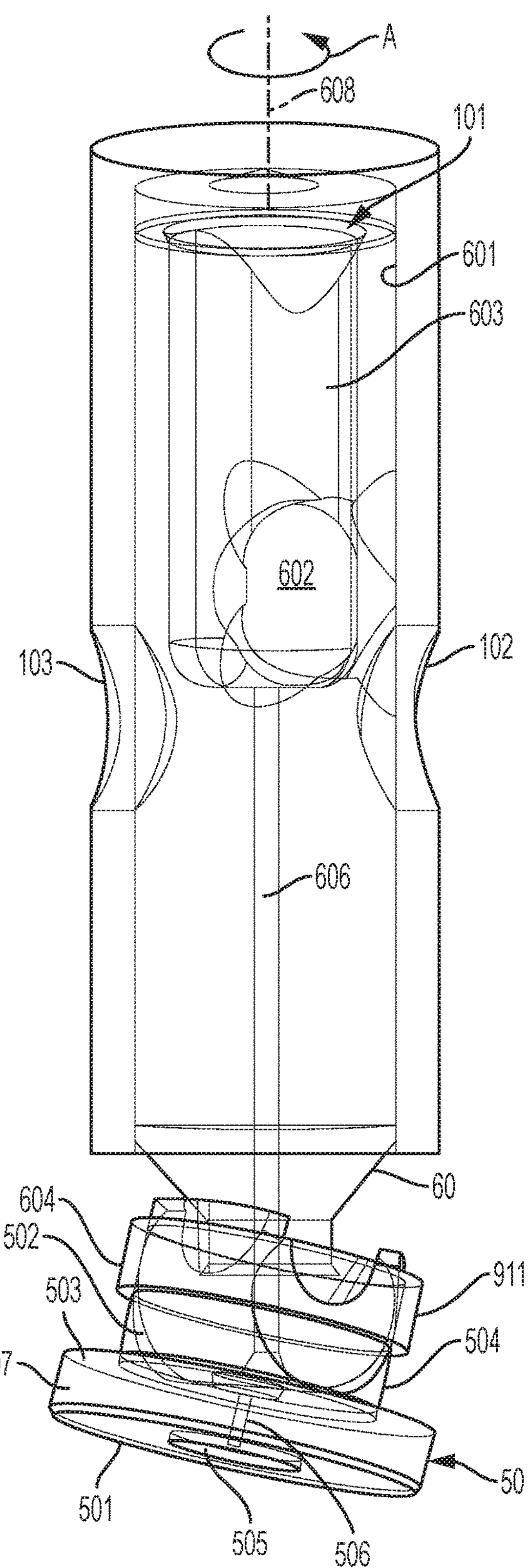
FIG. 9D illustrates a perspective view of a fourth position of the rotatable piston valve assembly of FIG. 7 in between the forward intermediate position of FIG. 8B and the inward position of FIG. 8C.
Figure 9E:
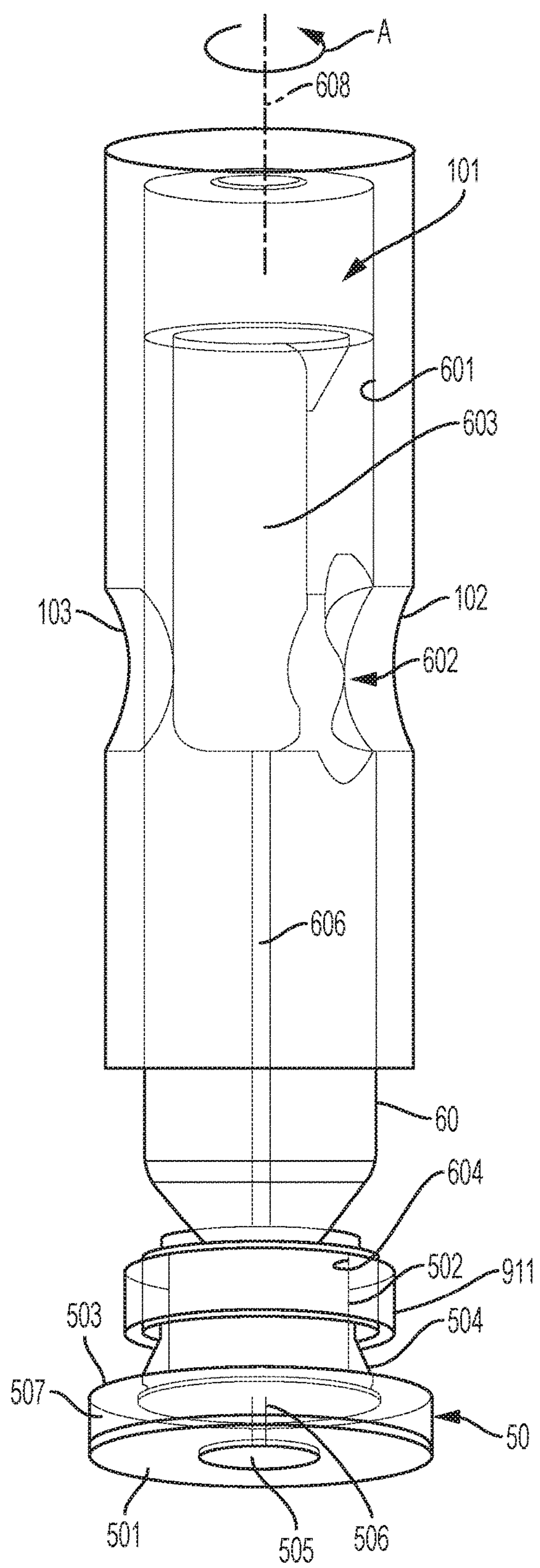
FIG. 9E illustrates a perspective view of a fifth position of the rotatable piston valve assembly of FIG. 7 in the inward position of FIG. 8C.

When the integral valve port 602 of a rotatable piston 60 of the plurality of rotatable pistons 60 is in fluid communication with a respective inward cylinder block port 102 as shown in FIGS. 8C and 9E, fluid is received into the integral valve port 602 to flow into the valve passage 603 of the rotatable piston 60. As the rotatable piston 60 rotates in the direction of arrow A to advance to a position shown in FIG. 9F, fluid communication between the respective inward cylinder block port 102 and the integral valve port 602 becomes more restricted. When the rotatable piston 60 is in the position shown in FIG. 9G, that corresponds to a position shown in FIG. 8D, the respective inward cylinder block port 102 is disengaged from the integral valve port 602.

As shown in FIGS. 8A and 9A, when the integral valve port 602 of the rotatable piston 60 is in fluid communication with a respective outward cylinder block port 103 of a plurality of outward cylinder block ports 103 disposed in the stationary cylinder block 10, fluid is directed from the valve passage 603 to flow through the integral valve port 602 and into the respective outward cylinder block port 103. Fluid is received into the distal manifold passage 105 that is in fluid communication with the plurality of outward cylinder block ports 103 and is discharged from the distal manifold port 202 in fluid communication with the distal manifold passage 105. As the rotatable piston 60 continues to rotate in the direction of arrow A to advance to a position shown in FIG. 9B, fluid communication between the respective outward cylinder block port 103 and the integral valve port 602 becomes more restricted. When the rotatable piston 60 is in the position shown in FIG. 9C, that corresponds to a position shown in FIG. 8B, the respective outward cylinder block port 103 is disengaged from the integral valve port 602.

When flow of fluid is in the pump direction, provided rotational movement of the rotatable shaft 30 rotates the rotating swashplate 40 to, in turn, rotate the rotatable piston valve assembly 90, and mechanical energy from rotating the rotatable shaft 30 is converted to hydraulic energy from the flow of fluid in the pump direction. For example, such rotational movement is provided by driving the rotatable shaft 30 by an external torque T at a rotational speed w, as shown in FIGS. 8A-8D, and the external torque and rotational speed are directly transferred to the rotating swashplate 40. An external source, such as a motor, may provide input mechanical power to use of the axial piston machine 100 as a pump, as the external torque T and the rotation speed w provided to the rotatable shaft 30 through an external drive feature 302 (FIG. 5) disposed on the rotatable shaft 30. The external drive feature 302 may be a key or spline or like drive feature connecting the rotatable shaft 30 to connect the rotatable shaft 30 to the external source. Further, the input torque and speed is directly transferred from the rotatable shaft 30 to the rotating swashplate 40 through a swashplate drive feature 303 (FIG. 5), such as a key, connecting the rotatable shaft 30 to the rotating swashplate 40. Rotation of the rotating swashplate 40 forces a plurality of rotatable pistons 60 to reciprocate proximally and distally within a plurality of respective cylinder bore 101 within the stationary cylinder block 10 as described herein. Each piston 60 is coupled to a slipper assembly 50 as described herein, such as through a revolute joint that provides rotational freedom and an axial constraint about the bore axis of rotation 608, such that translation and rotation of the rotatable piston 60 about the bore axis of rotation 608 is directly phased to an axial and rotation position of the slipper assembly 50. As the slipper assembly 50 interfaces with the rotating swashplate 40 through forces and fluid pressure differentials described herein, rotation of the rotating swashplate 40 effects a rotation of the plurality of slipper assemblies 50 and a phased rotation and translation of the respective plurality of joined rotatable pistons 60 within the plurality of cylinder bores 101. The input mechanical power is transformed to hydraulic power output as a pressurized flow discharged from the distal manifold passage 105 and the distal manifold port 202 as described herein.

When the axial piston machine 100 acts as a motor, fluid in the motor direction, opposite the pump direction, is provided from an external source such as a pump and flows from the distal side portion of the manifold 110 toward the proximal end of the manifold 110 into the distal manifold port 202 of the manifold 110. Fluid into the distal manifold passage 105 from the distal manifold port 202, the distal manifold passage 105 in fluid communication with the distal manifold port 202 and a plurality of outward cylinder block ports 103 disposed in the stationary cylinder block 10. When the integral valve port 602 of a rotatable piston 60 of the plurality of rotatable pistons 60 is in fluid communication with a respective outward cylinder block port 103 of a plurality of outward cylinder block ports 103, as shown in FIG. 9A, fluid is received into the integral valve port 602 from the distal manifold passage 105 and respective outward cylinder block port 103 and into the valve passage 603 of the rotatable piston 60 through the integral valve port 602. When the integral valve port 602 of the rotatable piston 60 is in fluid communication with a respective inward cylinder block port 102 of a plurality of inward cylinder block ports 102 disposed in the stationary cylinder block 10, as shown in FIG. 9E, fluid is received into the respective inward cylinder block port 102 from the integral valve port 602. Fluid is then received into a respective opening of a plurality of openings of a proximal manifold passage 104, which plurality of openings of the proximal manifold passage 104 are in respective fluid communication with the plurality of inward cylinder block ports 102. Fluid flows for receipt into the proximal manifold port 106 from the proximal manifold passage 104 and is discharged from the proximal manifold port 106. When flow of fluid is in the motor direction, the rotatable piston valve assembly 90 translates through the flow of fluid to rotate the rotating swashplate 40 to, in turn, rotate the rotatable shaft 30 and convert hydraulic energy from the flow of fluid in the motor direction to mechanical energy from rotation of the rotatable shaft 30. As a non-limiting example, motor fluid flow pressure forces the rotatable piston 60 of the rotatable piston valve assembly 90 to translate into the rotating swashplate 40, and an angle of the planar proximal interface 401 of the rotating swashplate 40 receiving this thrust load forces the rotating swashplate 40 to rotate. The slipper revolute joint forces the rotating piston 60 to spin and rotate along with the rotating swashplate 40 as the slipper assembly 50 is being rotationally forced in parallel with the planar proximal interface 401 of the rotating swashplate 40.

As the rotatable piston 60 rotates within a cylinder bore 101 at a rotational piston speed Wp, the rotatable piston 60 is additionally translated within the bore in a translation along the bore axis of rotation 608 at a translational piston velocity Vpn. A directional and axial position of the integral valve port 602 relative to a respective cylinder bore 101 is constantly changing as the rotating swashplate 40 rotates and forces rotation and translation of the rotatable piston 60 about the bore axis of rotation 608 that is coaxial with a cylinder bore axis of rotation.

By way of example, and not as a limitation, a position of the rotatable piston 60 in the cylinder bore 101 in FIG. 8A corresponds to a position of the rotatable piston 60 in FIG. 9A with respect to the integral valve port 602. In FIG. 8A, the integral valve port 602 of the rotatable piston 60 is aligned with the distal manifold port 202 such that a translational piston velocity Vpn translates the rotatable piston 60 in a direction toward a proximal end of the cylinder bore 101. As shown in FIG. 9A, a proximal end of the rotatable piston 60 is spaced from the proximal end of the cylinder bore 101 allowing for such proximal, upward translation of rotatable piston 60. As the rotatable piston 60 rotates in the direction of arrow A, as shown in FIGS. 9A-9B, and moves from the position shown in FIG. 8A (corresponding to FIG. 9A) toward the position of FIG. 8B (corresponding to FIG. 9C), the proximal end of the rotatable piston 60 translates proximally toward the proximal end of the cylinder bore 101, as illustrated by the proximally directed, upward Vpn arrow of FIG. 8A. In FIG. 9C, corresponding to the position of the rotatable piston 60 shown in FIG. 8B, the proximal end of the rotatable piston 60 is at a closest distance with respect to the proximal end of the cylinder bore 101 and will not proximally translate further in the cylinder bore 101, such that the translation piston velocity may be set to zero (Vpn=0). At such a position, the proximal interface 401 of the rotating swashplate 40 may be angled at a first angle with respect to the shaft axis of rotation 301.

Figure 9F:
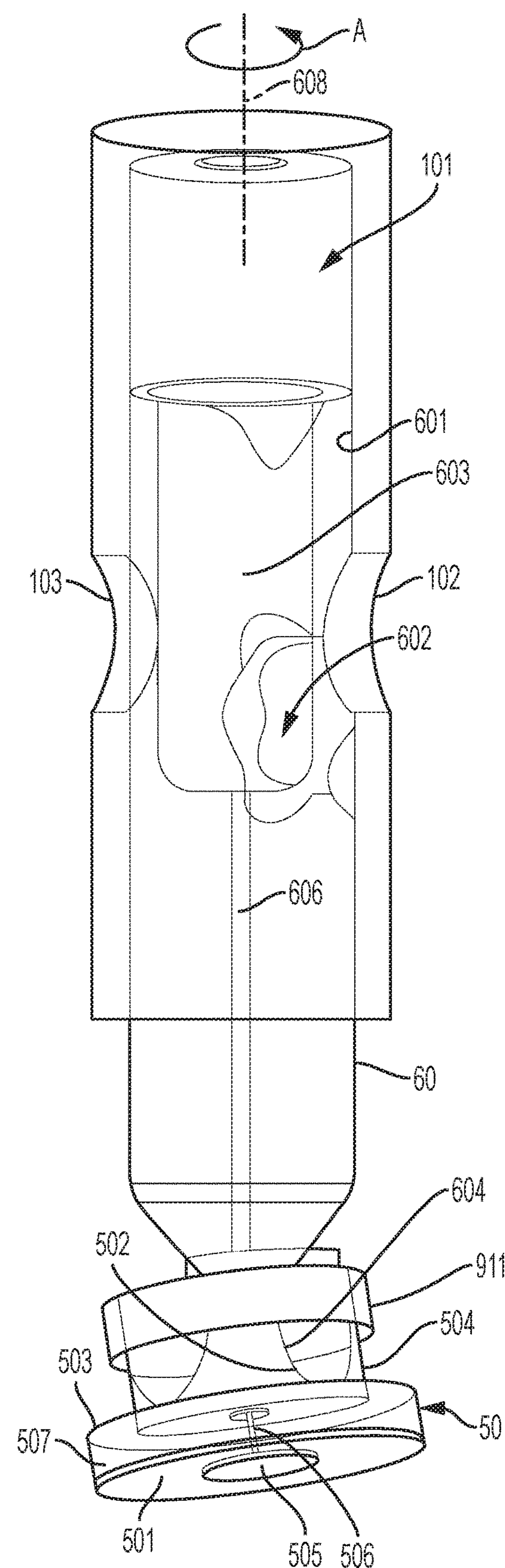
FIG. 9F illustrates a perspective view of a sixth position of the rotatable piston valve assembly of FIG. 7 in between the inward position of FIG. 8C and the intermediate rearward position of FIG. 8D.

As the rotatable piston 60 continues to rotate in the direction of arrow A, as shown in FIGS. 9C-9D, and moves from the position shown in FIG. 8B (corresponding to FIG. 9C) toward the position of FIG. 8C (corresponding to FIG. 9E), the proximal end of the rotatable piston 60 translates distally toward a distal end of the cylinder bore 101, as illustrated by the distally directed, downward Vpn arrow in FIG. 8C. Further, as the rotatable piston 60 continues to rotate in the direction of arrow A, as shown in FIGS. 9E-9F, and moves from the position shown in FIG. 8C (corresponding to FIG. 9E) toward the position of FIG. 8D (corresponding to FIG. 9G), the proximal end of the rotatable piston 60 continues to translate distally toward a distal end of the cylinder bore 101, as illustrated by the distally directed, downward Vpn arrow in FIG. 8C.

Figure 9G:
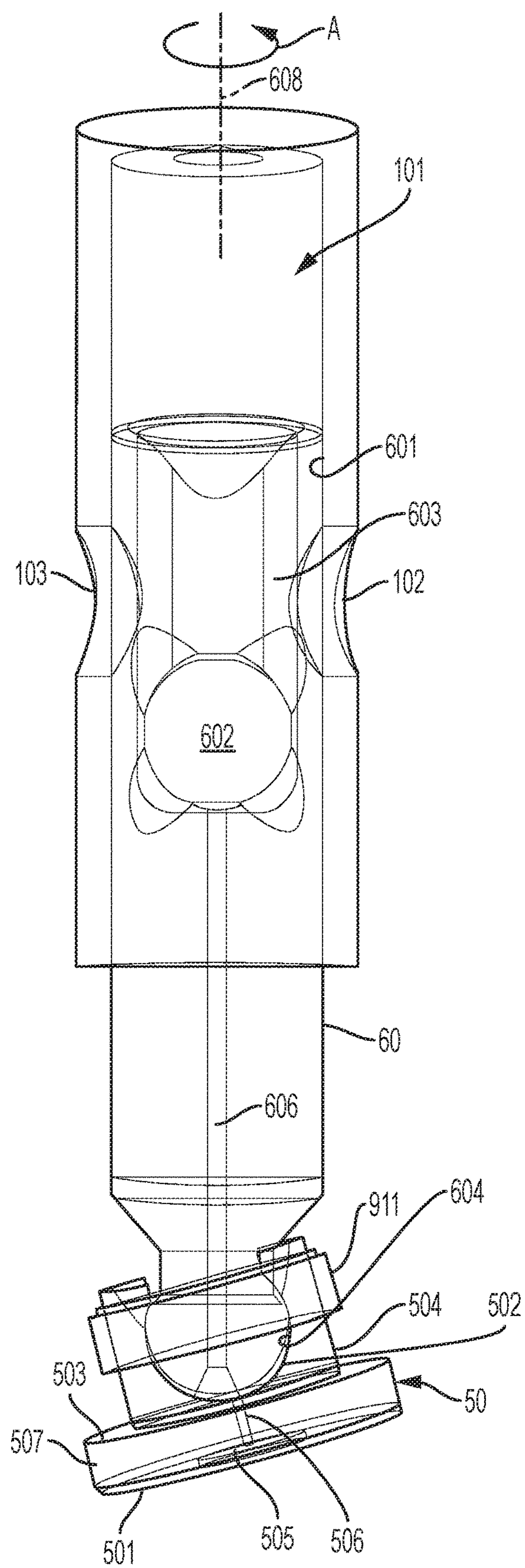
FIG. 9G illustrates a perspective view of a seventh position of the rotatable piston valve assembly of FIG. 7 in the intermediate rearward position of FIG. 8D.
Figure 9H:
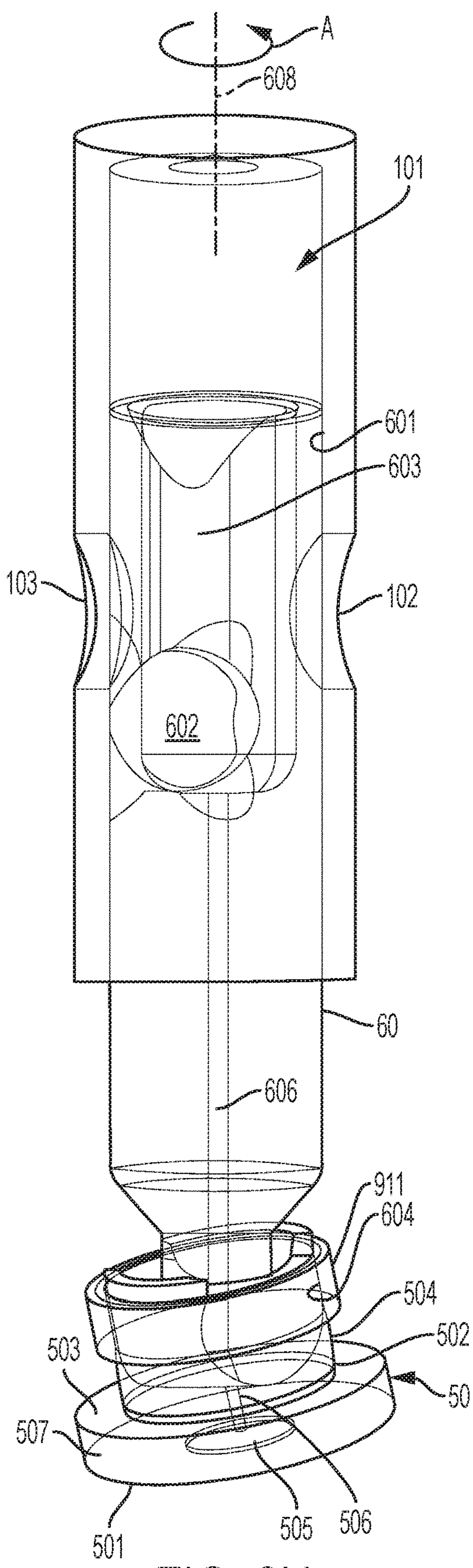
FIG. 9H illustrates a perspective view of a eighth position of the rotatable piston valve assembly of FIG. 7 in between the intermediate rearward position of FIG. 8D and the outward position of FIG. 8A.

In FIG. 9G, corresponding to the position of the rotatable piston 60 shown in FIG. 8D, the proximal end of the rotatable piston 60 is at a furthest distance with respect to the proximal end of the cylinder bore 101 and will not distally translate further in the cylinder bore 101, such that the translation piston velocity may again be set to zero (Vpn=0). At such a position, the proximal interface 401 of the rotating swashplate 40 may be angled at a second angle opposite the first angle with respect to the shaft axis of rotation 301. As the rotatable piston 60 rotates in the direction of arrow A, as shown in FIGS. 9G-9H, and moves from the position shown in FIG. 8D (corresponding to FIG. 9G) toward the position of FIG. 8A (corresponding to FIG. 9A), the proximal end of the rotatable piston 60 begins to translate proximally again toward the proximal end of the cylinder bore 101, as illustrated by the proximally directed, upward Vpn arrow of FIG. 8A.

Each rotatable piston 60 includes an integral valve port 602 defined within a cylinder bore interface 601 that cooperates with a respective inward cylinder block port 102 and a respective outward cylinder block port 103 of a respective cylinder bore 101 to control a distribution of flow to the cylinder bore 101 from either the proximal manifold passage 104 or the distal manifold passage 105 depending on a direction of flow as described herein. The valve passage 603 defined within the cylinder bore interface 601 of the rotatable piston 60 is configured to assist with providing a constant flow path between the cylinder bore 101 and the integral valve port 602, a position of which with respect to the cylinder bore 101 is constantly changes as the rotatable piston 60 rotates and translates within the cylinder bore 101. A position of the integral valve port 602 relative to the respective inward cylinder block port 102 and the respective outward cylinder block port 103 controls a distribution of flow through the continuously changing orifice area that is the area of port overlap between the integral valve port 602 and the respective inward cylinder block port 102 or the respective outward cylinder block port 103. Further, timing of rotational and translation movement of the integral valve port 602 is directly phased with the rotation and translation of rotatable piston 60.

For example, as the rotatable piston 60 is forced to translate proximally into the cylinder bore 101 through rotation of the slipper assembly 50 and the rotating swashplate 40 as described herein, the integral valve port 602 is moved to an outward position to fluidly communicate with the respective outward cylinder block port 103, as shown in FIGS. 8A and 9A. A sizing of the integral valve port 602 may be such that the integral valve port 602 is open to one of the respective inward cylinder block port 102 and the respective outward cylinder block port 103 at a time. Thus, while the integral valve port 602 is open to and in fluid communication with the respective outward cylinder block port 103, the cylinder bore interface 601 seals off the respective inward cylinder block port 102 from the valve passage 603.

As the rotatable piston 60 reaches an end of a proximal translation stroke as illustrated in FIGS. 8B and 9C, the integral valve port 602 is in a forward intermediate position and closes off from the respective outward cylinder block port 103 and is also closed off from the respective inward cylinder block port 102. As the rotatable piston 60 begins to be distally translated out from the cylinder bore 101, the integral valve port 602 begins to open up to the respective inward cylinder block port 102 into an inward position as shown in FIG. 8C to provide a flow path for fluid between the proximal manifold passage 104, the valve passage 603, and the cylinder bore 101. As the rotatable piston 60 reaches an end of a distal translation stroke as illustrated in FIGS. 8D and 9G, the integral valve port 602 is in a rearward intermediate position and closes off from the respective inward cylinder block port 102 and is also closed off from the respective outward cylinder block port 103. While valve port timing is described herein as a line to line porting that closes the integral valve port 602 off from both the respective outward cylinder block port 103 and the respective inward cylinder block port 102 at certain rotational positions in time, it is within the scope of this disclosure that closed and open porting techniques may be used such that the integral valve port 602 does not have to be closed off from both ports at any point in time.

The rotatable piston assembly described herein including a rotary piston, such as the rotatable piston 60, configured for rotational control is able to reduce friction, absorb unbalanced forces, and have greater performance capabilities over, for example, a non-rotating piston. A rotational control assembly as described herein controls rotation of the rotary piston to reduce static friction and increase piston efficiency in operation when used with a displacement machine. Further, combining such a bi-directional valve feature with the rotatable piston 60, as included through the integral valve port 602 described herein, removes a need to manufacture a separate valve component to operate with the piston and provides a lighter, integrated single component including both the piston and the valve.

The present disclosure with respect to at least FIGS. 10-27 is directed to a rotating swash mechanism type axial piston machine with a stationary cylinder block that can operate as a pump or a motor, though a stationary swash mechanism type piston machine with a rotating cylinder block with components and functionality as described herein to effect a controlled piston rotation is contemplated within the scope of this disclosure. As a pump, the axial piston machine acts to transfer mechanical energy to hydraulic energy by receiving torque and rotational speed through the shaft, and directing that received energy to a plurality of reciprocating pistons to displace pressurized fluid. In one non-limiting example, the swash mechanism is a swashplate. A rotating swashplate type axial piston machine with a stationary cylinder block may include a mechanically phased rotary valve, rather than a check-valve, along with a shaft-valve to provide for use of the rotating swashplate type axial piston machine as a pump and/or motor, and assist with absorbing unbalanced forces.

Another rotating swashplate type axial piston machine with a stationary cylinder block may include a rotational piston with an integral mechanically phased valve to provide for use of the rotating swashplate type axial piston machine as a pump and motor and assist with absorbing unbalanced forces.

The present disclosure with respect to at least FIGS. 10-13 describes a fixed, tilted displacement assembly including a plurality of rotatable piston with valve assemblies that can absorb unbalanced forces while further allowing for use of the rotating swash mechanism type axial piston machine as a pump and/or motor across different hydraulic systems, ranging from low pressure to high pressure hydraulic systems, such as those operating with loads at above 3000 psi. The axial piston machine includes bearing interfaces that act to generally cancel out and balance bearing forces, allowing for use of the axial piston machine in such high pressure hydraulic systems.

The displacement assembly, as described in greater detail further below, includes a swash collar assembly and may include one or more hydrostatic pressure pockets to balance forces. A swash collar of the swash collar assembly includes an angled, machined bore sized and shaped to receive and couple to the shaft. Upon rotation of the shaft coupled to the swash collar, the coupled wobble plate is configured to drive translation of a plurality of coupled rotatable piston with valve assemblies within the axial piston machine. One or more hydrostatic pressure pockets may be configured to cancel bearing forces between opposed pockets and create a moment coupling to counteract a moment on the wobble plate, thus assisting to balance forces. While the disclosure herein describes use of such a fixed, tilted displacement assembly with a rotating swash mechanism type axial piston machine, it is within the scope of this disclosure that one or more components of the displacement assembly described herein may be used with all fixed and variable displacement reciprocating piston type machines. By way of example and not limitation, the one or more hydrostatic pressure pockets as described herein may be used with either fixed or variable displacement reciprocating piston type machines.

Figure 10:
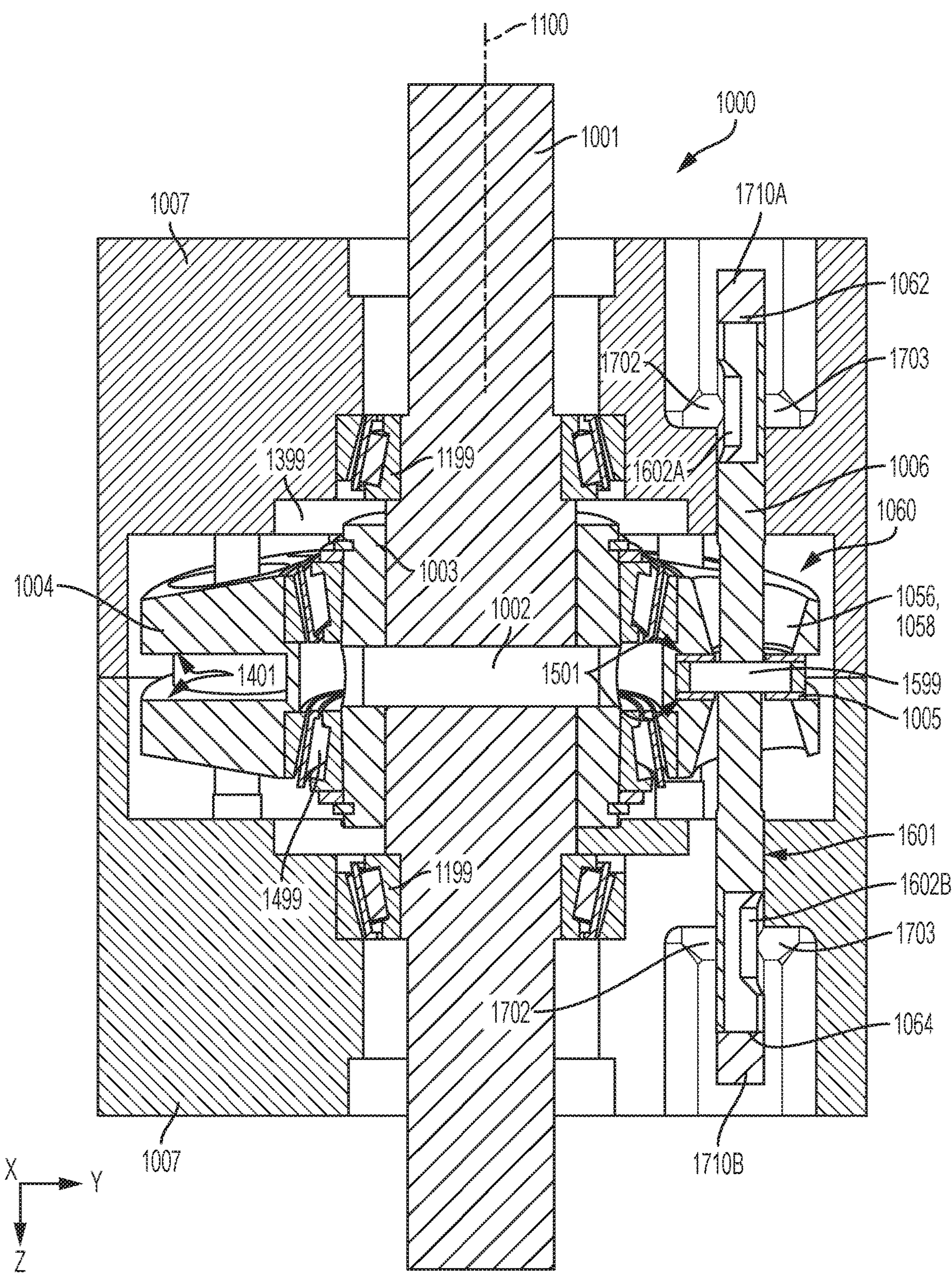
FIG. 10 illustrates a cross-sectional side view of an axial piston device with a fixed, tilted displacement assembly forwardly tilted with respective to a pin axis perpendicular to a longitudinal shaft axis of a shaft to depict a forward to backward tilt view, according to one or more embodiments as shown and described herein.

Referring to FIG. 10, an axial piston machine 1000 is illustrated. The axial piston machine 1000 may be a fixed displacement piston machine configured to drive and adjust the stroke of reciprocating pistons 1006 in a housing 1007 through a drive mechanism such as a tilted displacement assembly 1060 (FIG. 13) as described herein. Such a tilted displacement assembly 1060 is configured to drive the stroke of the reciprocating pistons 1006 of a plurality of rotatable piston with valve assemblies 1058 to direct a fluid displacement volume within the housing 1007, as described in greater detail below.

As a non-limiting example, the tilted displacement assembly 1060 of the axial piston machine 1000 of FIG. 10 that assists to drive one or more pistons 1006 may be disposed in a housing 1007. The tilted displacement assembly 1060 of FIG. 10 includes a shaft 1001, swash collar 1003, wobble plate 1004, slipper 1005, and piston 1006. The shaft 1001 is configured to transfer torque and speed between the swash collar 1003 and an external drive shaft and is coupled to the housing 1007. The shaft 1001 is coupled to the housing 1007 through a set of shaft support bearings 1199, for example. The swash plate 1003 includes a bore that may be machined and angled such that the bore is sized and shaped to receive and couple to the shaft 1001. In some embodiments, a hydrostatic pressure pocket on a partial circumference of the shaft 1001 in communication with shaft fluid passages is included. Addition of such a hydrostatic pressure pocket may improve bearing capabilities of the shaft 1001, and minimize loads on the shaft support bearings 1199.

Figure 11:
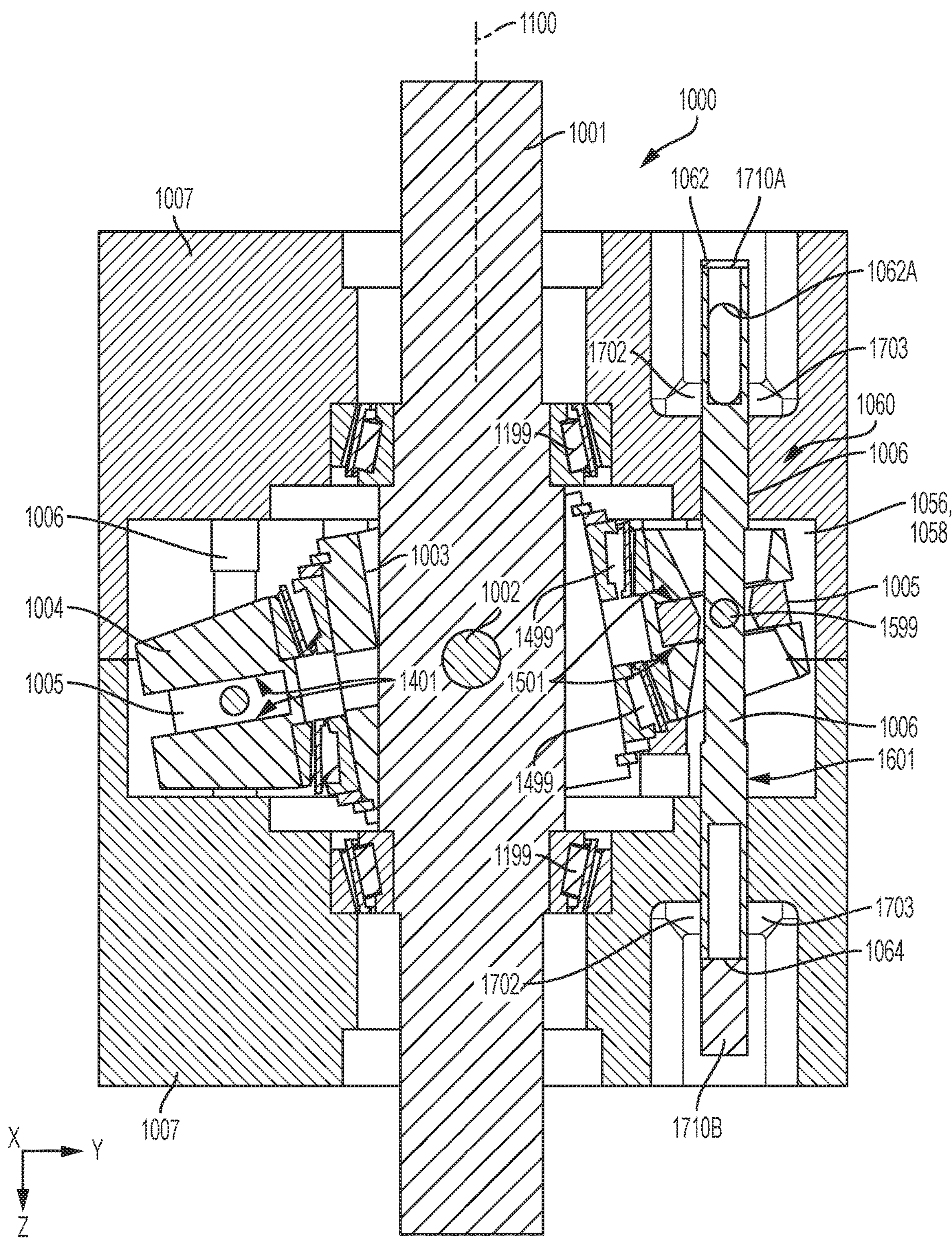
FIG. 11 illustrates a cross-sectional side view of the axial piston device of FIG. 10 with the tilted displacement assembly rotated about 90 degrees clockwise to depict a side-to-side tilt view, according to one or more embodiments as shown and described herein.

The swash collar 1003 is coupled to the shaft 1001 about a pin axis 1200 of pin 1002 disposed generally perpendicular to a longitudinal shaft axis 1100. Referring to FIG. 11, a tilt angle of the swash collar 1003, also referable to as a swash angle, is defined with respect to the shaft 1001, and particularly the pin axis 1200 of the pin 1002 coupled to the shaft 1001. Machines including a fixed swash angle as described herein are fixed displacement machines, and those including an adjustable swash angle are variable displacement machines. While the present disclosure describes use of a rotatable piston with valve assembly with respect to the axial piston machine 1000 as a fixed displacement machine, either such fixed or variable displacement machines may be used with the rotatable piston with separate or integral valve assemblies as described herein and are within the scope of the present disclosure.

FIG. 10 shows the wobble plate 4 at a fixed angle tilted with respect to the pin axis 1200 of the pin 1002 in a forward to backward tilt view. FIG. 11 shows the wobble plate 1004 in a side-to-side tilt view rotated 90 degrees clockwise from the view of FIG. 10 to show another view of the fixed angle tilted with respect to the pin axis 1200 of the pin 1002 that is generally perpendicular to the longitudinal shaft axis 1100 of the shaft 1001.

A plurality of piston slipper assemblies 1056, as described in greater detail further below, may be loaded such that net component forces of axial and radial forces acting upon the wobble plate 1004 may be mostly balanced and wobble plate support bearings 1499 will only to need to support moment loads of the piston forces. The wobble plate support bearings 1499 may then carry such moment loads with radial forces and limit a risk of issues that may arise with bearing tip, which may exist if axial bearings were instead used. A radial load support allows for smaller bearings to be used than would be used for an axial load support, which in turn may allow for a smaller overall machine envelope size and a reduction in cost and power losses. It is contemplated that other bearing types would be useful and effective in these embodiments, e.g., other roller bearing types and plain bearings that may or may not be hydrostatic bearings. By way of example and not as a limitation, the bearings described herein may be roller bearings, plain bearings, hydrostatic bearings, and fluid dynamic bearings. For example, a roller bearing may be used for applications desiring simplicity, availability, and low friction as provided by roller bearings, while a fluid bearing may be used instead of a roller bearing to accommodate for a smaller package size. Such fluid bearings utilized within the assembly and machine described herein may be configured to supply pressurized fluid to and from and between, respectively, the piston 1006, the slipper 1005, the wobble plate 1004, the swash collar 1003, the swash pin 1002, the shaft 1001, and the housing 1007.

The wobble plate 1004 is further configured to support forces from a working fluid pressure that is displaced by a plurality of piston slipper assemblies 1056 cooperating with the plurality of pistons 1006. Referring to FIGS. 10-13, each piston slipper assembly 1056 includes a piston 1006 coupled to a slipper 1005 through a fastener such as a slipper pin 1599. The wobble plate 1004 includes two opposed wobble plate bearing surfaces 1401. In an embodiment, the two wobble plate bearing surfaces 1401 are parallel to one another. The wobble plate bearing surfaces 1401 are coupled to a respective plurality of slipper surfaces 1501 of each slipper 1005.

In operation, the shaft 1001 may rotate either counter-clockwise or clockwise to effect a corresponding piston 1006 reciprocation. Torque and speed are transferred from the rotating shaft 1001 to the wobble plate 1004 through such couplings as described herein. An external motor may drive and provide torque and speed to the shaft 1001. The shaft 1001 in turn drives the pin 1002, which drives the swash collar 1003 and the wobble plate 1004 to effect translation of the pistons 1006 that are contained within respective piston bores defined within the housing 1007 of the stationary cylinder block. Slippers 1005 are coupled to respective pistons 1006 housed within the piston bores. The wobble plate 1004 includes interior surfaces 1401 that are disposed about slipper surfaces 1501 of each slipper 1005, and each slipper 1005 may slidably rotate within and with respect to the wobble plate 1004 through interfacing surfaces 1401, 1501 and in alignment with rotation of the shaft 1001, for example. As shown in FIGS. 10-11, during rotation, each slipper pin 1599 may initially be configured to face the same direction as the pin 1002 coupling the swash collar 1003 to the shaft 1001 and may rotate in alignment with the pin 1002 as the shaft 1001 rotates to effect a corresponding rotation of the slippers 1005. Rotation of each slipper 1005 effects a corresponding rotation of a respective piston 1006 to which the slipper 1005 is attached through the slipper pin 1599.

Figure 12:
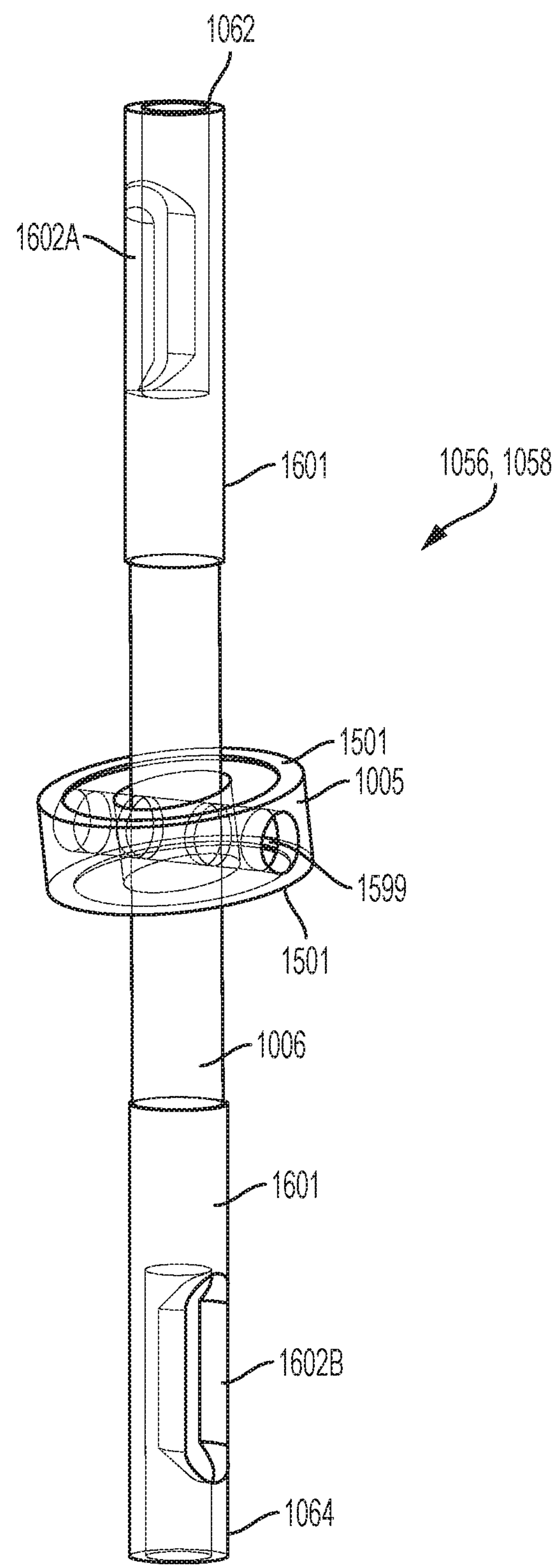
FIG. 12 illustrates a perspective view of a rotatable piston with valve assembly of the axial piston device of FIG. 10, according to one or more embodiments as shown and described herein.
Figure 13:
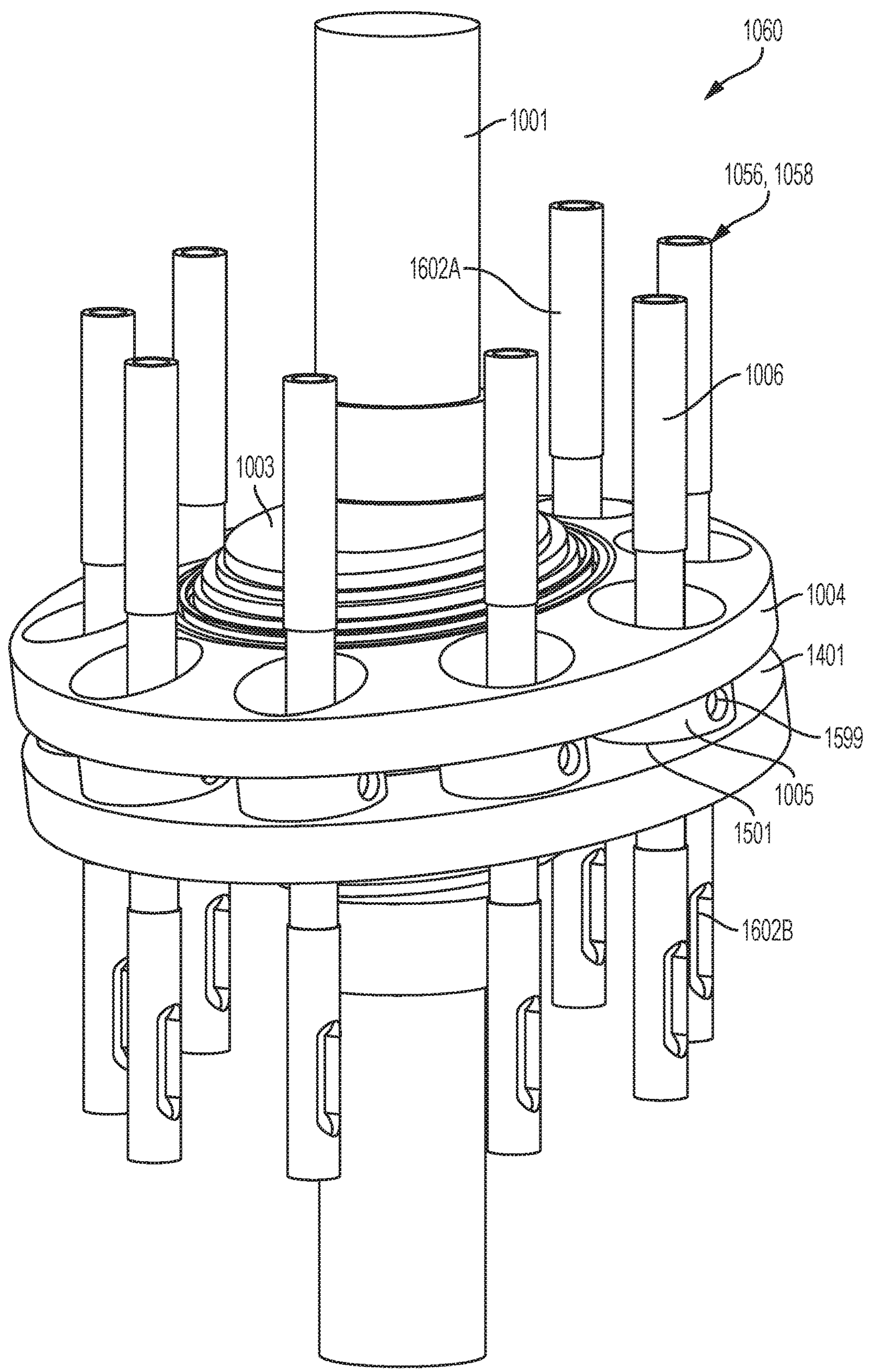
FIG. 13 illustrates a perspective view of the tilted displacement assembly of the axial piston device of FIG. 10 including a plurality of rotatable piston with valve assemblies, according to one or more embodiments as shown and described herein.

Referring to FIGS. 12-13, the piston slipper assembly 1056 is shown as a rotatable piston with valve assembly 1058, a plurality of which are shown in FIG. 13 as part of the tilted displacement assembly 1060. The rotatable piston with valve assembly 1058 includes a piston 1006 that includes first end 1062 and a second end 1064 opposing the first end 1062. Each of the first end 1062 and the second end 1064 respectively include a first valve port 1602A and a second valve port 1602B. It is contemplated within the scope of this disclosure that a rotatable piston assembly having a separate valve may be utilized in place of the rotatable piston with valve assembly 1058 including at least an integrated valve in the piston 1006. In an embodiment, a piston 1006 of the rotatable piston with valve assembly 1058 may include a single valve port 1602. The first valve port 1602A of the first end 1062 and the second valve port 1602B of the second end 1064 are configured to be 180 degrees apart to communicate with different cylinder ports of the housing 7, as described below. Other positions between the first valve port 1602A and the second valve port 1602B to interact with one or more ports of respective cylinder bores 1702 to direct fluid through the axial piston machine 1000 are within the scope of this disclosure.

Referring to FIG. 12, a slipper pin 1599 connects the slipper 1005 and the piston 1006 and is configured to be sized and shaped for receipt into respective bores of the slipper 1005 and the piston 1006 to lock the components together. The slipper pin 1599 acts to form the revolute joint connecting the slipper 1005 to the piston 1006 to constrain relative motion between the piston 1006 and the slipper 1005. As described above, the slipper 1005 includes opposing bearing surfaces 1501 configured to interact with wobble plate bearing surfaces 1401 as the slipper 1005 rotates through connection with the wobble plate 1004 and rotation of the shaft 1001. In an embodiment, the opposing bearing surfaces 1501 may be fluidly connected with respective first and second ends 1062, 1064 of the piston 1006 such that a majority of fluid pressure forces are balanced during rotational operation. As the slipper 1005 rotates, the slipper pin 1599 forming the revolute joint allows tilt of the piston 1006 within the slipper 1005 but does not permit independent translation and rotational movement of the piston 1006 with respect to the slipper 1005. Rotation of the slipper 1005 drives a corresponding rotation of the piston 1006 joined through the slipper pin 1599 such that the slipper 1005 and the piston 1006 are synchronously coupled in rotation and translation movement.

Each of the first end 1062 and the second end 1064 of each piston 1006 additionally include a cylinder bore interface 1601 configured to translationally interface with a respective piston bore 1710 as shown in FIGS. 10-11. As shown in a position of FIG. 10, the first valve port 1602A is configured to communicate with a cylinder port 1702 of the piston bore 1710A while the second valve port 1602B is open to and communicates with a cylinder port 1703 of the piston bore 1710B. As the first end 1062 of the piston 1006 translates upwardly into a respective piston bore 1710A, the second end 1064 moves upwardly out of a respective piston bore 1710B. Through such translation and upward movement, as shown between FIGS. 10-11, the piston 1006 rotates to a position such that neither the first valve port 1602A nor the second valve port 1602B are in communication with the cylinder ports 1702, 1703, as shown in FIG. 12, and therefore are closed with respect to the cylinder ports 1702, 1703.

As the piston 1006 continues to rotate, the first end 1062 of the piston 1006 will translate downwardly out of the respective piston bore 1710A, and the second end 1064 will translate downwardly into the respective piston bore 1710B. In such a position, the first valve port 1602A is configured to communicate with the cylinder port 1703 of the piston bore 1710A while the second valve port 1602B is open to and communicates with the cylinder port 1702 of the piston bore 1710B. As the piston 1006 continues to rotate, the first end 1062 of the piston 1006 will begins to translate upwardly into the respective piston bore 1710A, and the second end 1064 will translate upwardly out of the respective piston bore 1710B to arrive back at the position of FIG. 10. In an embodiment, such as when operating as a pump, for example, fluid may be received from the cylinder port 1703 of the piston bores 1710A, 1710B when in open communication with a respective valve port 1602A, 1602B, and fluid may be sent out through the cylinder port 1702 of the piston bores 1710A, 1710B when in open communication with the respective valve port 1602A, 1602B.

The axial piston machine 1000 described herein is a reciprocating piston device utilizing fixed displacement and balanced bearing forces to enable operation in high pressure hydraulic systems with a smaller structure, increased efficiency and control, and reduced noise that can be realized through use of the double-sided wobble plate drive mechanism. Such a double-sided wobble plate drive mechanism as described herein provides for a reduction in rotating mass (i.e., moment of inertia) leading to an increased shaft rotational acceleration, a reduction in swash mass leading to faster fluid displacement control, a compact design leading to reduced material and use cost and a smaller envelope size of the machine, a piston configuration leading to a reduction in flow ripple, noise, and friction, and a rotating swash collar assembly including balanced loads leading to improved efficiency and reduced structural noise transmitted to the housing through bearings. Commercial uses for the axial piston machine 0 include use as a piston pump, motor, engine, or compressor. These often find application in the drive and control industry on equipment. Such equipment includes stationary industrial equipment and mobile equipment such as vehicles, aircraft, ships, and the like.

The present disclosure with respect to at least FIGS. 14-27 describes a variable displacement assembly that can absorb unbalanced forces while further allowing for use of the rotating swash mechanism type axial piston machine as a pump and/or motor across different hydraulic systems, ranging from low pressure to high pressure hydraulic systems operating with loads at above 3000 psi. The axial piston machine includes bearing interfaces that act to generally cancel out and balance bearing forces, allowing for use of the axial piston machine in such high pressure hydraulic systems.

The variable displacement assembly, as described in greater detail further below, includes a swash collar assembly including one or more hydrostatic pressure pockets to balance forces; and a piston and spring assembly configured to control tilt of a wobble plate coupled to a swash collar. Upon rotation of the swash collar through rotation of a coupled shaft, the wobble plate is configured to tilt with respect to the shaft through use of the piston and spring assembly and to drive pistons within the axial piston machine. The one or more hydrostatic pressure pockets are configured to cancel bearing forces between opposed pockets and create a moment coupling to counteract a moment on the wobble plate, thus assisting to balance forces. While the disclosure herein describes use of such a variable displacement assembly with a rotating swash mechanism type axial piston machine, it is within the scope of this disclosure that one or more components of the variable displacement assembly described herein may be used with all fixed and variable displacement reciprocating piston type machines, including, but not limited to, a rotating cylinder block type axial piston machine. By way of example and not limitation, the one or more hydrostatic pressure pockets may be used with either fixed or variable displacement reciprocating piston type machines.

Figure 14:
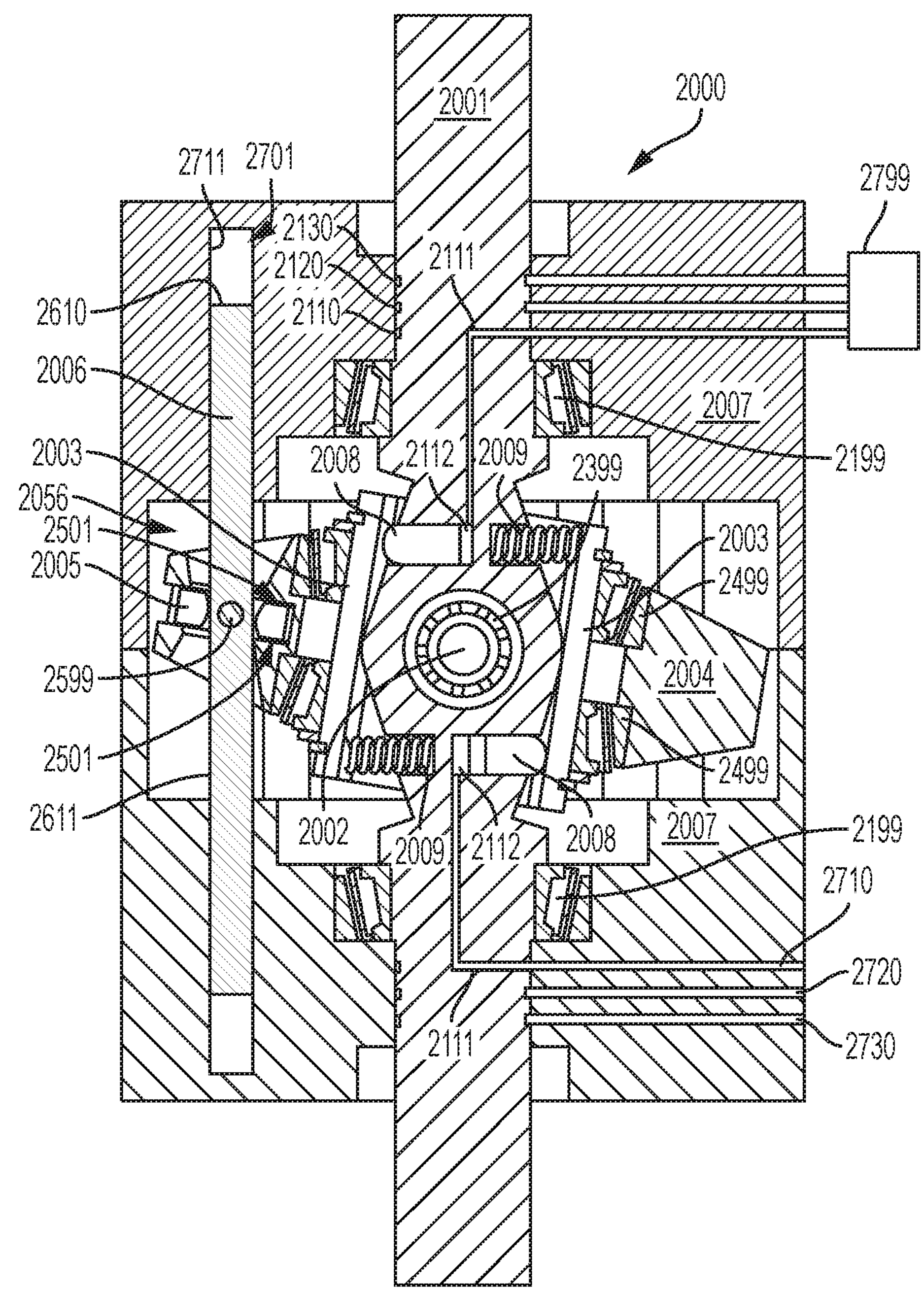
FIG. 14 illustrates a cross-sectional side view of an axial piston device with a tilted variable displacement assembly tilted with respective to a pin axis perpendicular to a longitudinal shaft axis of a shaft, according to one or more embodiments as shown and described herein.

Referring to FIG. 14, an axial piston machine 2000 is illustrated. The axial piston machine 2000 may be a positive displacement variable piston machine configured to drive and adjust the stroke of reciprocating pistons 2006 in a housing 2007 through an adjustment drive mechanism such as a variable displacement assembly as described herein. Such a variable displacement assembly is configured to adjust the stroke of the reciprocating pistons 2006 to change a fluid displacement volume within the housing 2007.

As a non-limiting example, the variable displacement assembly of the axial piston machine 2000 of FIG. 14 that assists to drive one or more pistons 2006 may be disposed in a housing 2007. The variable displacement assembly of FIG. 14 includes a shaft 2001, swash collar 2003, wobble plate 2004, slipper 2005, and piston 2006. The shaft 2001 is configured to transfer torque and speed between the swash collar 2003 and an external drive shaft and is coupled to the housing 2007. The shaft 2001 is coupled to the housing 2007 through a set of shaft support bearings 2199, for example. In some embodiments, a hydrostatic pressure pocket on a partial circumference of the shaft 2001 in communication with shaft fluid passages 2120, 2130 is included. Addition of such a hydrostatic pressure pocket may improve bearing capabilities of the shaft 2001, and minimize loads on the shaft support bearings 2199.

Figure 15:
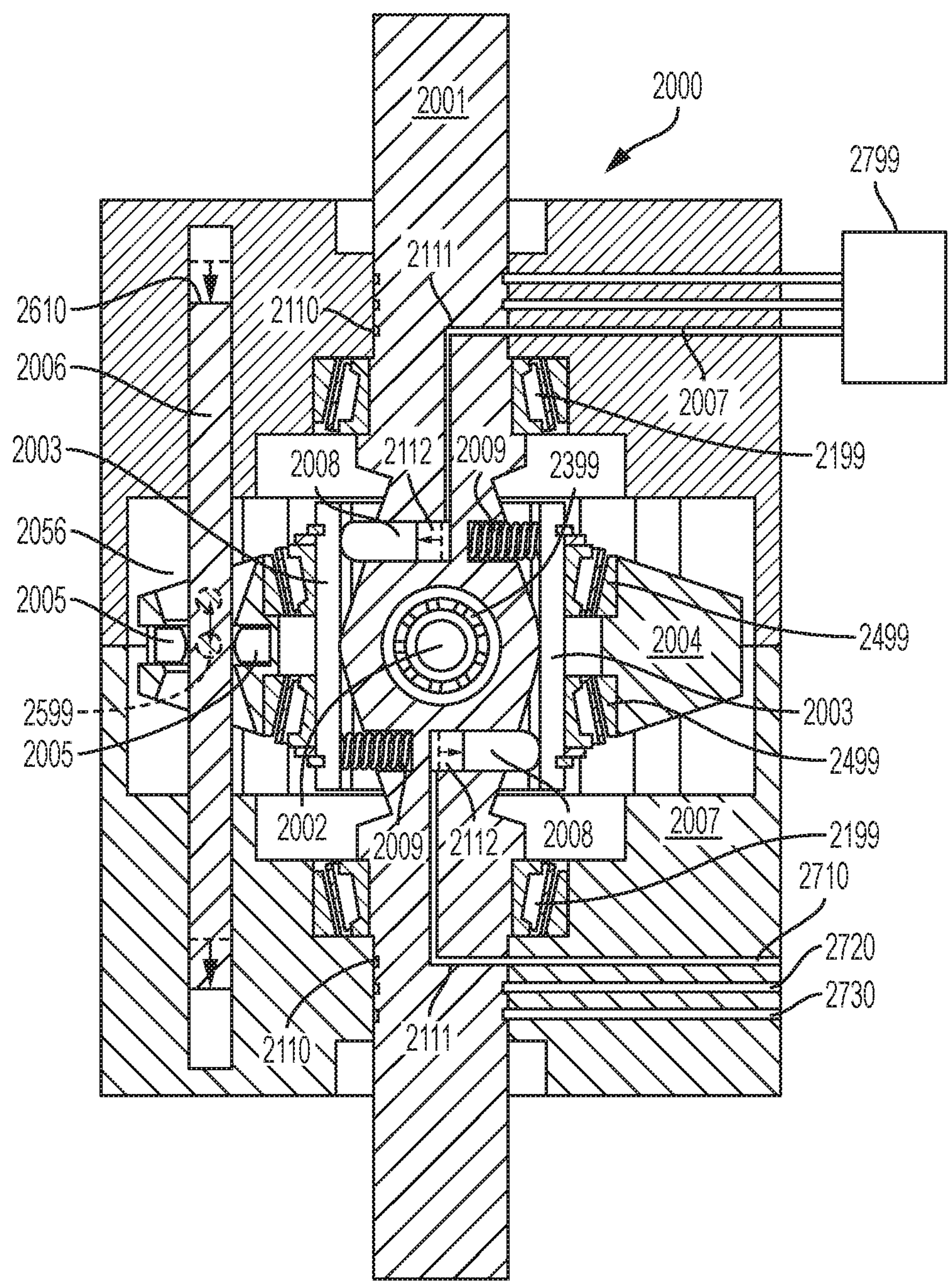
FIG. 15 illustrates a cross-sectional side view of the axial piston device of FIG. 14 with the variable displacement assembly generally parallel and not tilted with respect to the pin axis and perpendicular to the longitudinal shaft axis of the shaft.
Figure 16:
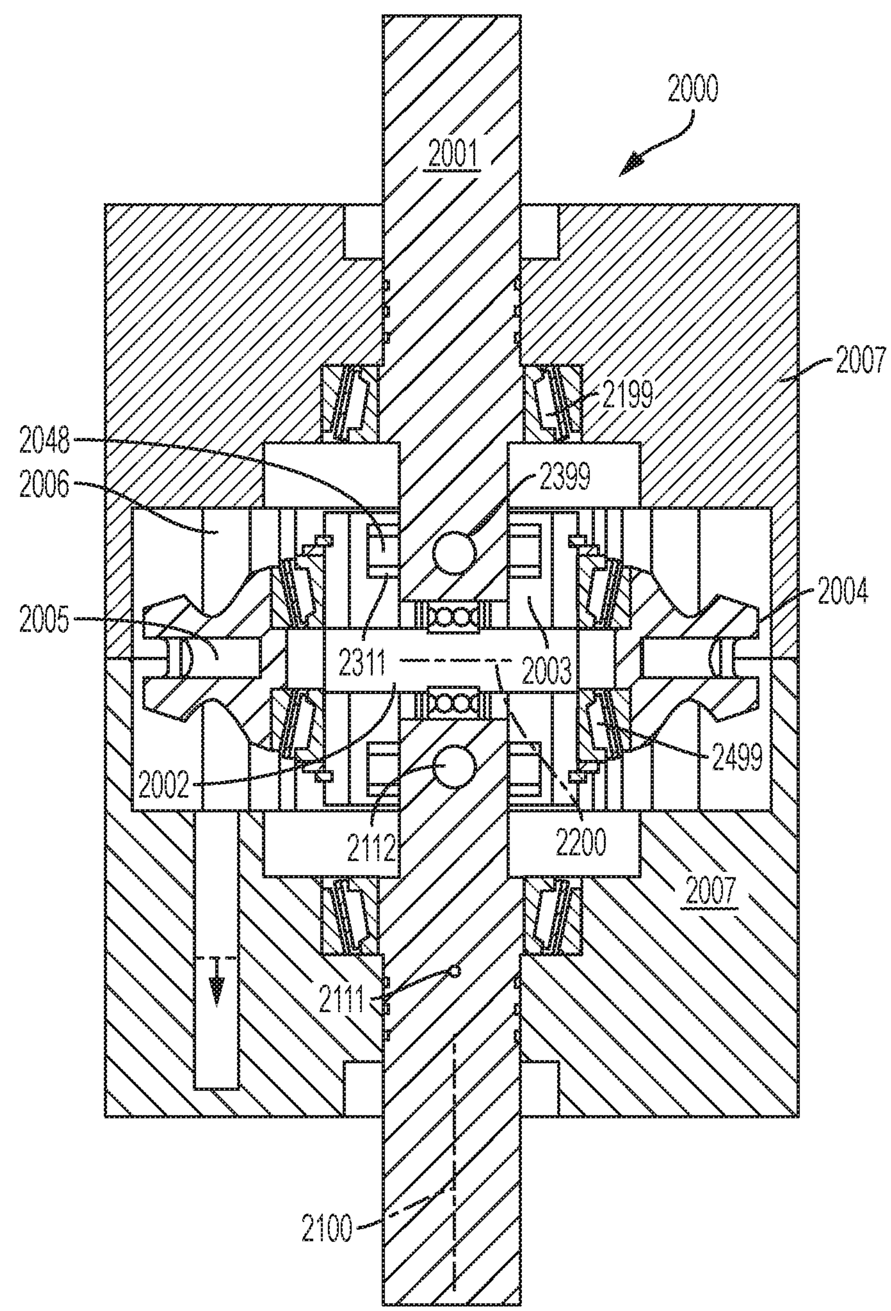
FIG. 16 illustrates another cross-sectional side view of the axial piston device of FIG. 14.

The swash collar 2003 is tiltably and rotatably coupled to the shaft 2001 about a pin axis 2200 of pin 2002 (FIG. 16) disposed generally perpendicular to a longitudinal shaft axis 2100 (FIG. 16). The shaft 2001 is further coupled to the swash collar 2003 of the variable displacement assembly through a set of swash collar support bearings 2399 (FIGS. 14-18) and a swash pin 2002. The swash collar support bearings 2399 are configured to support moment loads of the piston 2006 and any unbalanced component forces. A packaging including the swash collar support bearings 2399 is disposed inside the swash collar 2003, and is configured to limit an effect moment arm and the load capabilities of the swash collar support bearings 1399.

Referring to FIG. 15, a tilt angle of the swash collar 2003, also referable to as a swash angle, is defined with respect to the shaft 2001, and particularly the pin axis 2200 of the pin 2002 coupled to the shaft 2001. Machines including a fixed swash angle are fixed displacement machines, and those including an adjustable swash angle as described herein are variable displacement machines. FIG. 14 shows the wobble plate 2004 at a tilted angle with respect to the pin axis 2200 of the pin 2002. FIG. 16 shows the wobble plate 2004 generally parallel and not tilted to have a zero tilt angle with respect to the pin axis 2200 of the pin 2002 and generally perpendicular to the longitudinal shaft axis 2100 of the shaft 2001.

Adjustment of the tilt angle controls fluid volume displacement within the axial piston machine 2000. An adjustment of the tilt angle of the swash collar 2003 is controlled by a control piston 2008 and a bias spring 2009. The bias spring 2009 is supported by the shaft 2001 and is coupled to the swash collar 2003. The bias spring 2009 is configured to force swash collar 2003 to which the bias spring 2009 is coupled to a position of maximum tilt with respect to the shaft 2001. Additionally, the control piston 2008 is supported by the shaft 2001 and is coupled to the swash collar 2003. A control piston chamber 2112 cooperates with the control piston 2008, such that the control piston 2008 is configured to reciprocate within a bore defining the control piston chamber 2112. The control piston chamber 2112 is configured to be supplied with a pressurized control fluid such that the control piston 2008 is forced in a direction toward and into the swash collar 2003. A stroke of the control piston 2008 is adjusted when a force of the control piston 2008 is great enough to overcome a moment of the force of the bias spring 2009, in addition to any unbalanced piston moments. The pressurized control fluid is supplied to the control piston chamber 2112 by a shaft fluid passage 2110, 2111 configured to be in fluid communication with a housing fluid passage 2710, and is supplied and controlled by an externally coupled flow control device 2799.

The wobble plate 2004 is coupled to the swash collar 2003 through opposed wobble plate support bearings 2499. These wobble plate support bearings 2499 may be, for example, a set of angular contact, tapered roller bearings disposed on first and second ends of the wobble plate 2004. The set of angular contact, tapered roller bearings is configured to provide an effective radial load at a distance from a bearing interface, which provides for a greater moment arm than a non-angular contact bearing, for example, resulting in greater moment load capabilities. It is contemplated that other bearing types would be useful and effective in these embodiments, e.g., other roller bearing types and plain bearings that may or may not be hydrostatic bearings. By way of example and not as a limitation, the bearings described herein may be roller bearings, plain bearings, hydrostatic bearings, and fluid dynamic bearings. For example, a roller bearing may be used for applications desiring simplicity, availability, and low friction as provided by roller bearings, while a fluid bearing may be used instead of a roller bearing to accommodate for a smaller package size. Such fluid bearings utilized within the assembly and machine described herein may be configured to supply pressurized fluid to and from and between, respectively, the piston 2006, the slipper 2005, the wobble plate 2004, the swash collar 2003, the swash pin 2002, the shaft 2001, and the housing 2007.

A plurality of pistons 2006 may be loaded such that net component forces of axial and radial forces acting upon the wobble plate 4 may be mostly balanced and wobble plate support bearings 2499 will only to need to support moment loads of the piston forces. The wobble plate support bearings 2499 may then carry such moment loads with radial forces and limit a risk of issues that may arise with bearing tip, which may exist if axial bearings were instead used. A radial load support allows for smaller bearings to be used than would be used for an axial load support, which in turn may allow for a smaller overall machine envelope size and a reduction in cost and power losses.

The wobble plate 2004 is further configured to support forces from a working fluid pressure that is displaced by a plurality of piston slipper assemblies 2056 cooperating with the plurality of pistons 2006. It is contemplated within the scope of this disclosure that the plurality of pistons 2006 may include an integral valve as described herein or may cooperate with a separate valve to direct fluid through the axial piston machine 2000. Each piston slipper assembly 2056 includes a piston 2006 coupled to a slipper 2005 through a fastener such as a slipper pin 2599. The wobble plate 2004 includes two opposed wobble plate bearing surfaces 2401. In an embodiment, the two wobble plate bearing surfaces 2401 are parallel to one another. The wobble plate bearing surfaces 2401 are coupled to respective plurality of slipper surfaces 2501 of each slipper 2005.

Additional bearing components of the axial piston machine 2000 include hydrostatic pressure pockets 2310 included at an interface of the swash collar 2003 and the shaft 2001. In particular, a hydrostatic pressure pocket 2310 may be defined within an interior wall surface of the swash collar 2003 facing an exterior wall surface of the shaft 2001. Such hydrostatic pressure pockets 2310 provide a moment on the swash collar 2003 that is mostly equal and opposite to a piston moment load and that in effect reduced loads carried by the swash collar support bearings 2399. Fluid pressure is supplied through shaft fluid passages 2121, 2131 (FIG. 19) in fluid cooperation with housing fluid passages 2720, 2730 that are connected to a fluid inlet and outlet of the axial piston machine 2000. Use of the working fluid pressure to counter act piston moment loads may increase the power capabilities of the axial piston while reducing machine size and cost.

Figure 17:
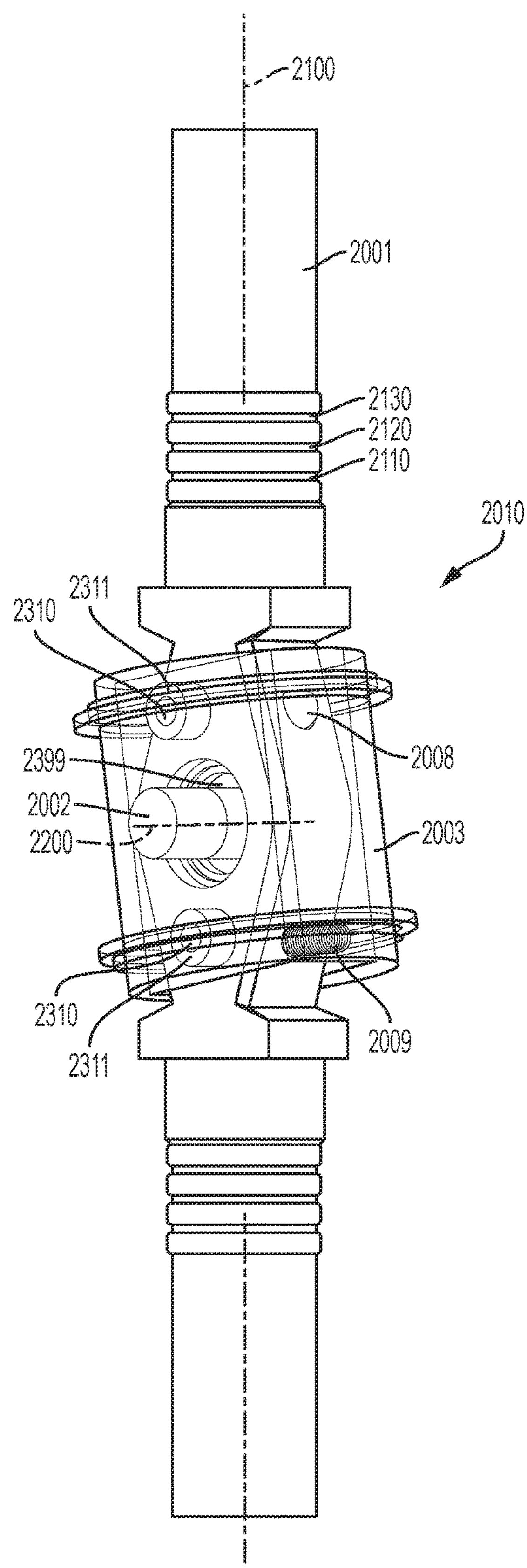
FIG. 17 illustrates a perspective view of a shaft and collar assembly of the variable displacement assembly of the axial piston device of FIG. 14.
Figure 18:
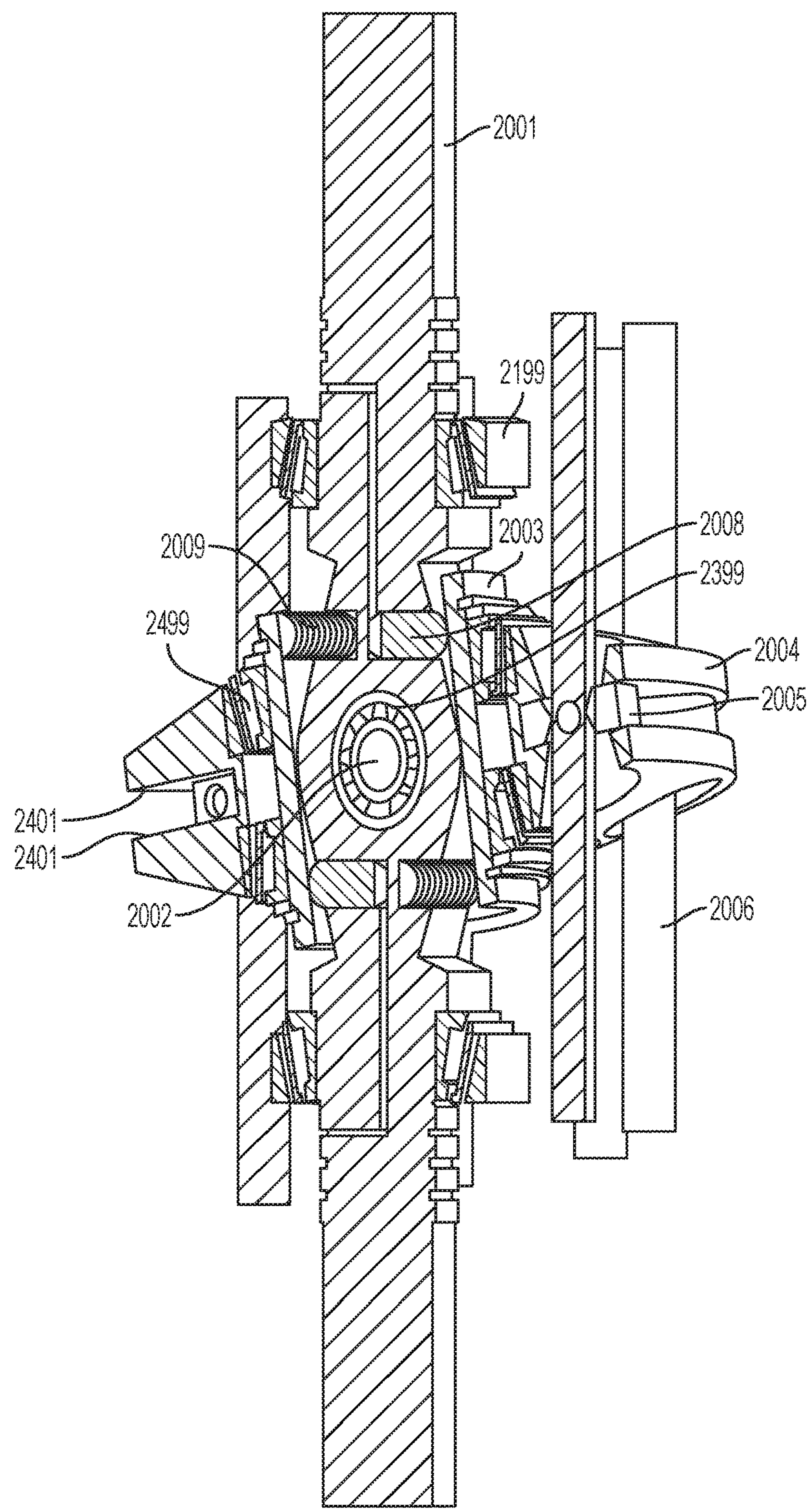
FIG. 18 illustrates a perspective view of the variable displacement assembly of the axial piston device of FIG. 14.

In embodiments, and referring to FIGS. 16-17, a seal 2311 may be disposed between the exterior wall surface of the shaft 2001 and the interior wall surface of the swash collar 2003 defining the hydrostatic pressure pocket 2310 to provide a seal about the hydrostatic pressure pocket 2310. The seal 2311 may be an o-ring or other suitable sealing structure as understood by those of ordinary skill in the art.

Figure 19:
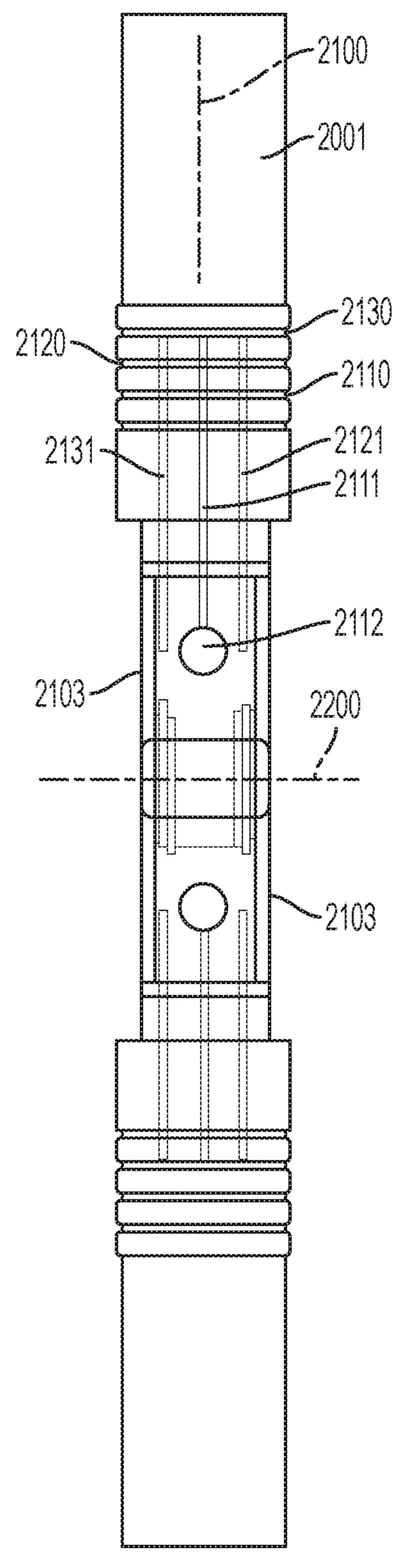
FIG. 19 illustrates a side view of the shaft of the axial piston device of FIG. 14.

Further, referring to FIGS. 16 and 19, working fluid is configured to flow through the shaft fluid passages 2121, 2131 (FIG. 19) to a respectively aligned hydrostatic pressure pocket 2310. By way of example and not limitation, in operation, working fluid flows through a left-side shaft fluid passage 2131 as shown in FIG. 19 to be received by a top left side hydrostatic pressure pocket 2310 of FIGS. 16 and 27 and by an opposite, diagonally disposed bottom right side hydrostatic pressure pocket 2310. Similarly, working fluid flows through a right-side shaft fluid passage 2121 as shown in FIG. 19 to be received by a top right side hydrostatic pressure pocket 2310 of FIGS. 16 and 27 and by an opposite, diagonally disposed bottom left side hydrostatic pressure pocket 2310. The flow of the pressurized fluid between these pairs of diagonally opposite hydrostatic pressure pockets 2310 cancels respective bearing forces and creates a moment coupling to counter moment on the wobble plate 2004. The moment on the wobble plate is transferred to the swash collar 2003 through a set of wobble plate support bearings 2499, for example, and is counteracted by the moment created by the hydrostatic pressure pockets 2310 to balance forces. Such balanced bearing forces allow the variable displacement axial piston machine 2000 described herein, which includes interface bearings to couple the wobble plate 2004, swash collar 2003, and shaft 2001, to be utilized in high pressure, heavy duty hydraulic systems, such as those capable of carrying loads above a range of from about 3000 psi to 5000 psi.

Figure 22:
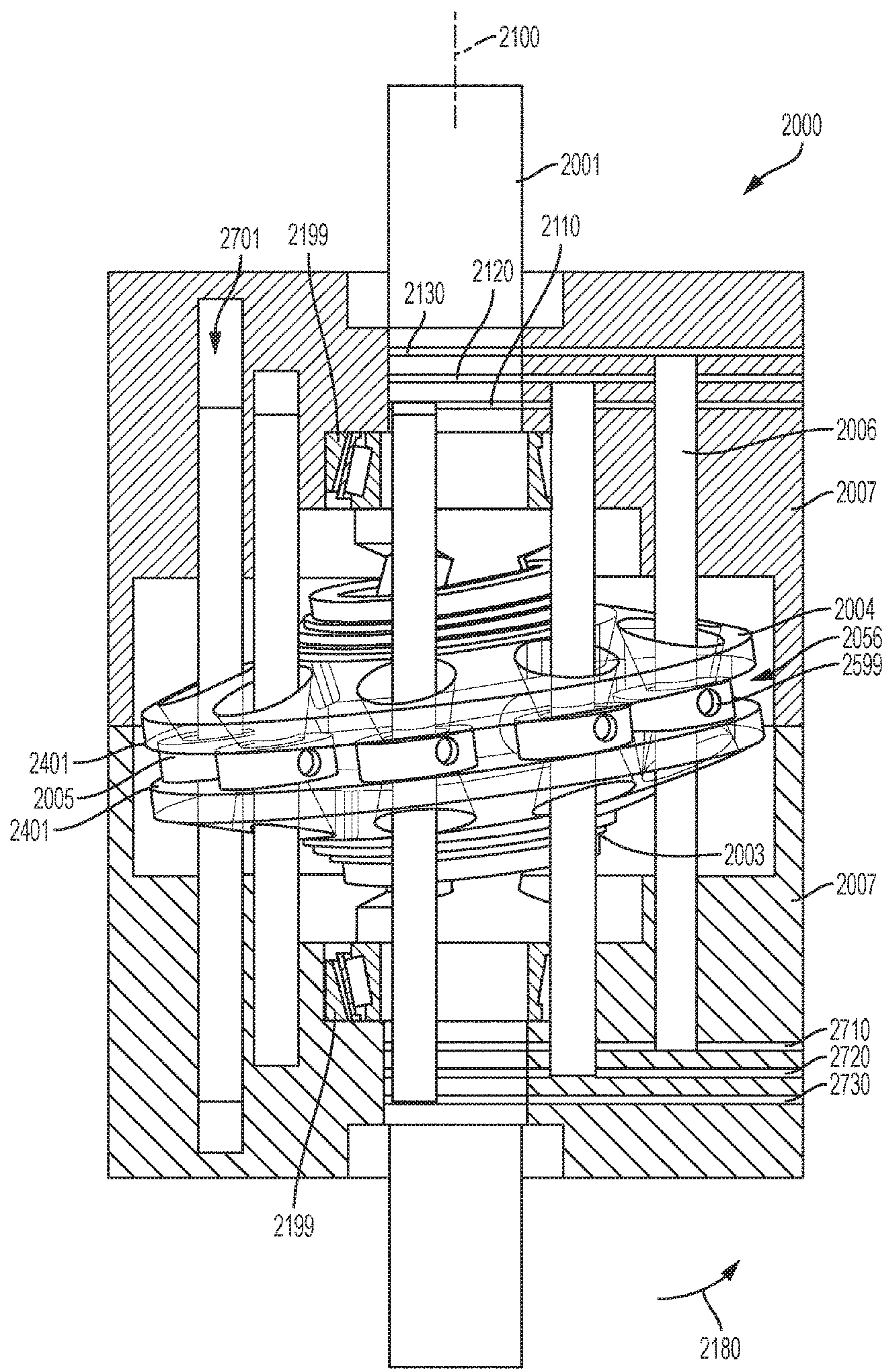
FIG. 22 illustrates the axial piston device of FIG. 21 further rotated counter-clockwise such that the plurality of pistons are in a third position.
Figure 23:
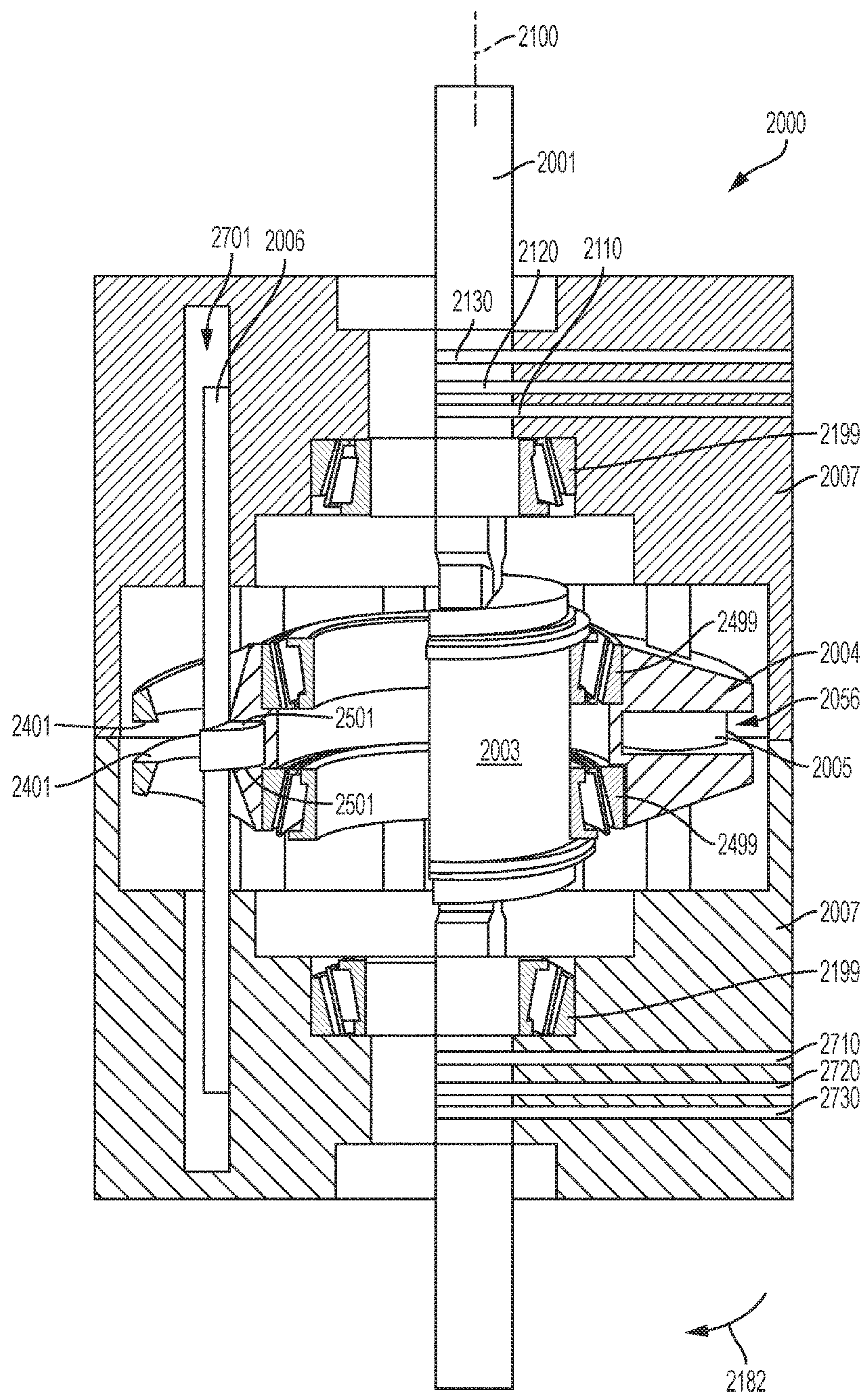
FIG. 23 illustrates another perspective, partially cross-sectional side view of the axial piston device of FIG. 14 in a first position.
Figure 24:
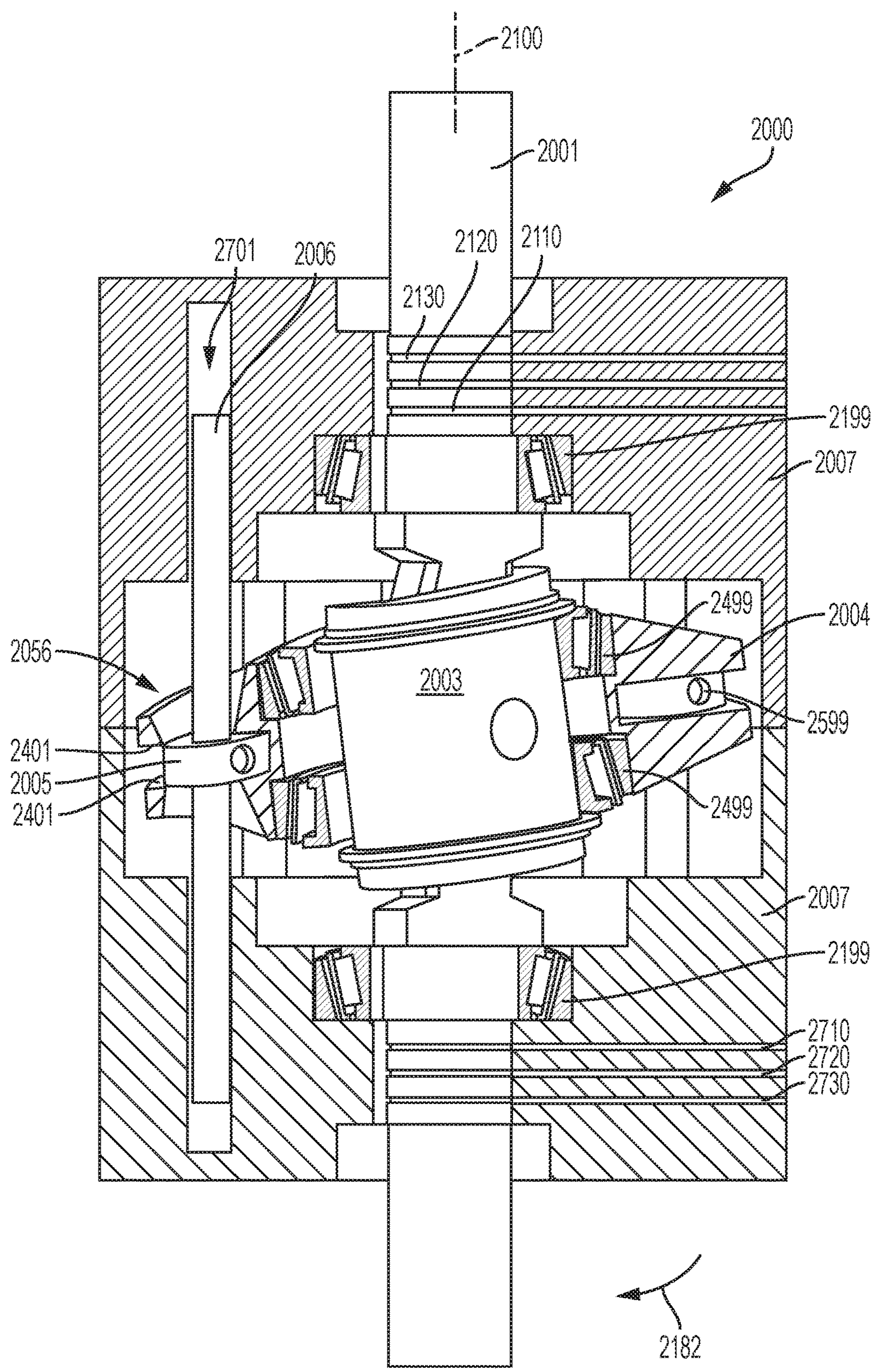
FIG. 24 illustrates the axial piston device of FIG. 23 rotated clockwise to a second position that is similar to the third position shown in FIG. 22.
Figure 25:
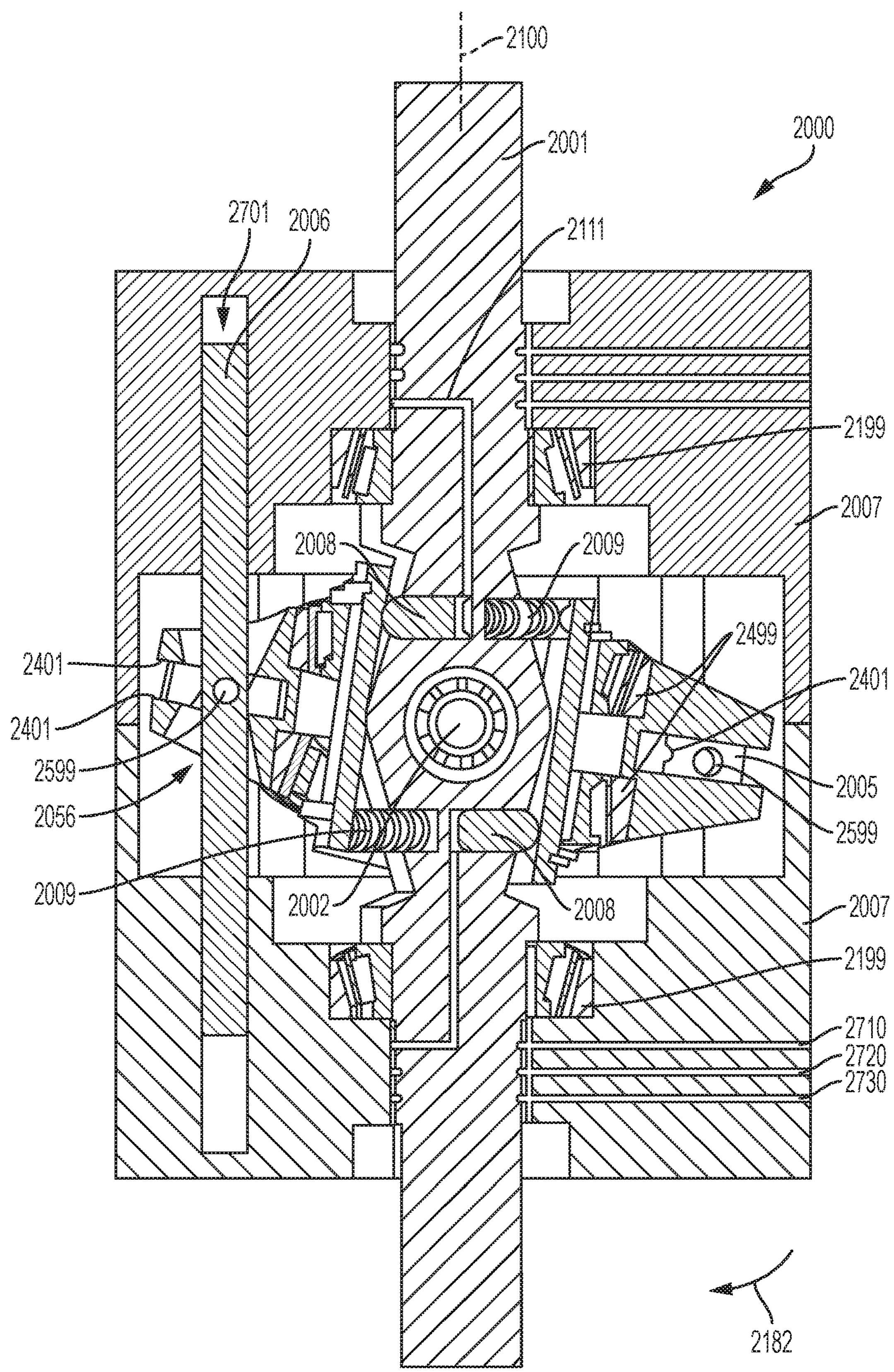
FIG. 25 illustrates the axial piston device of FIG. 24 rotated clockwise to a third position that is similar to the position shown in FIG. 14.

In operation, as shown through various positions of the axial machine set forth in FIGS. 20-25, the shaft 1 may rotate either in a counter-clockwise direction 2180 (FIGS. 20-22) or in a clockwise direction 2182 (FIGS. 23-25) to effect wobble plate 2004 tilt variation through the adjustable swash drive as the shaft 2001 rotates and a corresponding piston 6 reciprocation. Through such variable displacement, torque and speed are transferred from the rotating shaft 2001 to the wobble plate through such couplings as described herein. An external motor may drive and provide torque and speed to the shaft 2001. The shaft 2001 in turn drives the pin 2002, which drives the swash collar 2003. Tilt as variable displacement of the swash collar 2003 is controlled by a swash control mechanism, such as the control piston 2008 and bias spring 2009 assembly controlled by the flow control device 2799 as described herein. Rotation and tilt of the swash collar 2003 drives tilt of the wobble plate 2004, which wobble plate 2004 does not rotate. Rather, the wobble plate 2004 is free to float and is restricted from rotation by the piston 2006 that is contained within respective piston bores defined within the housing 2007 of the stationary cylinder block. Slippers 2005 are coupled to respective pistons 2006 housed within the piston bores. The wobble plate 2004 includes interior surfaces 2401 that are disposed about slipper surfaces 2501 of each slipper 2005, and each slipper 2005 may rotate within and with respect to the wobble plate 2004 and in alignment with rotation of the shaft 2001, for example. Thus, as shown in FIGS. 24-25, during rotation, each slipper pin 2599 initially configured to face the same direction as the pin 2002 coupling the swash collar 2003 to the shaft 2001 may rotate in alignment with the pin 2002 as the shaft 2001 rotates effecting a corresponding rotation of the slippers 2005. Rotation of each slipper 2005 effects a corresponding rotation of a respective piston 2006 to which the slipper 2005 is attached through the slipper pin 2599.

Figure 20:
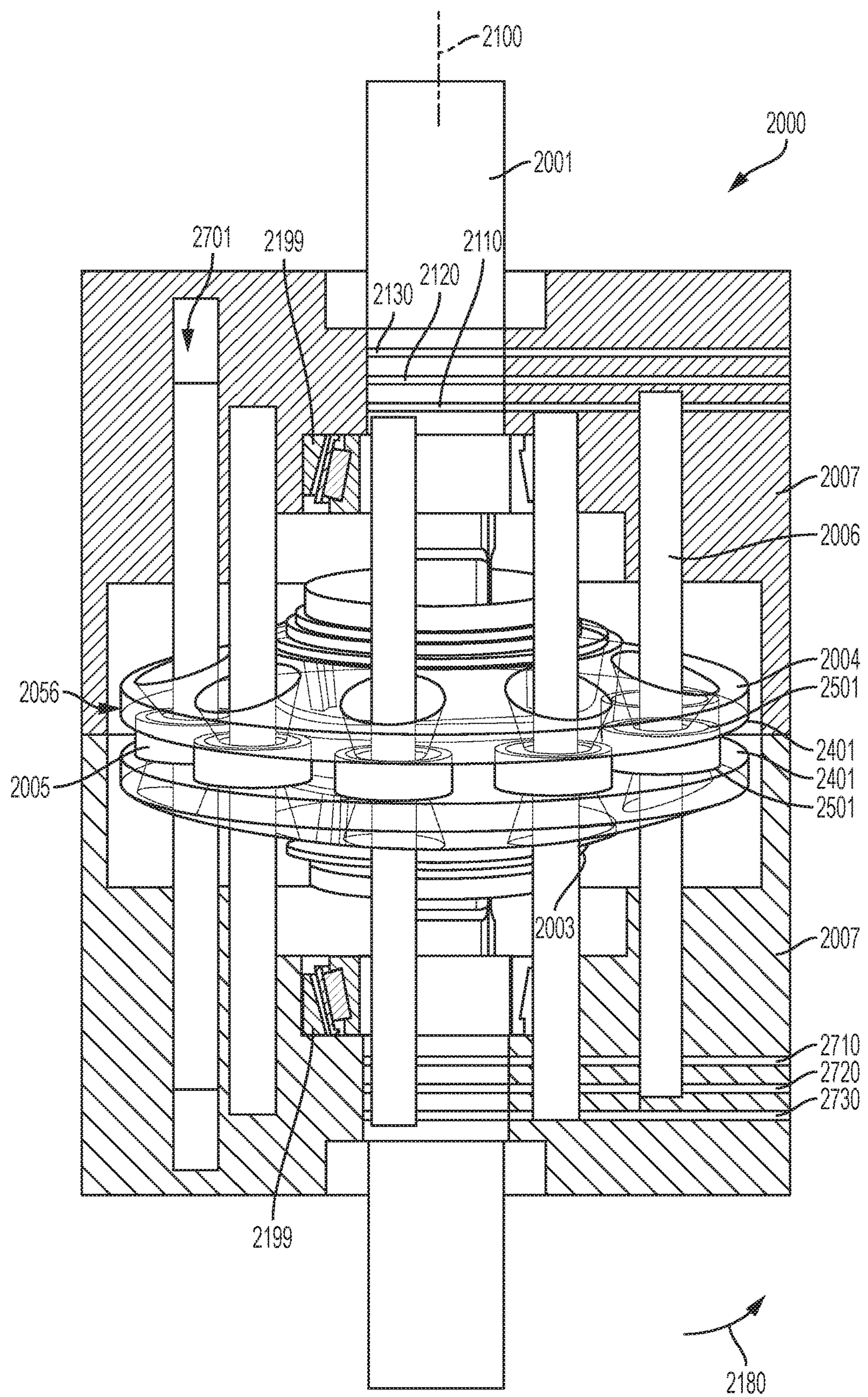
FIG. 20 illustrates a perspective, partially cross-sectional side view of the axial piston device of FIG. 14 with a plurality of pistons in a first position.
Figure 21:
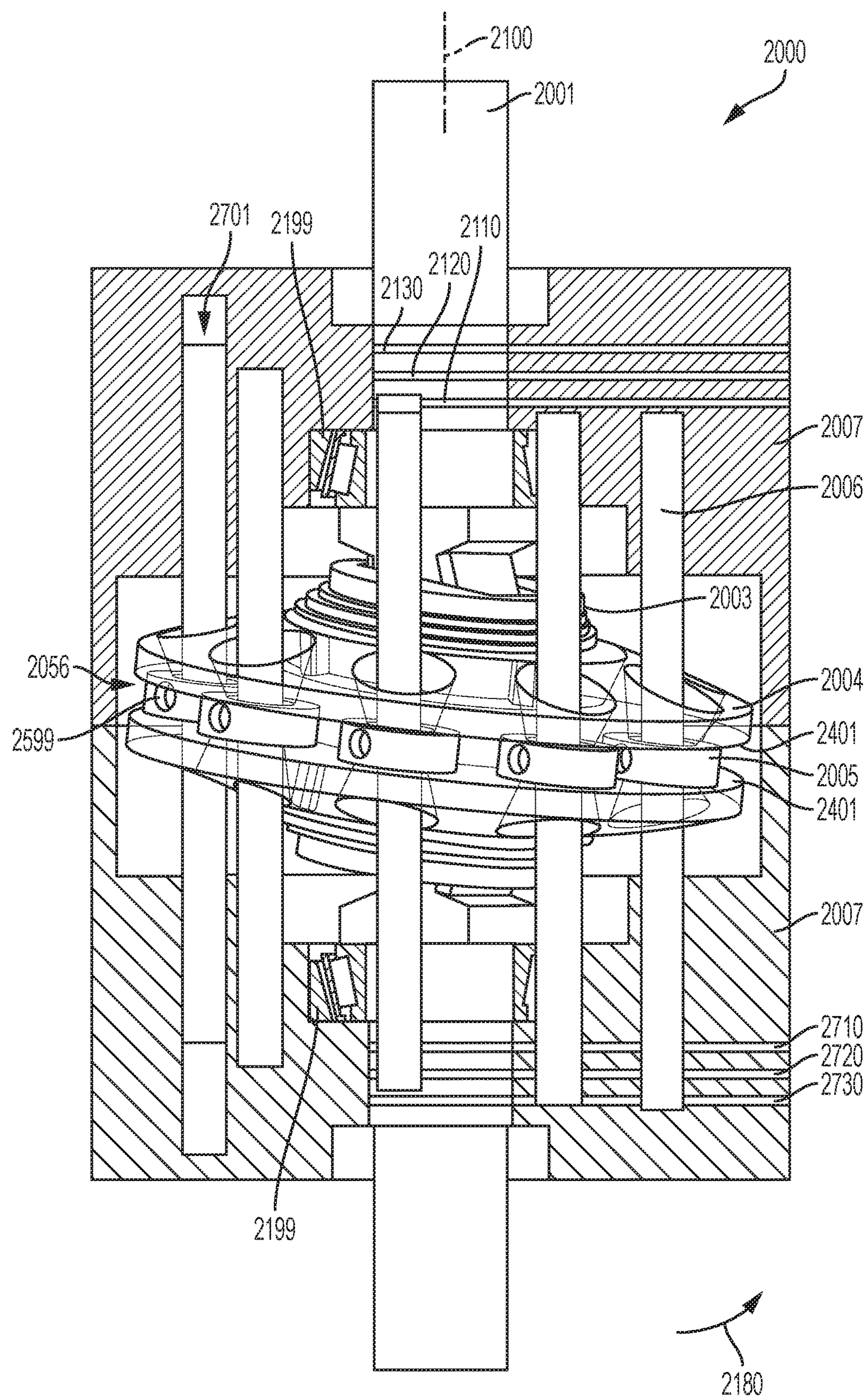
FIG. 21 illustrates the axial piston device of FIG. 20 rotated counter-clockwise such that the plurality of pistons are in a second position.

As one side of the wobble plate 4 tilts upward with respect to a piston bore in which a piston 2006 is housed, the piston 2006 is driven upward into the piston bore as well. As the swash collar rotates, the wobble plate 2004 will be drive to tilt downward with respect to the piston bore in an opposite direction such that the piston 2006 is driven downward with respect to the piston bore. Referring to FIGS. 20-21, when the shaft 2001 rotates in a counter-clockwise manner, the depicted left side of the wobble plate 2004 first tilts upward while the opposite right side tilts downward with respect to the piston bores such that the corresponding pistons 2006 in each piston bore either are driven upward on the left side or driven downward on the right side. Referring to FIGS. 21-22, as the shaft 2001 continues to rotate in the counter-clockwise manner, the left side of the wobble plate 2004 is driven downward and the right side is driven upward with respect to the piston bores housing the pistons 2006. Corresponding pistons 2006 in each piston bore thus are now driven downward on the left side or driven upward on the right side. In such a manner, the pistons 2006 reciprocate within their respective piston bores as the shaft 2001 rotates counter-clockwise.

Referring to FIGS. 23-25, the shaft 2001 may rotate in a clockwise manner effecting an opposite piston reciprocation pattern than that depicted in FIGS. 20-22. FIG. 23 illustrates another perspective, partially cross-sectional side view of the axial piston machine 2000 in a first position; FIG. 24 shows the axis piston machine in a second position; and FIG. 25 shows the axis piston machine in a third position in a view that is similar to the position shown in FIG. 14.

Referring to FIGS. 23-24, as the shaft 2001 rotates in a clockwise manner, the depicted left side of the wobble plate 2004 first tilts downward while the opposite right side tilts upward with respect to the piston bores such that the corresponding pistons 2006 in each piston bore either are driven downward on the left side or driven upward on the right side. Referring to FIGS. 24-25, as the shaft 2001 continues to rotate in the clockwise manner, the left side of the wobble plate 2004 is driven upward and the right side is driven downward with respect to the piston bores housing the pistons 2006. Corresponding pistons 2006 in each piston bore are now driven upward on the left side or driven downward on the right side. In such a manner, the pistons 2006 reciprocate within their respective piston bores as the shaft 2001 rotates clockwise in an opposite manner to that described and shown in FIGS. 20-22 in which the shaft 2001 rotates counter-clockwise. The amount of upward and downward movement of the wobble plate 2004 is controlled by the amount of fluid provided by the flow control device 2799 to the piston chamber 2112 through shaft fluid passages 2110, 2111 to control the control piston 2008 and the bias spring 2009 to tilt the swash collar 2003 to a desired angle, which in turn controls the tilt angle of the wobble plate 2004.

Figure 26:
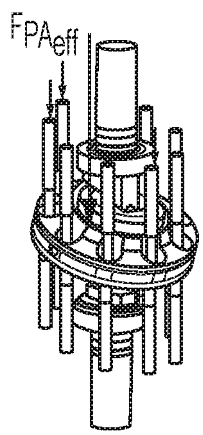
FIG. 26 illustrates an alternative perspective view of the axial piston device of FIG. 21 in the second position along with an effective piston force.
Figure 27:
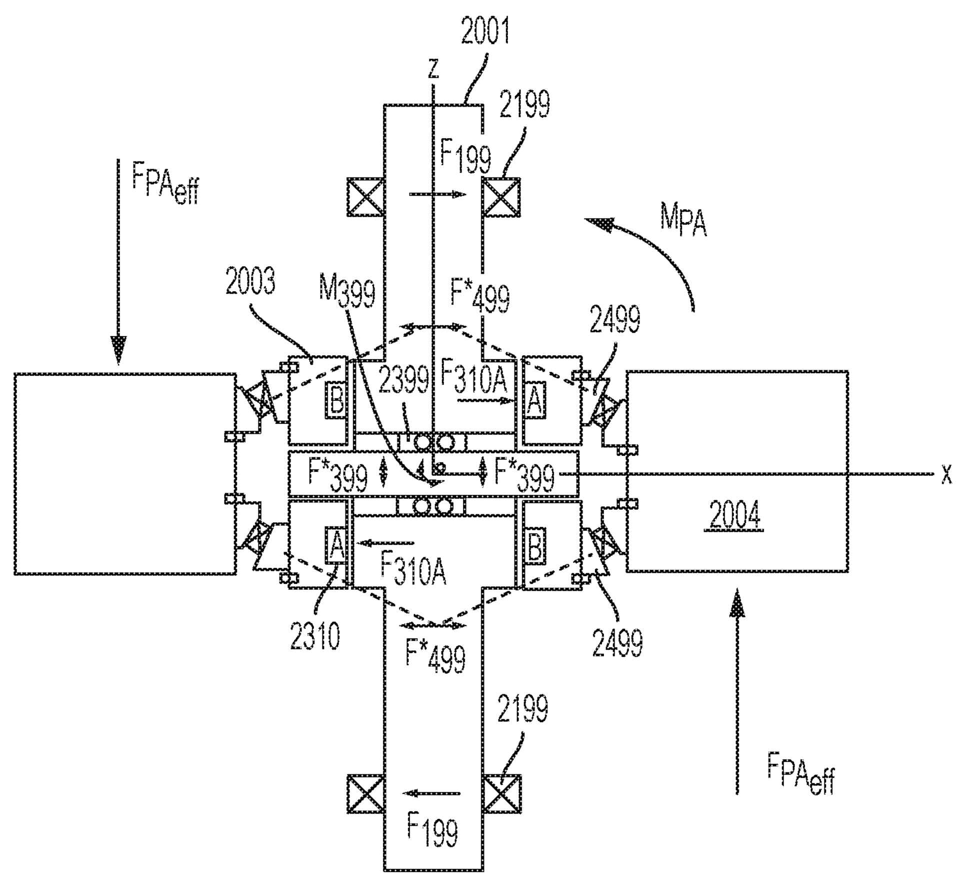
FIG. 27 illustrates a schematic cross-sectional side view of the axial piston device of FIG. 14 including moments and forces acting upon the axial piston device during operation.
Figure 28:
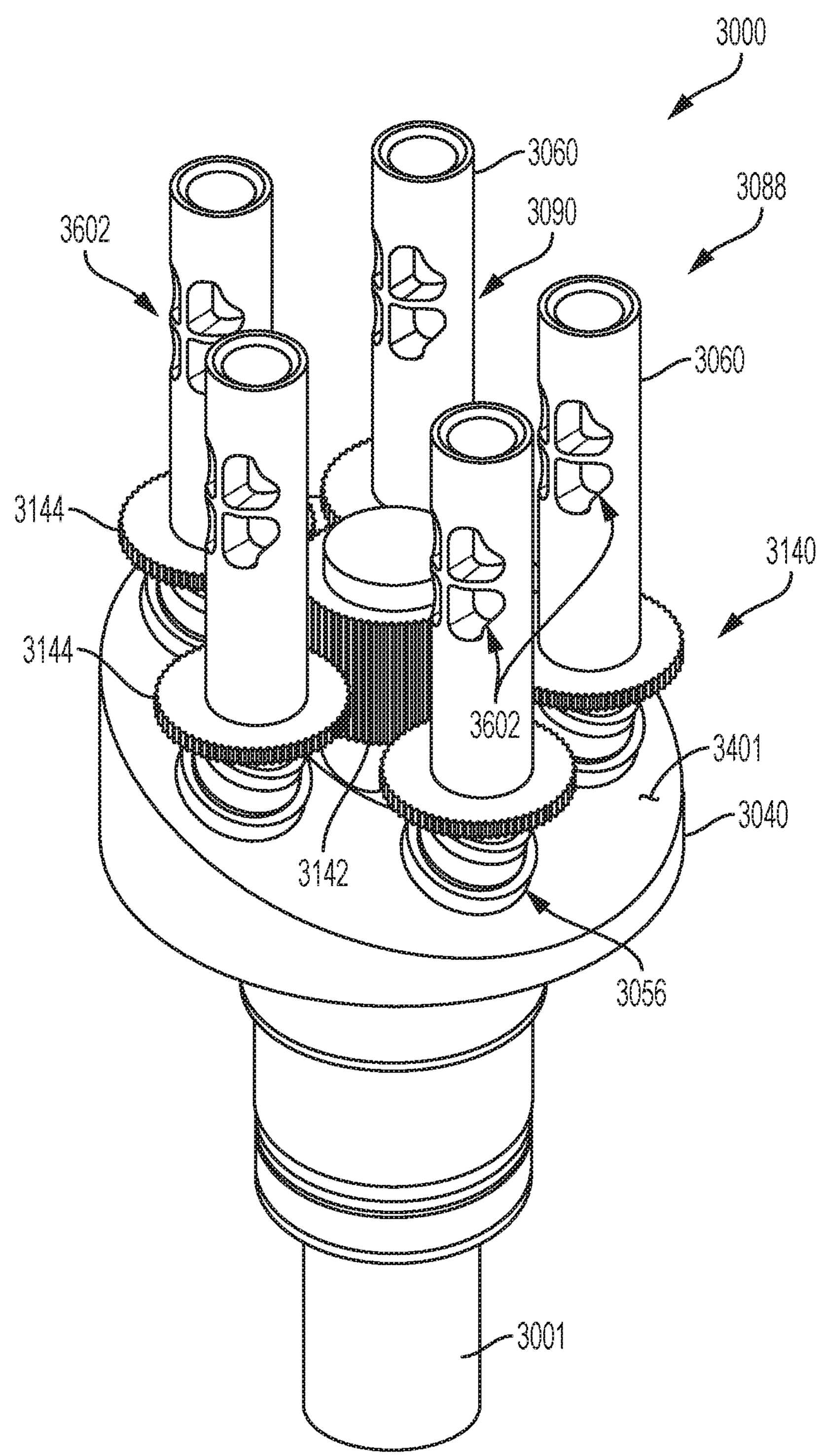
FIG. 28 illustrates a perspective view of an axial piston device including a gear drive assembly embodiment configured to control piston rotation, the pistons including integral valves, according to one or more embodiments as shown and described herein.
Figure 29:
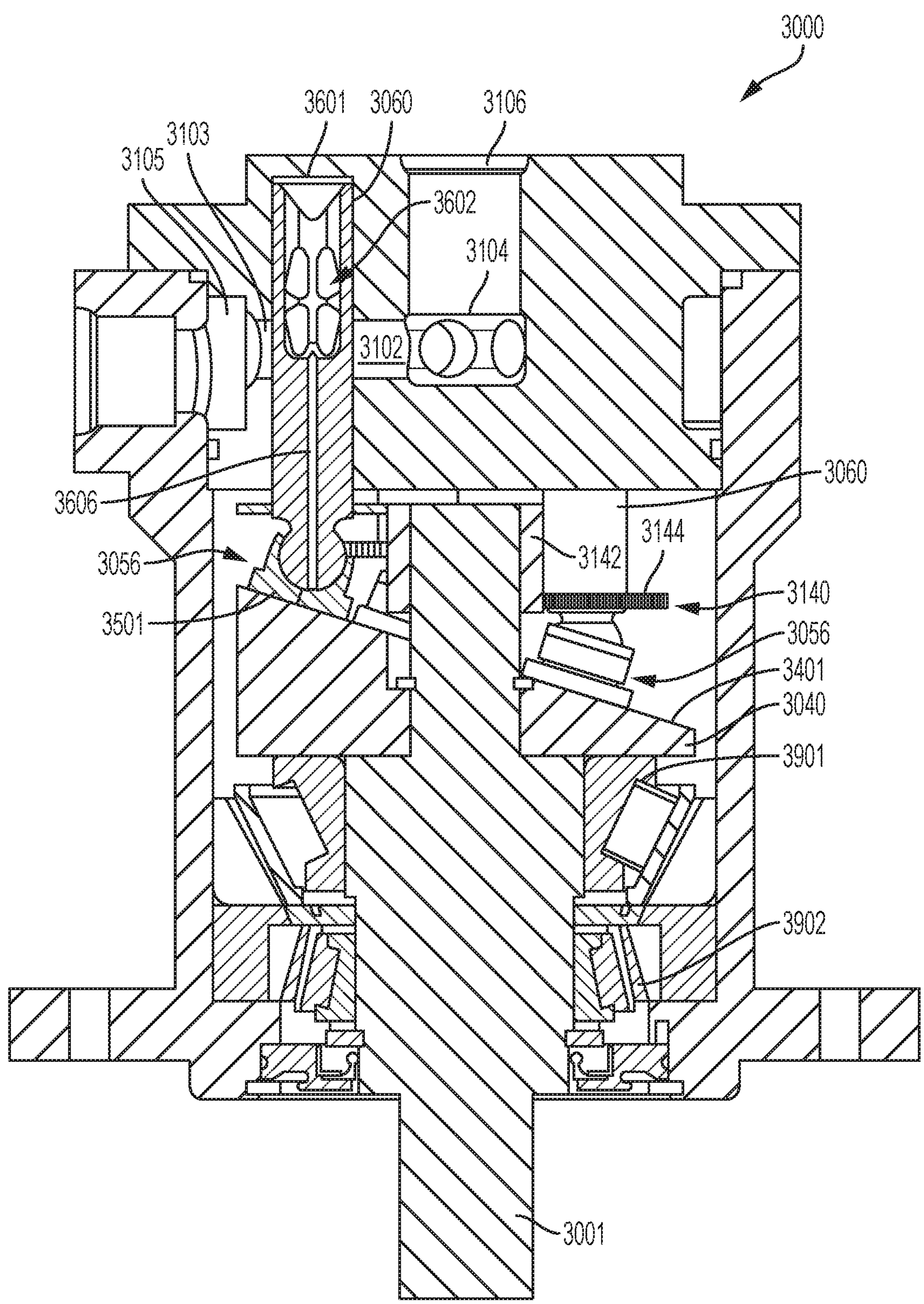
FIG. 29 illustrates a cross-sectional view of the axial piston device of FIG. 28.

Referring to FIG. 26, a perspective view of the axial piston machine 2000 similar to the second position shown in FIG. 21 is depicted along with an effective piston force $F_{PA_{eff}}$ application to the plurality of pistons 2006. FIG. 27 illustrates a schematic cross-sectional side view of the axial piston machine 2000 including moments and forces acting upon the axial piston machine 2000 during operation.

As a non-limiting example, referring to FIG. 27, a moment $M_{399}$ of the swash collar support bearings 2399 is reduced by an effective moment of the hydrostatic pressure pockets 2310 as described above between the shaft 2001 and the swash collar 2003. The hydrostatic pressure pockets 2310 are labeled in FIG. 27 as including a first diagonally and opposed pair A and a second diagonally and opposed pair B of hydrostatic pressure pockets 2310. The first diagonally and opposed pair A of hydrostatic pressure pockets 2310 are enacted upon by a force $F_{310_A}$ during operation, while the second diagonally and opposed pair B of hydrostatic pressure pockets 2310 are enacted upon by a force $F_{310_B}$ during operation. A force $F_{399}$ of the swash collar bearings 2399 is shown in FIG. 27 as well. Ultimately, a combination of the moment $M_{399}$ of the swash collar support bearings 2399 and the effective moment of the hydrostatic pressure pockets 2310 carry and transfer a full piston moment $M_{P_A}$ between (i.e., from and to) the swash collar 2003 and the shaft 2001. Additionally, shaft support bearings 2199 and wobble plate support bearings 2499 carry and transfer the full piston moment $M_{P_A}$ between the swash collar 2003 and the shaft 2001. As torque is equivalent to a product of moment of inertia (i.e., rotational mass) and an angular acceleration, the full piston moment $M_{P_A}$ transferred to the shaft 2001 multiplied by an angular acceleration value of the shaft 2001 would provide a shaft torque value. In effect, with respect to the axial piston machine 2000 described herein, a resulting reduced shaft moment multiplied by a resulting increased shaft rotational acceleration is able to achieve a desired torque.

The axial piston machine 2000 described herein is a reciprocating piston device utilizing variable displacement and balanced bearing forces to enable operation in high pressure hydraulic systems with a smaller structure, increased efficiency and control, and reduced noise that can be realized through use of the double-sided wobble plate drive mechanism. Such a double-sided wobble plate drive mechanism as described herein provides for a reduction in rotating mass (i.e., moment of inertia) leading to an increased shaft rotational acceleration, a reduction in swash mass leading to faster fluid displacement control, a compact design leading to reduced material and use cost and a smaller envelope size of the machine, a back-to-back piston configuration (i.e., a double sided configuration) leading to a reduction in flow ripple, noise, and friction, and a rotating swash collar assembly including balanced loads leading to improved efficiency and reduced structural noise transmitted to the housing through bearings. Commercial uses for the axial piston machine 2000 include use as a piston pump, motor, engine, or compressor. These often find application in the drive and control industry on equipment. Such equipment includes stationary industrial equipment and mobile equipment such as vehicles, aircraft, ships, and the like.

Referring to at least FIGS. 28-39, axial piston devices as described herein may include alternative embodiments for rotational piston control and/or fluid displacement. With respect to FIGS. 28-30, an axial piston device 3000 including a rotatable piston assembly 3088 configured for controlled rotation of a plurality of pistons 3060 though a gear drive assembly 3140. Alternative drive mechanisms configured to control rotation of a rotatable piston with respect to a shaft of an axial piston device are contemplated within the scope of this disclosure.

The gear drive assembly 3140 may include a shaft sun gear 3142 in communication with a plurality of piston planetary gears 3144. Each piston planetary gear 3144 is integrally or otherwise coupled to a distal end of each piston 3060. As each piston planetary gear 3144 is configured to drive rotation of each piston 3060, each piston 3060 is configured to rotate with respect to a corresponding slipper assembly 3056, such as when the piston 3060 is coupled to the slipper assembly 3056 through a spherical joint connection. The shaft sun gear 3142 is integrally or otherwise coupled to a shaft 3001 of the axial piston device 3000. The gear drive assembly 3140 is configured to control rotation of the shaft 3001 and the plurality of pistons 3060 while allowing for axial relative motion in an axial direction therebetween. In an embodiment, the plurality of piston planetary gears 3144 may include an anti-rotation mechanism free to glide along the piston 3060 in the axial direction to eliminate the axial relative motion between the shaft sun gear 3142 and the plurality of piston planetary gears 3144. Such an anti-rotation mechanism may include, for example, a ball bearing as an axial joint between a planetary gear 3144 and a respective piston 3060 such that the planetary gear 3144 would not move relative to the shaft sun gear 3142. In embodiments, as the shaft sun gear 3142 rotates about a shaft axis 3100 in a first direction $W_S$, the plurality of piston planetary gears 3144 rotate in a second direction $W_P$ opposite the first direction about a bore axis of rotation 3601 of a cylinder bore interface 3601 within which each piston 3060 is housed. As a non-limiting example, the first direction may be one of clockwise and counter-clockwise, and the second direction may be the other of counter-clockwise and clockwise. When the shaft sun gear 3142 rotates in a clockwise direction, the plurality of piston planetary gears 3144 rotate in a counter-clockwise. Alternatively, when the shaft sun gear 3142 rotates in a counter-clockwise direction, the plurality of piston planetary gears 3144 rotate in a clockwise direction. As the shaft sun gear 3142 rotates about the shaft axis 3100 in the first direction $W_S$, a swash mechanism such as a wobble plate 3040 coupled to the shaft 3001 also rotates about the shaft axis 3100 in the first direction $W_S$ generating a rotational torque $T_W$.

The wobble plate 3040 may be titled with respect to the shaft axis 3100 of the shaft 3001 at a swash angle α. It is contemplated within the scope of this disclosure that the axial piston device 3000 may be a fixed or variable displacement machine. Each piston 3060 interfaces with a proximal interface 3401 of the wobble plate 3040 through the slipper assembly 3056. As the wobble plate 3040 rotates, the plurality of pistons 3060 reciprocate within and with respect to respective cylinder bore interfaces 3601 along respective bore axes of rotation 3608.

Figure 30:
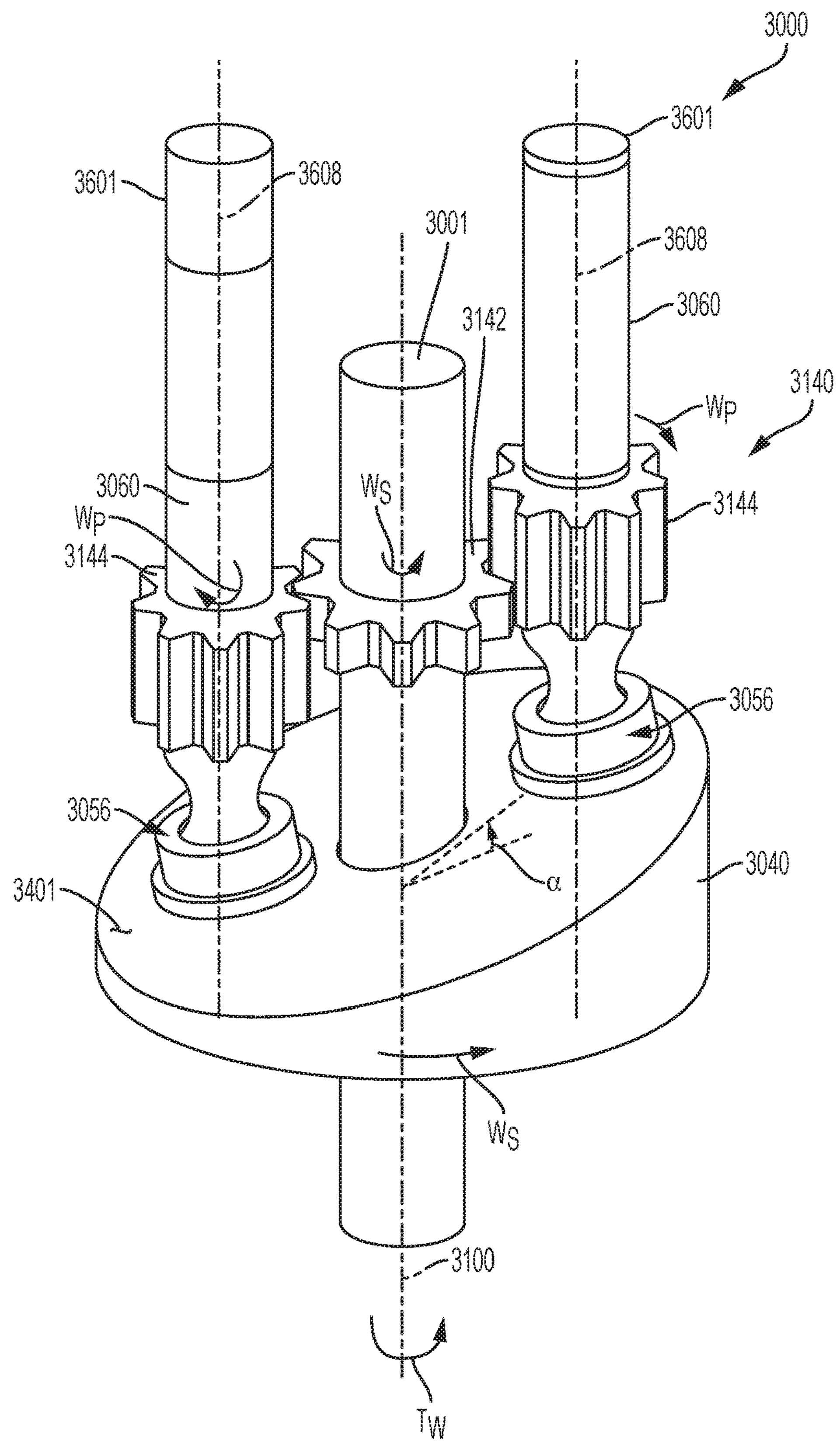
FIG. 30 illustrates an opposing side perspective view of the axial piston device of FIG. 28 in an embodiment not illustrating an integral valve.

In embodiments, the rotatable piston assembly 3088 of the axial piston device 3000 may include a rotatable piston valve assembly 3090 such that each piston 3060 includes an integral valve port 3602. The integral valve port 3602 may include a ribbed structure configured to separate the integral valve port 3602 into a plurality of sub-port openings, such as the four openings of each integral valve port 3602 shown in FIGS. 28-39. The ribbed structure may assist with increasing rigidity and durability of the integral valve port 3602 of each piston 3060. Alternatively, as shown in FIG. 30, the rotatable piston assembly 3088 of the axial piston device 3000 may a plurality of pistons 3060 that do not include one or more integral valve ports 3602 and rather may cooperate with a separate rotary valve for fluid displacement within the axial piston device 3000.

A proximal manifold port 3106 of the axial piston device 3000 is in communication with a proximal manifold passage 3104 that is in communication with a plurality of openings that communicate with an inward cylinder block port 3102 when respectively aligned with the inward cylinder block port 3102. An outward cylinder block port 3103 is in communication with a distal manifold passage 3105. In operation as a pump, and referring to FIG. 29, fluid may enter into a proximal manifold port 3106, proceed through the proximal manifold passage 3104 and into the inward cylinder block port 3102. Fluid may then flow into a piston 3060 when the piston 3060 has rotated to an inward position such that the integral valve port 3602 of the piston 3060 is aligned with the inward cylinder block port 3102. As the piston 3060 rotates to another, outward position opposing the inward position, the integral valve port 3602 aligns with the outward cylinder block port 3103 such that fluid proceeds into the outward cylinder block port 3103 and continues on into the distal manifold passage 3105. In operation as a motor, the fluid direction may be reversed for receipt through the distal manifold passage 3105 and the outward cylinder block port 3103 and flow, through the integral valve port 3602 of the rotating piston 3060, into the inward cylinder block port 3102 and out through the proximal manifold port 3106.

The slipper assembly 3056 operates similarly to how described above with respect to the slipper assembly 50 of the axial piston device 100 as shown in FIG. 5, and the axial piston device 3000 may include structural components similar to those described for the axial piston device 100 and shown in FIG. 5 other than the differences as described herein. As a non-limiting example, the piston 3060 may include a lubrication port 3606 and one or more hydrostatic pockets as described herein, and the respectively joined slipper assembly 3056 may additionally be in fluid communication with the lubrication port 3606 and include a respective lubrication port and/or one or more hydrostatic pockets as described herein. A distal interface 3501 of the slipper assembly 3056 may communication with the proximal interface 3401 of the wobble plate 3040. During operation, the distal interface 3501 of the slipper assembly 3056 and the proximal interface 3401 of the wobble plate 3040 remain in parallel due to forces pushing against the rotatable piston 3060 and the slipper assembly 3056 in a direction toward the wobble plate 3040. Such forces are provided by fluid and friction forces from the cylinder bore interface 3601 on the rotatable piston 3060. Additionally, a large bearing 3901 may be disposed around a distal end of the wobble plate 3040 and about the shaft 3001, and a small bearing 902 is disposed as a shaft support bearing about a distal end of the rotatable shaft 3001.

Figure 31:
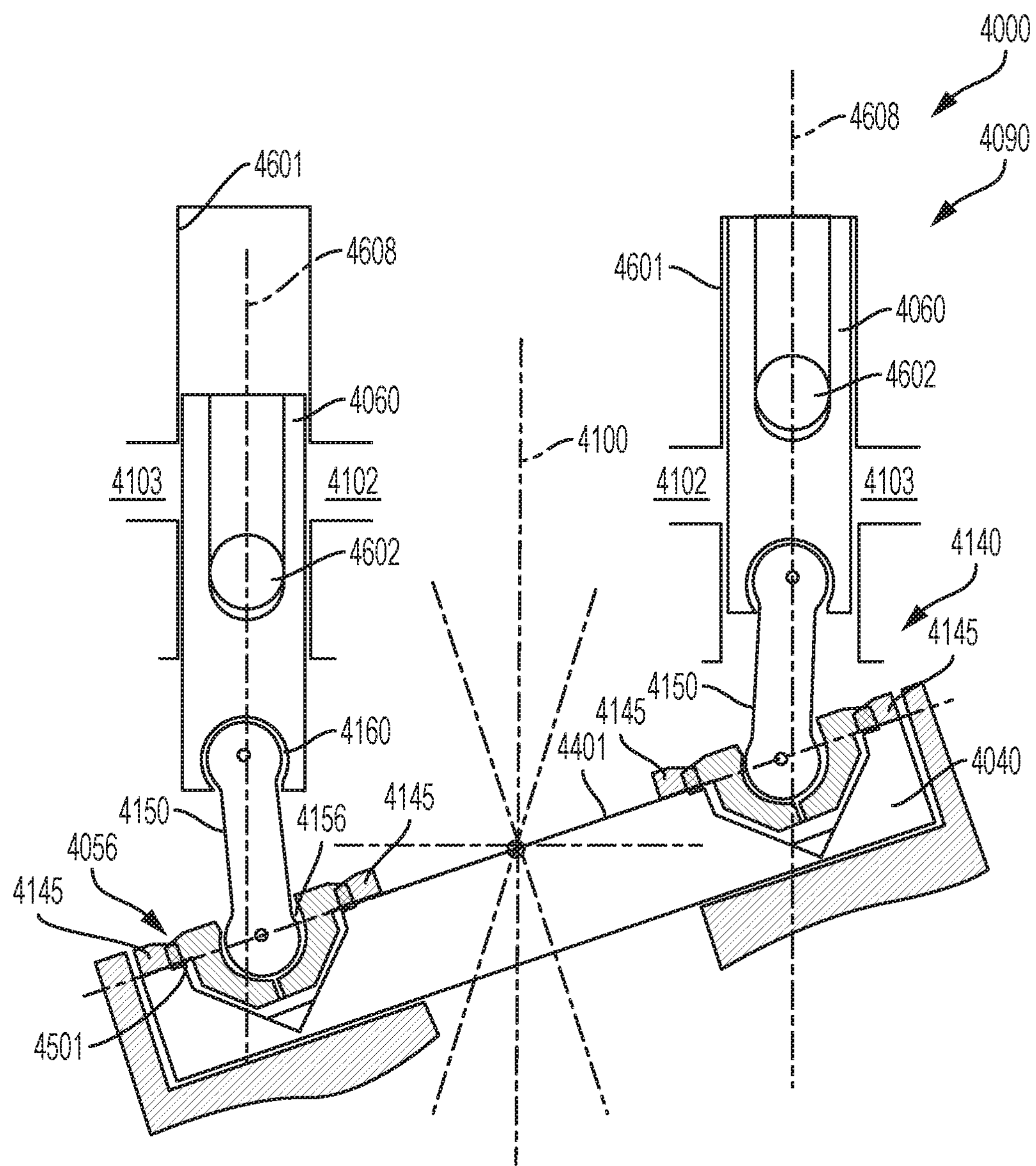
FIG. 31 illustrates a side cross-sectional view of an axial piston device including another gear drive assembly embodiment configured to control piston rotation, the pistons including integral valves, according to one or more embodiments as shown and described herein.

With respect to FIG. 31, an axial piston device 4000 including a rotatable piston valve assembly 4090 is configured for controlled rotation of a plurality of pistons 4060 including respective integral ports 4602 though a gear drive assembly 4140. In alternative embodiments, the plurality of pistons 4060 may not include respective integral ports 4602. The plurality of pistons 4060 with the integral ports 4602 rotate to fluidly communicate between an inward cylinder block port 4102 and an outward cylinder block port 4103 in a similar manner to the communication described above and shown in FIG. 5 with respect to the axial piston device 100 of the valve port 602 with respect to the inward cylinder block port 102 and an outward cylinder block port 103.

The gear drive assembly 4140 is directed to a gear mechanism such as a floating gear 4145 disposed and communicating between a wobble plate 4040 and a slipper assembly 4156. The slipper assembly 4156 includes a slipper interface ends 4501 that communicates with and remain parallel to a proximal interface 4401 of the wobble plate 4040 as the wobble plate 4040 rotates about a shaft axis 4100 at a swash angle of rotation. The slipper assembly 4156 includes a slipper joint interface 4156, and each piston 4060 includes a piston joint interface 4160. A connecting rod 4150 is disposed between each piston 4060 and a respective slipper assembly 4156, and constrained ends of the connecting rod 4150, which may define revolute joints or otherwise constrained joints when coupled to respective piston and slipper interfaces, are received and held within and between the slipper joint interface 4156 and the piston joint interface 4160. As the gear drive assembly 4140 is configured to drive rotation of the slipper assembly 4156, a respectively coupled piston 4060 is constrained with respect to the slipper assembly 4156 as described herein to result in a corresponding rotation. As a non-limiting example, rotation of the connecting rod 4150 in a first direction may force the piston 4060 to rotation in an opposing direction. In alterative embodiments, the connecting rod 4150 may include ends configured for a revolute joint fit or otherwise constrained fit with respect to the slipper joint interface 4156 and the piston joint interface 4160.

Use of an idler gear and radial motions effects rotation of the floating gear 4145 to control rotation of the slipper assembly 4145. In an embodiment, the floating gear 4145 of the gear drive assembly 4140 is fixed to the proximal surface 4401 of the wobble plate 4040 and is configured to drive the slipper assembly 4056 in a controlled rotation to, through the connecting rod 4150, effect a controlled rotation of a respectively joined piston 4060 about a bore axis of rotation 4608 of a cylinder bore interface 4601 within which respective piston 4060 reciprocates. The gear drive assembly 4140 is configured to operate to control rotation of the plurality of pistons 4060 at a positive swash angle with respect to the shaft axis 4100, at a centered (zero) swash angle, or at an overcentered, negative swash angle. Further, the gear drive assembly 4140 is configured to operate to control rotation of the slipper assemblies 4056 within a groove interface of the wobble plate 4040 in which each slipper assembly 4056 is housed. Such a groove interface may be conical, cylindrical, circular, or planar, or other shape, each shape configured to carry an axial or radial load. As a non-limiting example, the shape of the groove interface is configured to carry an axial load and carry a radial load such that a corresponding radial joint maintains a position of the piston 4060 with respect to the wobble plate 4040. The radial surfaces of the groove interface are thus configured to carry at least a portion of an axial piston load as the wobble plate 4040 is tilted. It is contemplated within the scope of this disclosure that any of the gear drive assemblies as described herein are configured to be able to carry such an axial load and a radial load.

Figure 32:
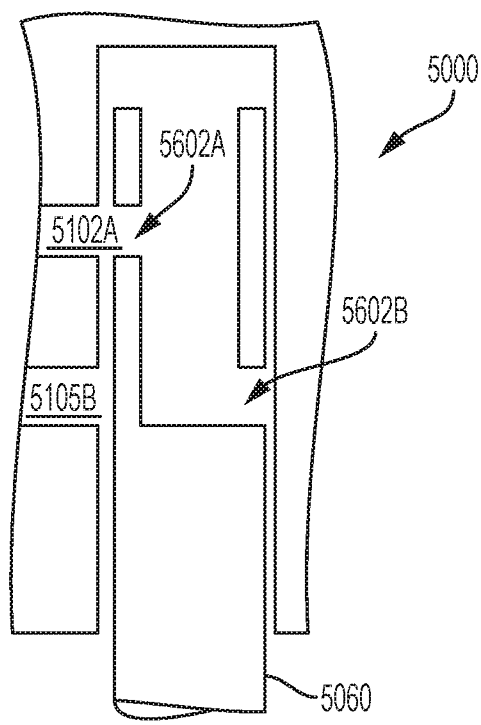
FIG. 32 illustrates a cross-sectional side view of an axial piston device including an integrated dual port manifold assembly for communication with at least a dual port rotatable piston, according to one or more embodiments as shown and described herein.
Figure 33:
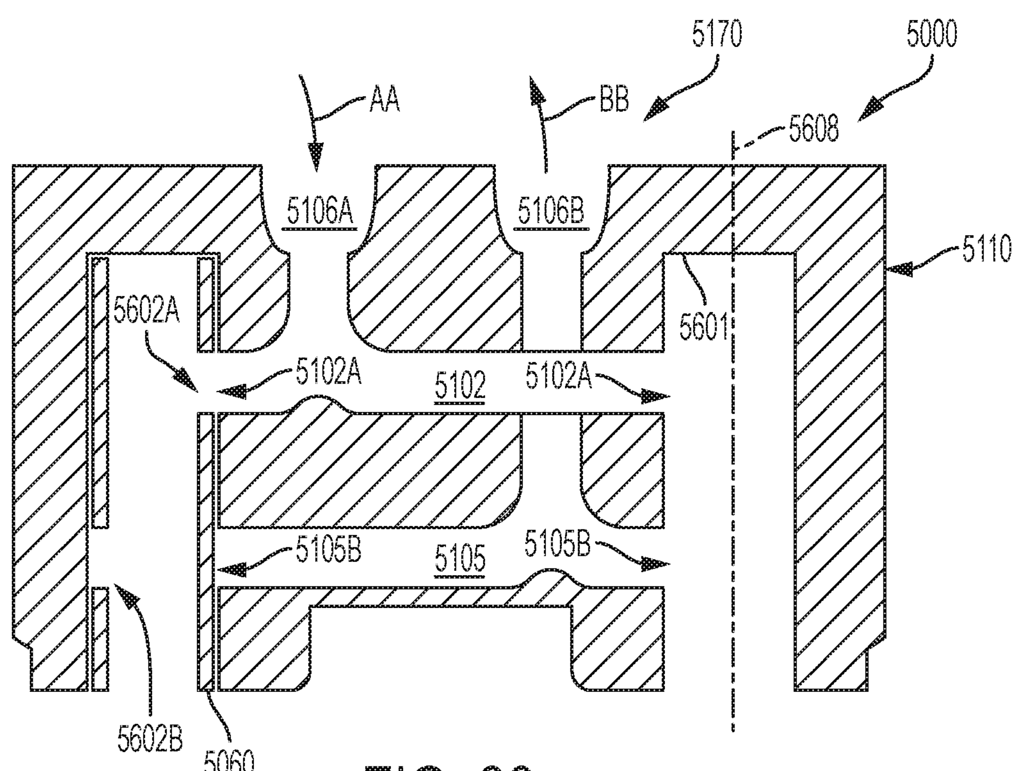
FIG. 33 illustrates a cross-sectional side view of the axial piston device of FIG. 32 further illustrating the integrated dual port manifold assembly in communication with at least a pair of opposingly situated dual port rotatable pistons.

Referring to FIGS. 32-33, an axial piston device 5000 includes an integrated dual port manifold assembly 5170 for communication with at least a dual port rotatable piston 5060 in contrast to the single port design of the axial piston device 100. The axial piston device 100 of FIG. 5 illustrates a piston 60 including a single valve port 602 for communication with a pair of circumferentially opposite cylinder ports as the inward cylinder block port 102 and the outward cylinder block port 103. By contrast, the axial piston device 5000 illustrates a piston 5060 including circumferentially opposed valve ports 5602A, 5602B (i.e., spaced about 180 degrees apart) and a manifold 5110 including a pair of circumferentially aligned cylinder ports 5102A, 5105B. The manifold 5110 includes a pair of manifold ports 5106A, 5106B. In embodiments, the manifold ports 5106A, 5106B may be aligned but axially offset and/or angled with respect to one another and a cylinder bore interface axis 5608 of a cylinder bore interface 5601 defining a cylinder bore within which a respective piston 5060 is disposed. The manifold port 5106A is in fluid communication with a passage 5102 that is in fluid communication with each cylinder port 5102A. The manifold port 5106B is in fluid communication with a passage 5105 that is in fluid communication with each cylinder port 5105B.

In an embodiment of operation, such as when the axial piston device 5000 acts as a pump, fluid enters the manifold port 5106A and the passage 5102 that is in fluid communication with each cylinder port 5102A. As the piston 5060 moves out of the cylinder bore defined by the cylinder bore interface 5601 axially along the cylinder bore interface axis 5608, similar to as described with respect to the axial piston device 100. As shown in FIG. 32, as the piston 5060 rotates about the cylinder bore interface axis 5608 and moves downward and out of the cylinder bore defined by the cylinder bore interface 5601, fluid is pulled from the cylinder port 5102A into the valve port 5602A while the valve port 5602B and the cylinder port 5105A are sealed off from one another by a piston-bore cylindrical interface. As the piston 5060 continues to rotate down to a bottom dead center, both valve ports 5602A, 5602B are temporarily closed off from both cylinder ports 5102A, 5105B.

As the piston 5060 continues to rotate, the piston 5060 moves into the cylinder bore defined by the cylinder bore interface 5601. As the piston 5060 rotates about the cylinder bore interface axis 5608 and moves upward and into the cylinder bore defined by the cylinder bore interface 5601, fluid is discharged from the valve port 5602B of the piston 5060 and into the cylinder port 5105B. In such a position, the valve port 5602A of the piston 5060 and the cylinder port 5102A are sealed off from one another by the piston-bore cylindrical interface. As the piston 5060 continues to rotate up to a top dead center, both valve ports 5602A, 5602B are temporarily closed off from both cylinder ports 5102A, 5105B. The integrated dual port manifold assembly 5170 of the axial piston device 5000 with the aligned, internal cylinder ports 5102A, 5105B permits for a more compact manifold package that assists with balancing side forces from cylinder port pressure without creating a moment.

Figure 36:
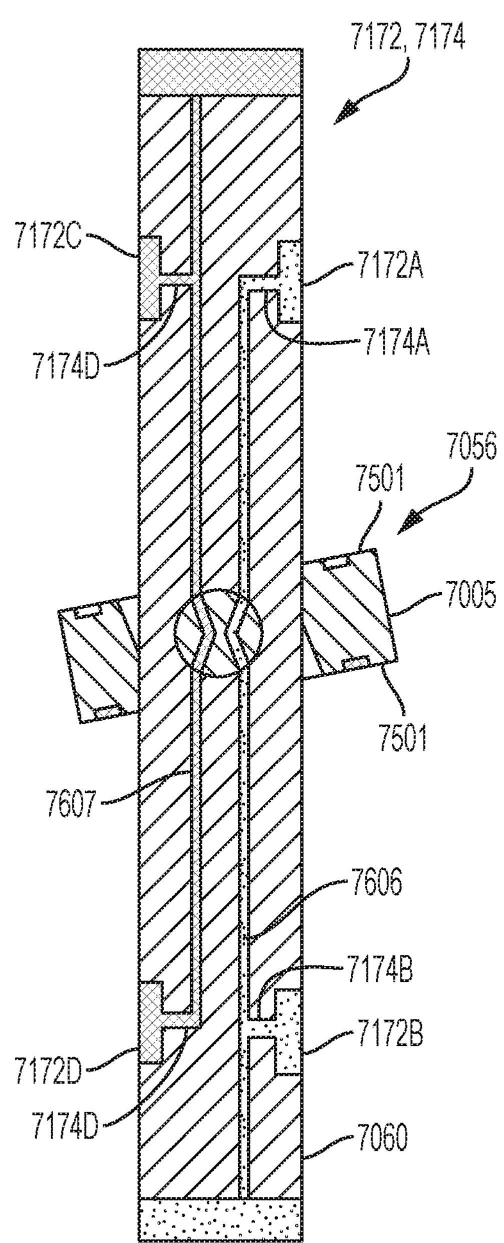
FIG. 36 illustrates a cross-sectional side view of a double sided rotatable piston with hydrostatic pockets, according to one or more embodiments as shown and described herein.
Figure 37:
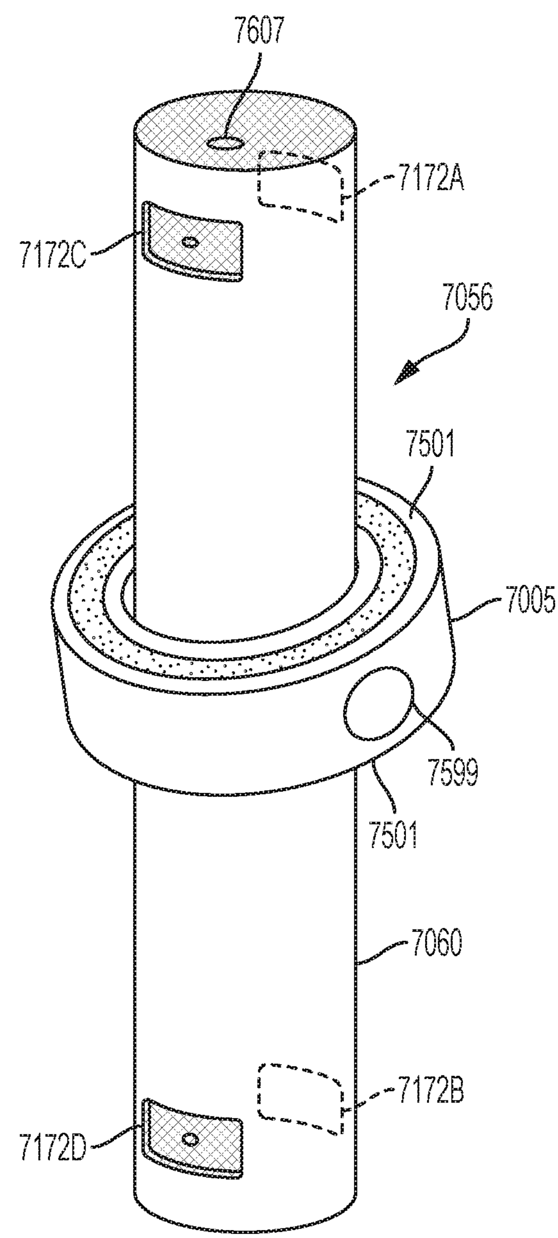
FIG. 37 illustrates a perspective view of the double sided rotatable piston of FIG. 36.
Figure 38:
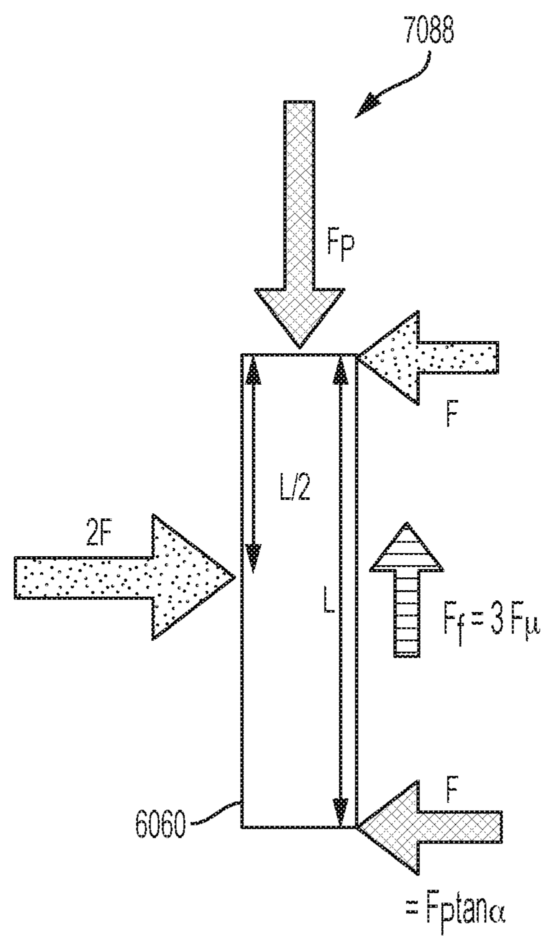
FIG. 38 illustrates forces acting upon the single sided rotatable piston of FIGS. 34-35.
Figure 39:
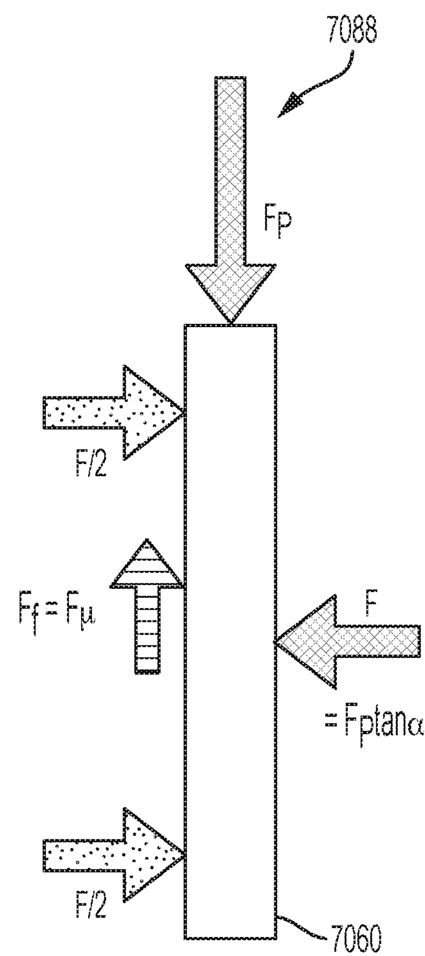
FIG. 39 illustrates forces acting about the double sided rotatable piston of FIGS. 36-37.

Referring to FIGS. 34-39, rotatable pistons as described herein may include one or more hydrostatic pockets. With respect to FIGS. 34-35 and 38, a single sided rotatable piston may include a pair of circumferentially opposed hydrostatic pockets connected by a common lubrication port and have forces acting upon the piston as shown in FIG. 38 and described in greater detail below. With respect to FIGS. 36-37 and 39, a double sided rotatable piston may include two pairs of hydrostatic pockets, each pair including aligned pockets connected by a common lubrication port and have forces acting upon the piston as shown in FIG. 39 and described in greater detail below.

Figure 34:
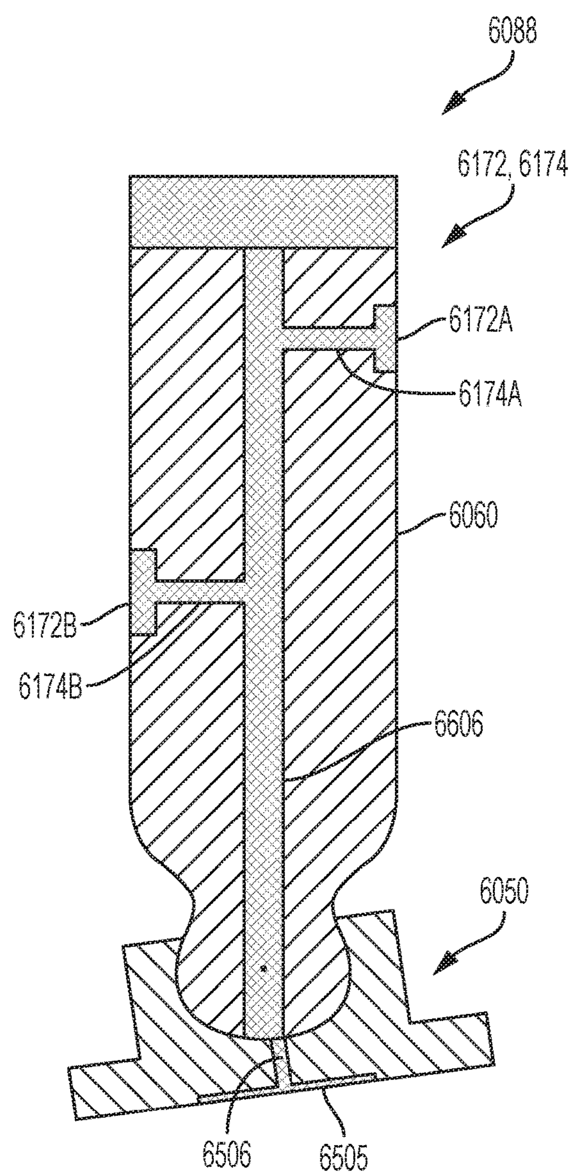
FIG. 34 illustrates a cross-sectional side view of a single sided rotatable piston with hydrostatic pockets, according to one or more embodiments as shown and described herein.
Figure 35:
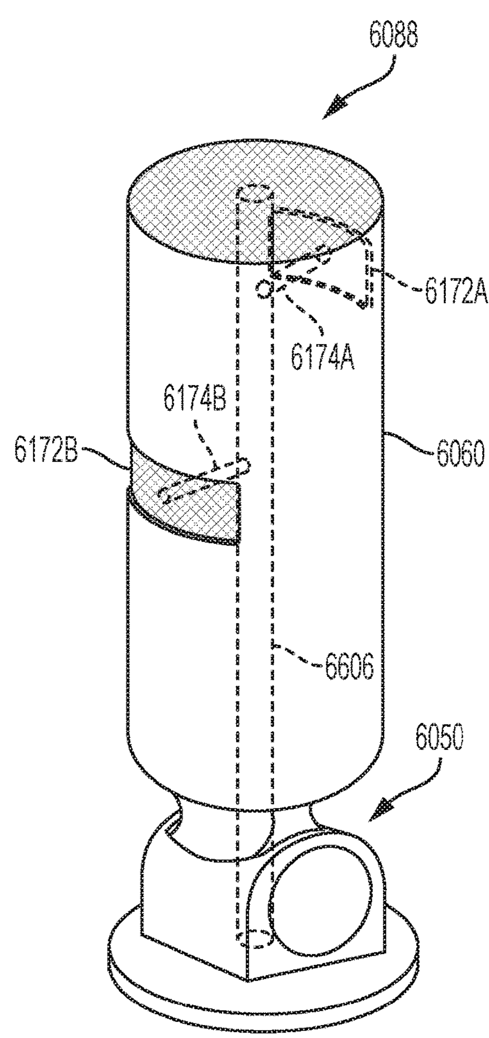
FIG. 35 illustrates a perspective view of the single sided rotatable piston of FIG. 34.

Referring to FIGS. 34-35 and 38, a single sided rotatable piston may include a pair of circumferentially opposed hydrostatic pockets connected by a common lubrication port and have forces acting upon the piston as shown in FIG. 38. The pair of hydrostatic pockets are circumferentially disposed on a sidewall of the piston, and the sidewall is disposed between the ends of the piston. Referring to FIGS. 34-35, a rotatable piston assembly 6088 includes a piston 6060 coupled to a slipper assembly 6050. The slipper assembly 6050 includes a hydrostatic pocket 6505 in fluid communication with a lubrication port 6506. The lubrication port 6506 is configured to fluidly communicate with a lubrication port 6606 of the piston 6060 as the piston 6060 and the slipper assembly 6050 as described herein similar to the constrained rotation of the piston 60 and the slipper assembly 50 of the axial piston device 100 having a single sided piston configuration, as shown in FIG. 5.

The lubrication port 6606 is configured to axially extend between ends of the piston and is in fluid communication with a pair of hydrostatic pockets 6172 through a respective pair of pocket lubrication ports 6174. By way of example and not as a limitation, a pocket lubrication port 6174A is disposed between a hydrostatic pocket 6172A and the lubrication port 6606 of the piston 6060. Further, a pocket lubrication port 6174B is disposed between a hydrostatic pocket 6172B and the lubrication port 6606 of the piston 6060. The hydrostatic pocket 6172B is circumferentially disposed about 180 degrees apart from the hydrostatic pocket 6172A on the piston 6060. It is contemplated within the scope of these disclosure that the pair of hydrostatic pockets may be of a similar size or be different in size, where each size is dependent on a geometry of the system to carry load. By way of example, and not as a limitation, the hydrostatic pocket 6172B may be larger than the hydrostatic pocket 6172A as the hydrostatic pocket 6172B is configured to carry a load (2F) double the load the hydrostatic pocket 6172A is configured to carry (F), as shown in FIGS. 34-35 and 38.

Referring to FIGS. 36-37 and 39, a double sided rotatable piston may include two pairs of hydrostatic pockets 7172, each pair including aligned pockets connected by a common lubrication port and have forces acting upon the piston as shown in FIG. 39. Referring to FIGS. 36-37, a rotatable piston assembly 7088 including a piston slipper assembly 7056, which includes a piston 7060 coupled to a slipper 7005 through a slipper pin 7599. The slipper 7005 includes a pair of opposing slipper surfaces 1501, and the piston slipper assembly 7056 operates with respect to a swash mechanism similar to the piston slipper assembly 1056 as shown in FIG. 12 and as described with respect to the axial piston device 1000 having a back to back, double-sided piston configuration.

A respective lubrication port of pair of lubrication ports 7606, 7067 is in fluid communication with a respective pair of hydrostatic pockets 7172 through a respective pair of pocket lubrication ports 7174. By way of example, and not as a limitation, the hydrostatic pockets 7174 may be sized and disposed on the piston 7060 dependent on a geometry of the system to carry load. Each of the hydrostatic pockets 7174 is configured to carry a load F/2 and are similarly sized with respect to the piston 7060 described herein. With respect to a traverse axis perpendicular to an axial, longitudinal axis of the piston 7060, a pair of aligned hydrostatic pockets 7172A and 7172B may be opposing aligned along the traverse axis with or offset with respect to the traverse axis from the pair of aligned hydrostatic pockets 7172C and 7172D circumferentially disposed from the pair of aligned hydrostatic pockets 7172A and 7172B on the piston 7060. A pocket lubrication port 7174A is disposed between a hydrostatic pocket 7172A and the lubrication port 7606 of the piston 7060, and a pocket lubrication port 7174B is disposed between a hydrostatic pocket 7172B and the lubrication port 7606 of the piston 7060. Further, a pocket lubrication port 7174C is disposed between a hydrostatic pocket 6172C and the lubrication port 7607 of the piston 7060, and a pocket lubrication port 7174D is disposed between a hydrostatic pocket 7172D and the lubrication port 7607 of the piston 7060. The hydrostatic pocket 7172A is in fluid communication with the hydrostatic pocket 7172B through the lubrication port 7606, and the hydrostatic pockets 7172A, 7172B are aligned on the piston 7060. The hydrostatic pocket 7172C is in fluid communication with the hydrostatic pocket 7172D through the lubrication port 7607, and the hydrostatic pockets 7172C, 7172D are aligned on the piston 7060. The hydrostatic pockets 7172A, 7172B are circumferentially disposed about 180 degrees apart from the hydrostatic pockets 7172C, 7172D on the piston 7060.

FIG. 38 illustrates forces acting upon the single sided rotatable piston 6060 of FIGS. 34-35, and FIG. 39 illustrates forces acting upon the double sided rotatable piston 7060 of FIGS. 36-37. With respect to FIG. 38, an axial piston load $F_p$ is shown at a top of the piston 6060, a piston edge load F is shown at an upper right piston edge, a load 2F disposed at an end of the cylinder bore in which the piston 6060 is disposed is shown at an intermediate left piston edge, and a radial load F equal to $F_p \tan \alpha$ is shown at a bottom right piston edge. Alpha ($\alpha$) is the swash angle of a translational piston axis of the piston 6060 communicating with a swash mechanism of an axial piston machine as described herein with respect to a longitudinal shaft axis of rotation of a shaft about which a swash mechanism is disposed and rotates. Placement of the load 2F is axially adjusting with respect to the piston 6060 as the piston 6060 axially translates within the cylinder bore. Summing the load 2F with the piston edge load F results in a frictional force load $F_f$ of 3F$\mu$, where $\mu$ is a coefficient of friction. The hydrostatic pockets 6172A, 6172B assist to balance the loads between the opposing right and left sides of the piston 6060 and to increase the mechanical efficiencies of the axial piston device by, for example, 3-5%. As the position of the load 2F is estimated, the piston 6060 may carry a moment and positioning of the hydrostatic pocket 6172B may be placed at a position of the piston 6060 expected to align with the end of the cylinder bore to receive the load 2F. The load 2F divided by the piston edge load F may be dependent on an average of L and L/2 of the piston 6060, where L is a piston length and L/2 is the estimated position of the load 2F.

With respect to FIG. 39, an axial piston load $F_p$ is shown at a top of the piston 7060, a piston edge loads F/2 are shown at an left piston ends, and a radial load F equal to $F_p \tan \alpha$ is shown at an intermediate right piston edge. Alpha ($\alpha$) is the swash angle of a translational piston axis of the piston 7060 communicating with a swash mechanism of an axial piston machine as described herein with respect to a longitudinal shaft axis of rotation of a shaft about which a swash mechanism is disposed and rotates. As piston 7060 does not carry a moment, the top and bottom positions of F/2 are known and the hydrostatic pockets 7172 may be placed at such positions to carry the load and balances the forces acting upon the piston 7060. Summing the loads F/2 results in a frictional force load $F_f$ of F$\mu$, where $\mu$ is a coefficient of friction. The hydrostatic pockets 7172A-7172D thus assist to completely balance the loads between the opposing right and left sides of the piston 7060 and to increase the mechanical efficiencies of the axial piston device by, for example, more than 3-5%. As the position of the load F is known and the piston 7020 does not carry a moment, the load splits between the top and bottom of the piston 7060 as F/2. Positioning of the hydrostatic pockets 7172 may be placed at a positions of the piston 7060 predicted and known to align each load F/2. Further, an area of the piston 7060 may be half the area of the piston 6060, and frictional forces acting upon the piston 7060 may be a sixth of those acting upon the piston 6060. Such reduced friction forces acting on a piston interface may further remove load on the piston and increase mechanical efficiencies of the piston in the axial piston device. Advantages of both the piston 6060 and the piston 7060 may include increased efficiencies, durability, and reliability of an associated axial piston device.

Figure 40:
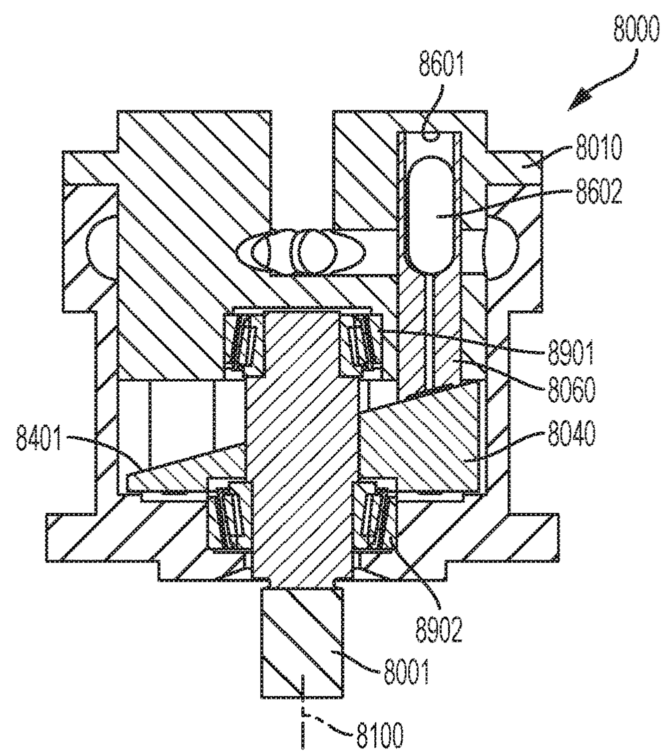
FIG. 40 illustrates an axial piston device including a fixed angle rotatable piston, according to one or more embodiments as shown and described herein.
Figure 41:
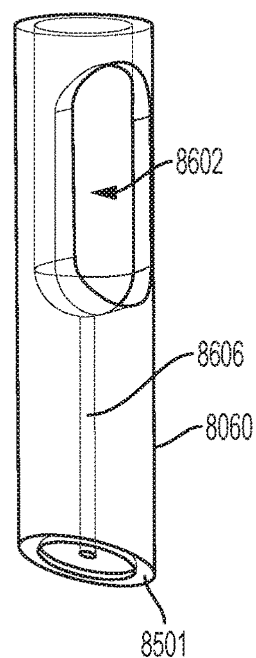
FIG. 41 illustrates an enlarged view of the fixed angle rotatable piston of FIG. 40.

Referring to FIGS. 40-41, an axial piston device 8000 is shown that includes a fixed angle rotatable piston 8060, a swash mechanism 8040 of a fixed displacement assembly, a shaft 8001, a shaft axis 8100, a cylinder block 8010, a cylinder bore interface 8601 defining a cylinder bore in which the fixed angled rotatable piston 8060 is positioned, a large bearing 8902, and a small bearing 8901. The large bearing 8902 supports the swash mechanism 8040 and a distal shaft portion of the shaft 8001 within the cylindrical block 8010, and the small bearing 8902 supports a proximal portion of the shaft 8001 within the cylindrical block 8010. The fixed angled rotatable piston 8060 includes an integral valve port 8602 and a lubrication port 8606. Use of the fixed angle rotatable piston 8060 in the axial piston device 8000 provides for controlled rotation of the fixed angled rotatable piston 8060. Rotation of the shaft 8001 effectives a corresponding rotation of the swash mechanism 8040, which in turn effectives a translation and rotation of the fixed angled rotatable piston 8060 within the cylinder bore interface 8601. Such a fixed angled rotatable piston 8060 has an edge interface 8501 that includes an angle with respect to a piston axis that matches an swash angle of the swash mechanism 8040 with respect to the shaft axis 8100. An edge interface 8501 rotates with respect to and against a proximal interface 8401 of the swash mechanism 8040.

Figure 42:
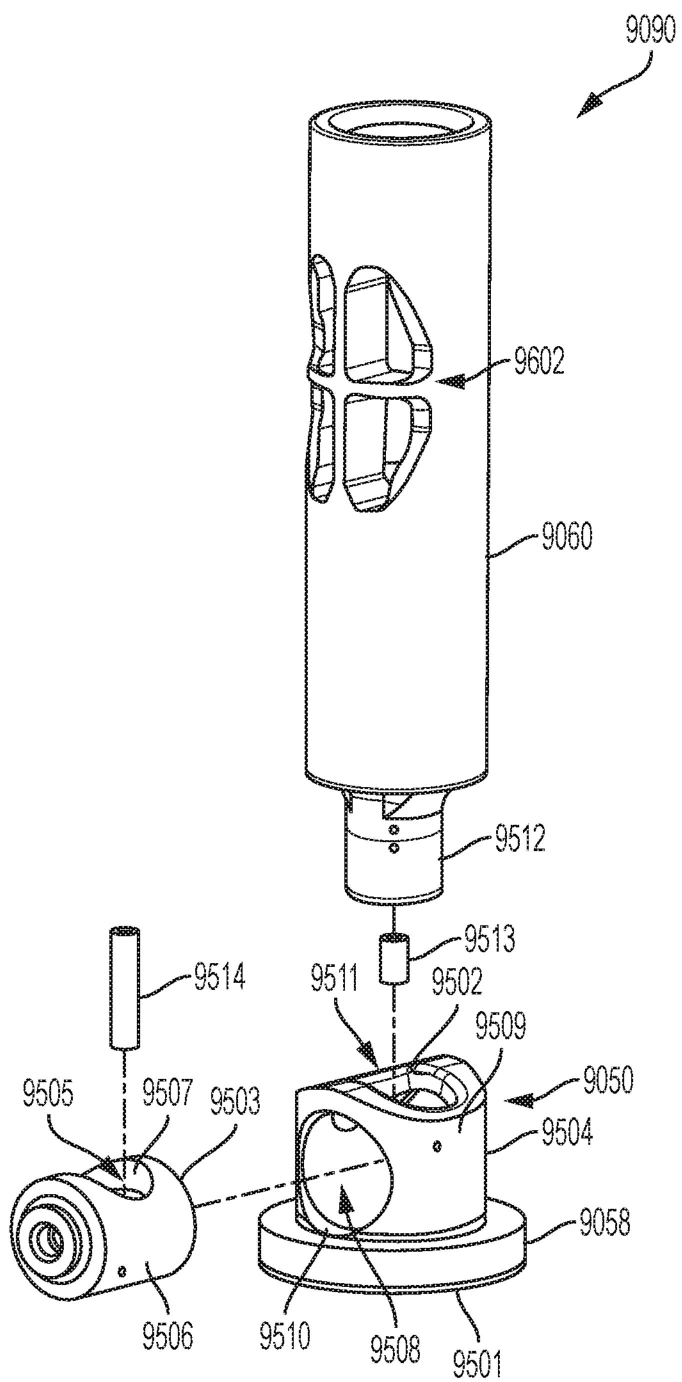
FIG. 42 illustrates an exploded view of a piston-slipper revolute joint including a three-piece assembly having a press fit trunnion, according to one or more embodiments as shown and described herein.

Referring to FIG. 42, a rotatable piston valve assembly 9090 includes a piston-slipper revolute joint for controlled rotation of a piston 9060 within a cylinder bore of an axial piston machine, as described herein. The piston 9060 is illustrated to include an integral valve port 9062, though pistons without such an integral valve port and that communicate with a separate valve for the rotatable piston valve assembly 9090 is within the scope of this disclosure. The rotatable piston valve assembly 9090 includes the piston 9060 joined to a slipper assembly 9050 through a press fit with respect a trunnion 9503. The trunnion 9053 includes a side wall 9506 disposed between ends, an interface 9507, and an opening 9505 defined by the interface 9507 and the side wall 9506. The slipper assembly 9050 includes a distal interface 9501 to rotate against a proximal interface of a swash mechanism, a slipper 9058 extending from the distal interface 9501, a slipper neck 9504 extending from the slipper 9058, a slipper neck wall 9509, a top neck interface 9502, and a top neck opening 9511, a side neck interface 9510, and a side neck opening 9508. The top neck opening 9511 is defined by the slipper neck wall 9509 and the top neck interface 9502. The side neck opening 9508 is defined by the slipper neck wall 9502 and the side neck interface 9510.

Pins 9513 and 9514 are used to attach the trunnion 9503 to the slipper assembly 9050 and to the piston 9060 to form a revolute joint connection configured to control rotation of the piston 9060 within an axial piston device as described herein. The trunnion 9503 is received into the side neck opening 9508 of the slipper neck 9504 such that the side wall 9506 communicates with the side neck interface 9510 and the opening 9505 of the trunnion 9503 is aligned with the top neck opening 9511. The connecting end 9512 is received into the top neck opening 9511 of the slipper neck 9504 and the opening 9505 of the trunnion 9503 and communicates with the top neck interface 9502 of the slipper neck 9504.

Figure 43:
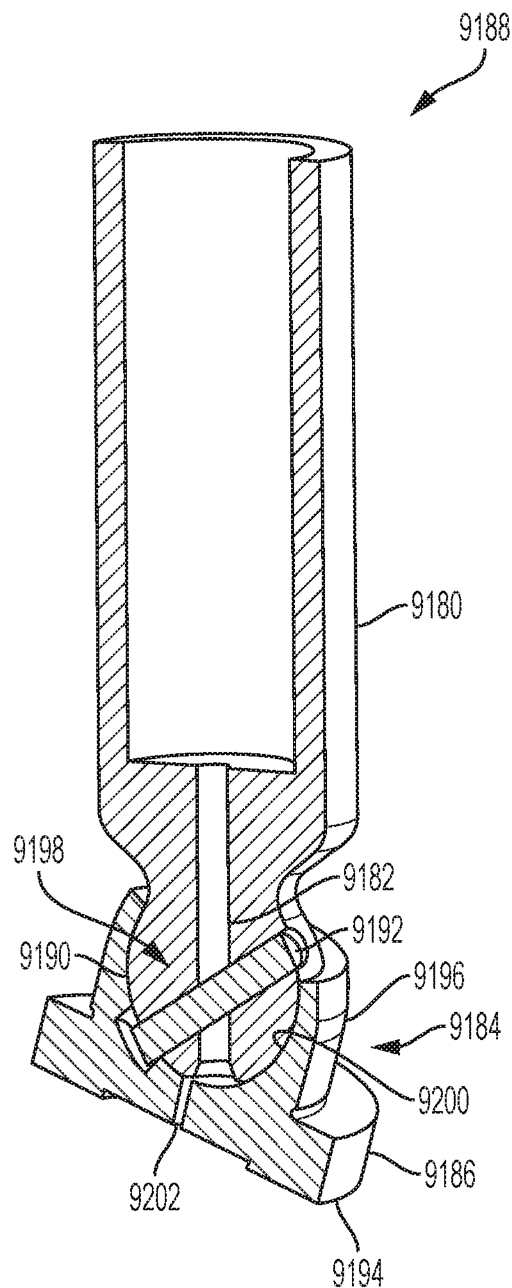
FIG. 43 illustrates a cross-sectional view of a piston-slipper revolute joint including a constrained spherical joint, according to one or more embodiments as shown and described herein.

Referring to FIG. 43, a rotatable piston assembly 9188, which may or may not include an integral valve, is shown as including a piston 9180 attached to a slipper assembly 9184 a constrained spherical socket 9190. The constrained spherical socket 9190 is in fluid communication with an interior of the piston through a lubrication port 9182 and is constrained within the slipper assembly 9184 with a pin 9192. The slipper assembly 9184 includes a distal interface 9194 to communicate and rotate against a proximal interface of a swash mechanism of an axial piston device as described herein. The distal interface 9194 may define a lubrication port 9202 that is in fluid communication with the lubrication port 9182 of the piston 9180. The slipper assembly 9184 further includes a slipper shoe 9186 proximally extending from the distal interface 9194, and a slipper neck 9196. The slipper neck 9196 includes a neck interface 9189 configured to receive and communicate with an interface 9200 of the constrained spherical socket 9190.

One or more embodiments described herein are directed to controlled rotation of a rotatable piston within a cylinder bore and with respect to a swash mechanism of an axial piston device, whether the device is a fixed displacement machine or a variable displacement machine. Pistons configured for such controlled rotation with respect to a swash mechanism may include a fixed angle rotatable piston and a fixed angle swash mechanism, such as the fixed angle rotatable piston 8060 and the swash mechanism 8040 of FIGS. 40-41. Other pistons configured for such controlled rotation with respect to a swash mechanism may include a rotatable piston assembly including a revolute joint between the piston and a slipper assembly for a constrained rotation of the piston with respect to the slipper assembly, such that rotation of the slipper assembly effects a corresponding rotation of the piston due to the revolute joint. Non-limiting examples of such revolute joint rotatable piston assembly connections include a slipper ring connection, a three-piece assembly connection (including a press fit trunnion), a constrained spherical connection (including a spherical socket with a pin), and a connecting rod (bent-axis) connection. The slipper ring connection is shown with respect to at least the single sided rotatable piston assemblies 88 including piston 60 of the axial piston device 100 of FIGS. 1-9H. The three-piece assembly connection including a press fit trunnion is shown with respect to at least the slipper assembly 9050 as attached to the piston 9060 of FIG. 42. The constrained spherical connection including a spherical socket with a pin is shown with respect to at least the rotatable piston assembly 9188 including the slipper assembly 9184 attached to the piston 9180 of FIG. 43. The connecting rod connection, with a bent-axis, is shown with respect to at least the connecting rod 4150 disposed between the piston 4060 and the respective slipper assembly 4146 of the axial piston device 4000 of FIG. 31.

Yet other pistons configured for such controlled rotation with respect to a swash mechanism may include a rotatable piston assembly including alternative synchronized drive mechanisms such as a shaft-piston gear drive assembly or a swash mechanism-slipper gear drive assembly requiring an idler gear and radial motion. Thus, rotation of the slipper assembly effects a corresponding rotation of the piston due to the synchronized drive mechanisms. Non-limiting examples of such synchronized drive mechanisms for a shaft-piston gear drive assembly is shown with respect to at least the rotatable piston assembly 3088 including the gear drive assembly 3140 having a shaft sun gear 3142 in communication with a plurality of piston planetary gears 3144 of the axial piston device 3000 of FIGS. 28-30. Non-limiting examples of such synchronized drive mechanisms for a swash mechanism-slipper gear drive assembly is shown with respect to at least the gear drive assembly 4140 including the floating gear 4145 disposed and communicating between a wobble plate 4040 and a slipper assembly 4156 of the axial piston device 4000 of FIG. 31.

Further pistons configured for such controlled rotation with respect to a swash mechanism may include a rotatable piston assembly including hydrostatic pockets to counteract swash mechanism radial piston loads, such as for single sided or doubled sided (back to back) piston configurations. Non-limiting examples of single sided piston configurations including hydrostatic pockets is shown FIGS. 34-35 and 38 with respect to at least the rotatable piston assembly 6088 that includes the piston 6060 including a pair of hydrostatic pockets 6172 and coupled to a slipper assembly 6050. Non-limiting examples of double sided piston configurations including hydrostatic pockets is shown FIGS. 36-37 and 39 with respect to at least the rotatable piston assembly 7088 that includes the piston 7060 including two pairs of hydrostatic pockets 7172, each pair aligned on the piston 7060, which is coupled to the slipper 7005 through a slipper pin 7599.

Moreover, pistons configured for such controlled rotation with respect to a swash mechanism may include a rotatable piston valve assembly including a piston with an integral valve. Non-limiting examples of such rotatable piston valve assemblies include a single valve port in communication with two circumferentially opposed cylinder ports on a piston end in a single sided or double sided piston configuration, or a pair of circumferentially opposed valve ports for communication with circumferentially aligned cylinder ports. Non-limiting examples of such rotatable piston valve assemblies including a single valve port in communication with two circumferentially opposed cylinder ports in a single sided piston configuration is shown FIGS. 1-9H with respect to at least the piston 60 including the integral valve port 602 for communication with and between the inward cylinder block port 102 and the outward cylinder block port 103; is further shown in FIG. 29 with respect to the axial piston device 3000 including the piston 3060 having the integral valve port 3602 for communication with and between the inward cylinder block port 3102 and the outward cylinder block port 3103; and is further shown in FIG. 40 with respect to the axial piston device 8000. Non-limiting examples of such rotatable piston valve assemblies including a single valve port in communication with two circumferentially opposed cylinder ports in a double sided piston configuration, such that each piston end includes a valve port, is shown FIGS. 10-13 with respect to at least the piston 1006 including the first and second valve ports 1602A, 1602B circumferentially disposed at opposing piston ends for communication with and between cylinder ports 1702, 1703 on opposing ends of the axial piston device 1000. Non-limiting examples of such rotatable piston valve assemblies including a pair of circumferentially opposed valve ports for communication with circumferentially aligned cylinder ports is shown FIGS. 32-33 with respect to at least the piston 5060 including the integral valve ports 5602A, 5602B for communication with respect to and between the pair of circumferentially aligned cylinder ports 5102A, 5105B.

Such rotatable piston valve assemblies may be applied to single sided or double sided piston configurations. Such double sided piston configurations may be double ended pistons supported by a wobble plate that is supported by back to back bearings that transfer loads to a tilted swash collar and shaft to which the swash collar is connected. Non-limiting examples of such rotatable piston valve assemblies including a single sided piston configuration is shown at least in FIGS. 1-9H with respect to at least the plurality of pistons 60 of the axial piston device 100; in FIGS. 28-30 with respect to at least the axial piston device 3000; and in FIG. 31 with respect to at least the axial piston device 4000. Non-limiting examples of such rotatable piston valve assemblies including a double sided piston configuration is shown at least in FIGS. 10-13 with respect to at least the plurality of pistons 1006 of the axial piston device 1000; and in FIGS. 14-27 with respect to at least the plurality of pistons 2006 of the axial piston device 2000.

Pistons configured for such controlled rotation with respect to a swash mechanism may further include a rotatable piston valve assembly including a piston with an integral valve and with one or more hydrostatic pockets. Non-limiting examples of such rotatable piston valve assemblies include pistons including one or more hydrostatic pockets, slipper assemblies including one or more hydrostatic pockets, and/or one or more hydrostatic pockets in an axial piston device such as in a cylinder bore. Such hydrostatic pockets assist to counter act forces to due pressure in a piston valve port and/or respective cylinder ports in fluid communication with the rotatable piston valve assembly. Non-limiting examples of such rotatable piston assemblies that may include pistons with integral valves and that show pistons including one or more hydrostatic pockets is shown FIGS. 34-37. Non-limiting examples of such rotatable piston valve assemblies including slipper assemblies including one or more hydrostatic pockets is shown at least FIGS. 5 and 8A-9H of the piston 60 of the axial piston device 100; and in FIGS. 34-35. Non-limiting examples of one or more hydrostatic pockets in an axial piston device is shown in FIGS. 16, 17, and 27 with respect to at least the hydrostatic pressure pockets 2310 included at an interface of the swash collar 2003 and the shaft 2001 of the axial piston device 2000.

Pistons configured for such controlled rotation with respect to a swash mechanism may include a fixed displacement swash mechanism at a fixed swash angle with respect to a shaft axis of rotation as the axial piston device rotates for a fixed displacement assembly or a variable displacement swash mechanism configured for a variable swash angle with respect to a shaft axis of rotation as the axial piston device rotates for a variable displacement assembly. Non-limiting examples of such fixed displacement assemblies is shown in at least FIGS. 10-13 with respect to the axial piston device 1000 and in FIG. 40 with respect to the axial piston device 8000. Non-limiting examples of such variable displacement assemblies is shown in at least FIGS. 14-27 with respect to at least the axial piston device 2000.

The controlled rotation of a rotatable piston within a cylinder bore and with respect to a swash mechanism of an axial piston device as described herein permits a rotatable piston to maintain a dynamic velocity, such that a piston reaching the end of its stroke in a respective cylinder bore housing the piston does not have a static velocity that goes to zero and rather maintains a relative velocity between the piston and cylinder. As load carrying capacity of a fluid film is dependent on relative motion of mating surfaces of fluid film interfaces, maintaining such a dynamic, relative velocity of the rotatable piston with respect to the cylinder allows for dynamic pressure built in the fluid film and a maintained load carrying capacity and ability while reducing and generally eliminating a likelihood of metal contact between the piston and the cylinder bore at the piston-cylinder interface that may otherwise occur at a static, zero velocity at the piston-cylinder interface. As a non-limiting example, such a rotatable piston assembly maintaining a dynamic velocity is beneficial at low speed conditions where such stick-slip phenomena is more likely than high speed conditions to prevent such metal contact at the piston-cylinder interface. Further, maintaining such a dynamic, relative velocity at the piston-cylinder interface allows for a reduction in piston friction forces as described herein to positive increase and affect performance, reliability, and durability of an associated axial piston device.

The rotatable piston assemblies as described herein configured to lock and control a rotation of a piston, or a piston and an attached slipper, such that rotation of the piston is controlled with respect to rotation of the drive shaft of the axial piston device. An addition of one or more hydrostatic pockets to a cylinder interface of the piston may further improve performance, reliability, and durability of an associated axial piston device. Such hydrostatic pockets may be fed with pressurized fluid from a piston working chamber and are configured to generate an equal and opposite force to balance the piston radial forces. Such piston radial forces are the radial piston forces induced by an interaction between the piston and an associated angled swash mechanism such as a swash plate as described herein. Addition of one or more hydrostatic pockets to the piston thus aids to balance the radial piston forces of the angled swash plate. Such balancing of radial forces improves the performance, reliability, and durability of the piston-cylinder interface and improves the efficiency characteristics of the associated axial piston device. Such rotatable piston assemblies as described herein are configured for and as axial piston devices including, but not limited to, a reciprocating piston machine having fixed and/or variable displacement, a stationary cylinder block and/or rotating cylinder block, and a radial and/or an axial piston reciprocating machine.

Item 1. A rotatable piston valve assembly for a reciprocating piston type hydraulic machine includes a rotatable piston configured for a controlled rotation and configured to reciprocate within a cylinder bore of the reciprocating piston type hydraulic machine.

Item 2. The rotatable piston valve assembly of item 1, the rotatable piston including a valve passage including an opening disposed at a proximal end of the rotatable piston.

Item 3. The rotatable piston valve assembly of item 2, the rotatable piston including an integral valve port in fluid communication with the valve passage, the integral valve port configured to provide a passage for fluid flow in one of a first direction and a second direction opposite the first direction to respectively act as one of a pump and a motor.

Item 4. The rotatable piston valve assembly of any of items 1 to 3, the rotatable piston including a piston revolute joint interface disposed at a distal end of the rotatable piston and a slipper assembly. The slipper assembly including a slipper shoe comprising a distal interface configured to be disposed against a proximal interface of a swashplate, the rotatable piston configured for a controlled rotation with respect to the swashplate, a slipper neck proximally extending from the slipper shoe, and a slipper revolute joint comprising a slipper revolute joint interface configured to be received by the piston revolute joint interface.

Item 5. The rotatable piston valve assembly of item 4, wherein the slipper assembly further includes a slipper ring configured to be disposed around the slipper neck to maintain a fit between the piston revolute joint interface and the slipper revolute joint interface.

Item 6. The rotatable piston valve assembly of item 4, wherein the slipper assembly further includes a hydrostatic pocket defined by the distal interface, and a lubrication port in fluid communication with the hydrostatic pocket.

Item 7. The rotatable piston valve assembly of item 6, wherein the rotatable piston further includes a lubrication port in fluid communication with the valve passage, and the lubrication port of the rotatable piston is in fluid communication with the lubrication port of the slipper assembly.

Item 8. The rotatable piston valve assembly of any of items 2 to 7, wherein the reciprocating piston type hydraulic machine is an axial piston machine comprising the swashplate configured for rotation and a stationary cylinder block.

Item 9. The rotatable piston valve assembly of item 1, wherein the reciprocating piston type hydraulic machine is an axial piston machine comprising a swashplate configured for rotation and a stationary cylinder block.

Item 9. The rotatable piston valve assembly of any of items 8 to 9, wherein the axial piston machine includes a manifold disposed within the stationary cylinder block and a swash housing, the manifold configured for fluid communication with the rotatable piston valve assembly. The manifold includes a proximal manifold port disposed at a proximal end of the manifold within the stationary cylinder block, and a proximal manifold passage in fluid communication with the proximal manifold port and comprising a plurality of proximal manifold passage port openings. The manifold further includes a distal manifold port disposed along a side wall of the manifold in the swash housing distal to the proximal end of the manifold, and a distal manifold passage in fluid communication with the distal manifold port and comprising a distal manifold passage port opening. The manifold further includes an inward cylinder block port disposed in the stationary cylinder block and in fluid communication with one of the plurality of proximal manifold passage port openings, and an outward cylinder block port in fluid communication with the distal manifold passage port opening.

Item 10. The rotatable piston valve assembly of item 9, the rotatable piston valve assembly further including a plurality of pistons, a plurality of slipper assemblies, and a plurality of outward cylinder block ports, each slipper assembly coupled to a respective piston, and each piston including an integral valve port. Each piston abuts one of the inward cylinder block ports in fluid communication with one of the plurality of proximal manifold passage port openings of the proximal manifold passage, and each piston abuts one of the plurality of outward cylinder block ports that are in fluid communication with the distal manifold passage.

Item 11. The rotatable piston valve assembly of item 1, wherein the reciprocating piston type hydraulic machine is an axial piston machine comprising a rotating swashplate, a stationary cylinder block, and a rotatable shaft coupled to the rotating swashplate.

Item 12. The rotatable piston valve assembly of item 11, wherein rotation of the rotatable shaft is configured to rotate the rotating swashplate, and rotation of the rotating swashplate is configured control a rotation of the rotatable piston during reciprocation of the rotatable piston in the cylinder bore.

Item 13. The rotatable piston valve assembly of item 12, wherein rotation of the rotating swashplate is configured control a rotation of the rotatable piston through a slipper assembly. The slipper assembly further includes a slipper shoe comprising a distal interface configured to be disposed against a proximal interface of the rotating swashplate, the rotatable piston configured for a controlled rotation with respect to the rotating swashplate, a slipper neck proximally extending from the slipper shoe, and a slipper revolute joint comprising a slipper revolute joint interface configured to be received by a piston revolute joint interface disposed at a distal end of the rotatable piston.

Item 14. The rotatable piston valve assembly of item 13, the rotatable piston valve assembly further including a hold down plate configured to interface with the slipper assembly and apply a force to maintain the slipper assembly against the rotating swashplate.

Item 15. A method for using an axial piston machine as a pump and a motor, the axial piston machine including a rotating swashplate, a stationary cylinder block, and a rotatable shaft coupled to the rotating swashplate is described. The method includes reciprocating a rotatable piston of a rotatable piston valve assembly in a cylinder bore of the stationary cylinder block of the axial piston machine, the rotatable piston including an integral valve port configured to provide a passage for fluid flow in one of a pump direction and a motor direction opposite the pump direction to respectively act as one of the pump and the motor. The method further includes rotating the rotatable piston in the cylinder bore during reciprocation, and controlling rotation of the rotatable piston in the cylinder bore through a rotational control assembly.

Item 16. The method of item 15, wherein the rotational control assembly includes a plurality of rotatable pistons and a plurality of slipper assemblies, each slipper assembly joined with a rotatable piston through a revolute joint connection, and each slipper assembly disposed against an interface of the rotating swashplate, wherein rotation of the rotating swashplate is configured to rotate the rotational control assembly. The method further includes rotating the rotatable shaft about a shaft axis of rotation to rotate the rotating swashplate about the shaft axis of rotation, rotating the plurality of slipper assemblies of the rotatable piston valve assembly through rotation of the rotating swashplate, and rotating the plurality of rotatable pistons about a bore axis of rotation through rotation of the plurality of slipper assemblies respectively joined to the plurality of rotatable pistons through respective revolute joint connections.

Item 17. The method of item 16, wherein a proximal interface of the rotating swashplate is configured to adjust an adjustable angle with respect to the shaft axis of rotation as the rotatable shaft rotates.

Item 18. The method of item 16, wherein the axial piston machine includes a manifold disposed within the stationary cylinder block and a swash housing. The method further includes receiving fluid in the pump direction flowing from a proximal end of the manifold toward a distal side portion of the manifold into a proximal manifold port disposed at the proximal end of the manifold within the stationary cylinder block; receiving fluid into a proximal manifold passage from the proximal manifold port; receiving fluid into a plurality of inward cylinder block ports disposed in the stationary cylinder block through respective openings of the proximal manifold passage; when the integral valve port of a rotatable piston of the plurality of rotatable pistons is in fluid communication with a respective inward cylinder block port, receiving fluid into the integral valve port to flow into a valve passage of the rotatable piston; when the integral valve port of the rotatable piston is in fluid communication with a respective outward cylinder block port of a plurality of outward cylinder block ports disposed in the stationary cylinder block, directing fluid from the valve passage to flow through the integral valve port and into the respective outward cylinder block port; receiving fluid into a distal manifold passage in fluid communication with the plurality of outward cylinder block ports; and discharging fluid from a distal manifold port in fluid communication with the distal manifold passage.

Item 19. The method of item 18, when flow of fluid is in the pump direction, the method further including rotating the rotatable shaft to rotate the rotating swashplate to rotate the rotatable piston valve assembly, and converting mechanical energy from rotating the rotatable shaft to hydraulic energy from the flow of fluid in the pump direction.

Item 20. The method of item 19, the method further including driving the rotatable shaft by an external torque at a rotational speed, and directly transferring the external torque and the rotational speed to the rotating swashplate.

Item 21. The method of item 16, wherein the axial piston machine includes a manifold disposed within the stationary cylinder block and a swash housing, the method further including receiving fluid in the motor direction flowing from a distal side portion of the manifold toward a proximal end of the manifold into a distal manifold port of the manifold; receiving fluid into a distal manifold passage from the distal manifold port, the distal manifold passage in fluid communication with the distal manifold port and a plurality of outward cylinder block ports disposed in the stationary cylinder block; when the integral valve port of a rotatable piston of the plurality of rotatable pistons is in fluid communication with a respective outward cylinder block port of a plurality of outward cylinder block ports, receiving fluid into the integral valve port from the distal manifold passage and the respective outward cylinder block port and into a valve passage of the rotatable piston through the integral valve port; when the integral valve port of the rotatable piston is in fluid communication with a respective inward cylinder block port of a plurality of inward cylinder block ports disposed in the stationary cylinder block, receiving fluid into the respective inward cylinder block port from the integral valve port; receiving fluid into a respective opening of a plurality of openings of a proximal manifold passage, the plurality of openings of the proximal manifold passage in respective fluid communication with the plurality of inward cylinder block ports; receiving fluid into the proximal manifold passage from the respective opening of the proximal manifold passage; receiving fluid into a proximal manifold port from the proximal manifold passage, the proximal manifold port disposed at a proximal end of the manifold within the stationary cylinder block; and discharging fluid from the proximal manifold port.

Item 22. The method of item 21, when flow of fluid is in the motor direction, the method further including translating the rotatable piston valve assembly into the rotating swashplate to rotate the rotating swashplate to rotate the rotatable shaft, and converting hydraulic energy from the flow of fluid in the motor direction to mechanical energy from rotation of the rotatable shaft.

For the purposes of describing and defining the present disclosure, it is noted that reference herein to a variable being a “function” of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or to function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present disclosure it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A rotatable piston assembly for a reciprocating piston hydraulic machine, wherein the reciprocating piston hydraulic machine is an axial piston machine including:
- a rotating swash mechanism,
- a stationary cylinder block, and
- a rotatable shaft coupled to the rotating swash mechanism, the rotatable piston assembly comprising:
- a rotatable piston including at least a first valve port therein and configured for a controlled rotation and configured to reciprocate within a cylinder bore of the reciprocating piston hydraulic machine along a cylinder bore axis of the cylinder bore, wherein rotation of the rotatable shaft is configured to rotate the rotating swash mechanism, and rotation of the rotating swash mechanism is configured to control a rotation of the rotatable piston about the cylinder bore axis during reciprocation of the rotatable piston in the cylinder bore to align the first valve port with at least one cylinder block port,
- wherein the rotating swash mechanism is a rotating swashplate comprising a proximal surface, and the rotatable piston comprises a piston constrained joint interface disposed at a distal end of the rotatable piston, the rotatable piston assembly further comprising:
- a slipper assembly configured to couple with and constrain rotation of the rotatable piston to control alignment of the first valve port with the at least one cylinder block port, the slipper assembly comprising:
- a slipper shoe comprising a distal interface configured to be disposed against a proximal interface of the swashplate, the rotatable piston configured for a controlled rotation with respect to the swashplate,
- a slipper neck proximally extending from the slipper shoe, and
- a slipper joint comprising a slipper constrained joint interface configured to be received by the piston constrained joint interface to form a constrained joint.

2. The rotatable piston assembly of claim 1, the rotatable piston further comprising:
- a distal angled surface angled with respect to a piston axis, the distal angled surface of the rotatable piston configured to interface and rotate with respect to the proximal surface of the rotating swashplate, the proximal surface angled with respect to an axis of the rotatable shaft.

3. The rotatable piston assembly of claim 1, wherein the constrained joint of the rotatable piston comprises a piston revolute joint interface disposed at the distal end of the rotatable piston.

4. The rotatable piston assembly of claim 3, wherein the slipper assembly further comprises a slipper ring configured to be disposed around the slipper neck to maintain a fit between the piston revolute joint interface and the slipper revolute joint interface.

5. The rotatable piston assembly of claim 1, wherein the constrained joint comprises one of a revolute joint, a spherical socket constrained with a pin joint, a press fit trunnion joint, and a connecting rod joint, the connecting rod joint comprising a connecting rod including a pair of revolute joint interfaces at opposing ends configured to respectively couple with the slipper constrained joint interface and the piston constrained joint interface.

6. The rotatable piston assembly of claim 1, the rotatable piston assembly further comprising a gear drive assembly coupled to the rotatable piston.

7. The rotatable piston assembly of claim 6, wherein the gear drive assembly comprises a shaft sun gear and a piston planetary gear in communication with the shaft sun gear and coupled to the rotatable piston, the shaft sun gear coupled to the rotatable shaft such that a rotation of the rotatable shaft in a first direction causes a corresponding rotation of the shaft sun gear, and the rotation of the shaft sun gear affects a rotation of the piston planetary gear in a second direction opposing the first direction.

8. The rotatable piston assembly of claim 6, wherein the gear drive assembly comprises a floating gear disposed on the proximal surface of the rotating swashplate and coupled to ends of the slipper assembly such that a rotation of the floating gear causes a rotation of the slipper assembly and a corresponding rotation of the rotatable piston about the cylinder bore axis in the cylinder bore.

9. The rotatable piston assembly of claim 1, wherein the rotatable piston comprises a single sided configuration.

10. The rotatable piston assembly of claim 9, the rotatable piston comprising a lubrication port configured to axially extend between ends of the rotatable piston;

at least one hydrostatic pocket circumferentially disposed on a sidewall of the rotatable piston, the sidewall disposed between the ends of the rotatable piston;

at least one pocket lubrication port configured to fluidly couple the at least one hydrostatic pocket with the lubrication port, wherein the at least one hydrostatic pocket is configured to counteract and balance forces acting upon the rotatable piston at a piston-cylinder interface when the rotatable piston rotates about the cylinder bore axis.

11. The rotatable piston assembly of claim 1, the rotatable piston comprising:

a valve passage including an opening disposed at a proximal end of the rotatable piston, and the first valve port is in fluid communication with the valve passage, the first valve port configured to provide a passage for fluid flow in one of a first direction and a second direction opposite the first direction to respectively act as one of a pump and a motor.

12. The rotatable piston assembly of claim 11, the rotatable piston assembly comprising:

a manifold comprising an inward cylinder block port and an outward cylinder block port, the inward cylinder block port circumferentially disposed with respect to the outward cylinder block port such that the inward cylinder block port and the outward cylinder block port are disposed on opposite sides of the rotatable piston disposed in the cylinder bore; and the first valve port configured to one of seal from and communicate with the manifold when the rotatable piston rotates within the cylinder bore about the cylinder bore axis, wherein communication with the manifold comprises fluid communication with one of the inward cylinder block port and the outward cylinder block port at a time.

13. The rotatable piston assembly of claim 1, the rotatable piston comprising:

a valve passage including an opening disposed at a proximal end of the rotatable piston, and a second valve port, the first and second valve ports circumferentially disposed and in fluid communication with the valve passage, each valve port configured to provide a passage for fluid flow in one of a first direction and a second direction opposite the first direction to respectively act as one of a pump and a motor.

14. The rotatable piston assembly of claim 13, the rotatable piston assembly comprising:

a manifold comprising a first pair of cylinder ports disposed at a first end of the manifold and a second pair of cylinder ports disposed a second end of the manifold opposite the first end, each pair of cylinder ports comprising an inward cylinder block port and an outward cylinder block port, the inward cylinder block port circumferentially disposed with respect to the outward cylinder block port such that the inward cylinder block port and the outward cylinder block port are disposed on opposite sides of the rotatable piston disposed in the cylinder bore; and the first and second valve ports configured to one of seal from or communicate with the manifold when the rotatable piston rotates within the cylinder bore about the cylinder bore axis, wherein communication with the manifold comprises fluid communication with the first valve port with one of the inward cylinder block port and the outward cylinder block port of the first pair of cylinder ports at the first end of the manifold and the second valve port with one other of the inward cylinder block port and the outward cylinder block port of the second pair of cylinder ports at the second end of the manifold.

15. The rotatable piston assembly of claim 13, the rotatable piston assembly comprising:

a manifold comprising a pair of circumferentially aligned cylinder ports; and the first and second valve ports configured to one of seal from and communicate with the manifold when the rotatable piston rotates within the cylinder bore about the cylinder bore axis, wherein communication with the manifold comprises one of fluid communication of the first valve port with a first cylinder port of the pair of circumferentially aligned cylinder ports and fluid communication of the second valve port with a second cylinder port of the pair of circumferentially aligned cylinder ports.

16. The rotatable piston assembly of claim 1, further comprising a hold-down plate opposite the swashplate, where the combination of the hold down plate in contact with an upper surface of the slipper shoe and the swashplate in contact with a lower surface of the slipper shoe hold the slipper shoe in place between the combination.

17. A rotatable piston assembly for a reciprocating piston hydraulic machine, wherein the reciprocating piston hydraulic machine is an axial piston machine including:

a rotating swash mechanism, a stationary cylinder block, and a rotatable shaft coupled to the rotating swash mechanism, the rotatable piston assembly comprising:

a rotatable piston configured for a controlled rotation and configured to reciprocate within a cylinder bore of the reciprocating piston hydraulic machine along a cylinder bore axis of the cylinder bore, where rotation of the rotatable shaft is configured to rotate the rotating swash mechanism, and rotation of the rotating swash mechanism is configured to control a rotation of the rotatable piston about the cylinder bore axis during reciprocation of the rotatable piston in the cylinder bore, the rotatable piston comprising a piston lubrication port configured to axially extend between ends of the rotatable piston;

a pair of piston hydrostatic pockets circumferentially disposed on a sidewall of the rotatable piston, the sidewall disposed between the ends of the rotatable piston;

a pair of pocket lubrication ports configured to fluidly couple the pair of piston hydrostatic pockets with the piston lubrication port, wherein the pair of piston hydrostatic pockets is configured to counteract and balance forces acting upon the rotatable piston at a piston-cylinder interface when the rotatable piston rotates about the cylinder bore axis, wherein the rotatable piston further comprises an integral valve port in communication with the piston lubrication port of the rotatable piston;

wherein the rotating swash mechanism is a rotating swashplate comprising a proximal surface, the rotatable piston comprises a single sided configuration and a piston constrained joint interface, and the rotatable piston assembly further comprising:

a slipper assembly configured to couple with and constrain rotation of the rotatable piston, the slipper assembly comprising:

a slipper shoe comprising a distal interface configured to be disposed against a proximal interface of a swashplate, the rotatable piston configured for a controlled rotation with respect to the swashplate, a slipper neck proximally extending from the slipper shoe, a slipper constrained joint comprising a slipper constrained joint interface configured to be received by the piston constrained joint interface to form a constrained joint, a slipper shoe hydrostatic pocket defined by the distal interface of the slipper shoe, and a slipper shoe lubrication port in fluid communication with the slipper shoe hydrostatic pocket.

18. The rotatable piston assembly of claim 17, wherein the piston lubrication port of the rotatable piston is in fluid communication with the slipper shoe lubrication port of the slipper assembly.

* * * * *